United States Patent

[11] 3,618,039

| [72] | Inventors | John F. Baltzly;<br>Donn E. Bernhardt; Edward H. Cabaniss, III; Perry W. Penton, all of Phoenix, Ariz. |
|---|---|---|
| [21] | Appl. No. | 845,398 |
| [22] | Filed | July 28, 1969 |
| [45] | Patented | Nov. 2, 1971 |
| [73] | Assignee | Honeywell Information Systems Inc. |

[54] DATA COMMUNICATION SYSTEM INCLUDING AUTOMATIC INFORMATION TRANSFER CONTROL MEANS
6 Claims, 27 Drawing Figs.

| [52] | U.S. Cl. | 340/172.5 |
| [51] | Int. Cl. | G06f 9/18 |
| [50] | Field of Search | 235/157; 340/172.5 |

[56] References Cited
UNITED STATES PATENTS

| 3,181,124 | 4/1965 | Hammel | 340/172.5 |
| 3,369,221 | 2/1968 | Lethin et al. | 340/172.5 |
| 3,500,333 | 3/1970 | Couleur et al. | 340/172.5 |

Primary Examiner—Raulfe B. Zache
Assistant Examiner—Melvin B. Chapnick
Attorneys—Edward W. Hughes and Fred Jacob ABSTRACT: A data communication system for transferring messages between a plurality of remote terminals and a working store includes an information transfer and director. The information transfer and director selectively receives messages from the terminals, adds a message identifier to each message representing currency (software processing of message required), stores the messages in the working store, selectively tests for the presence of the message identifier in the messages previously stored, and inhibits the transmittal of messages from the terminals to the information transfer and director when the number of previously stored messages exceeds a predetermined number.

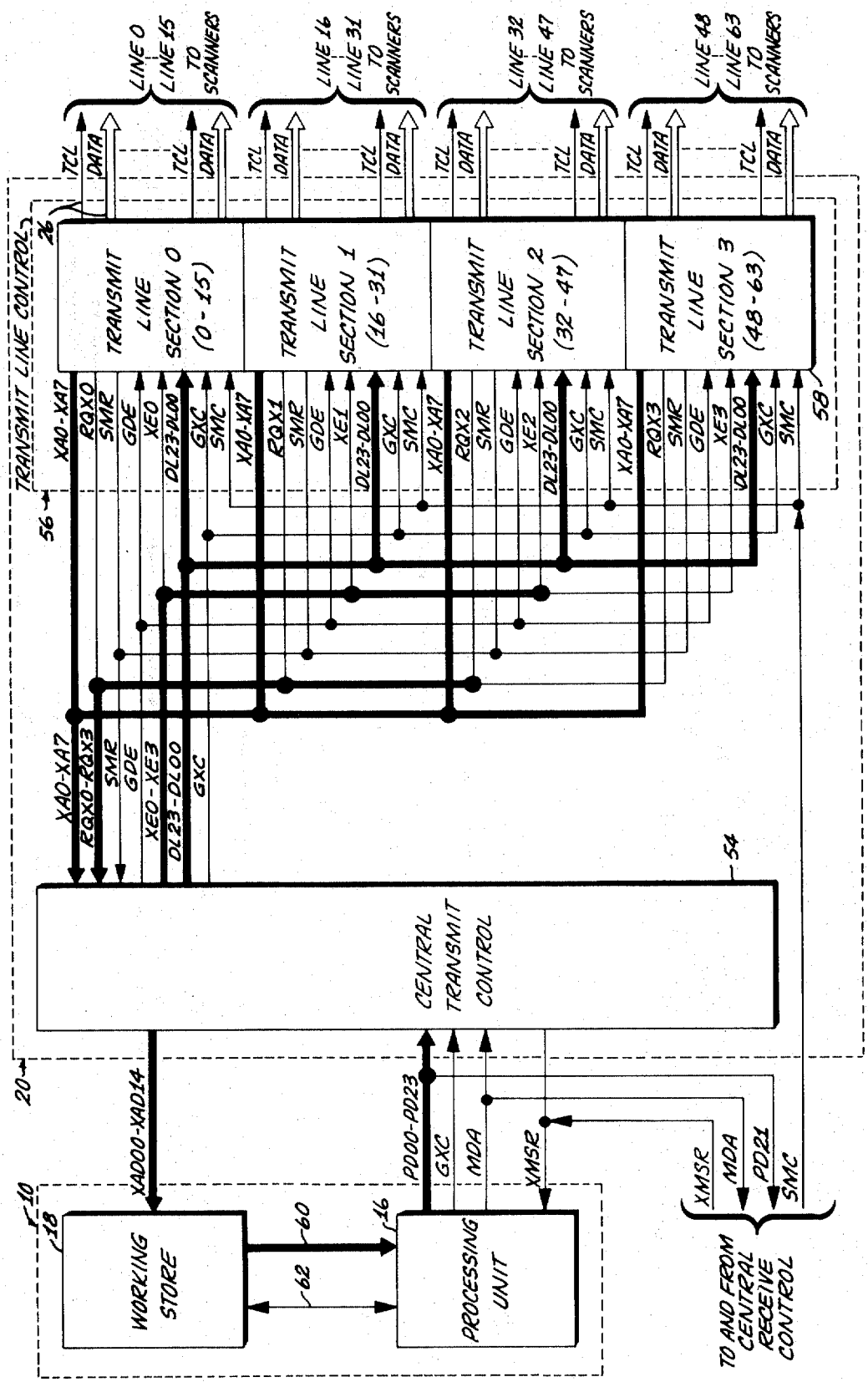

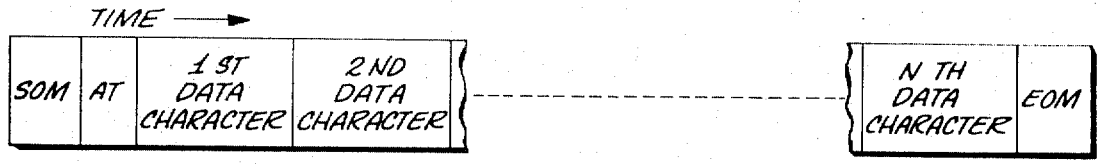
Fig-6
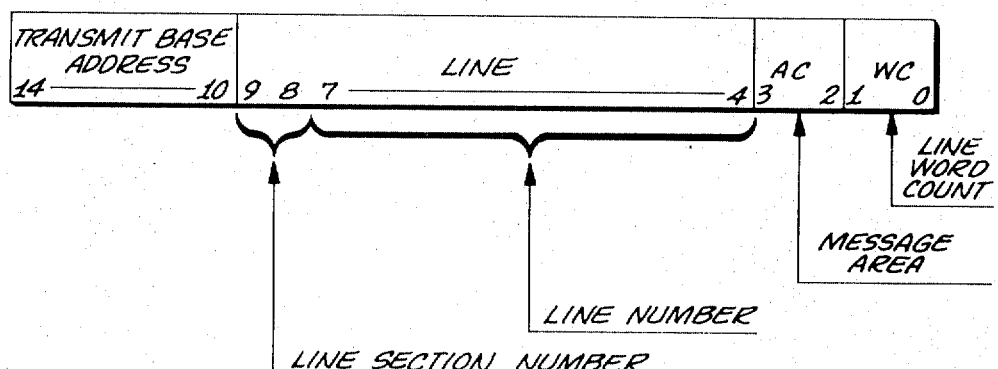
Fig-4
Fig-5

Fig. 16

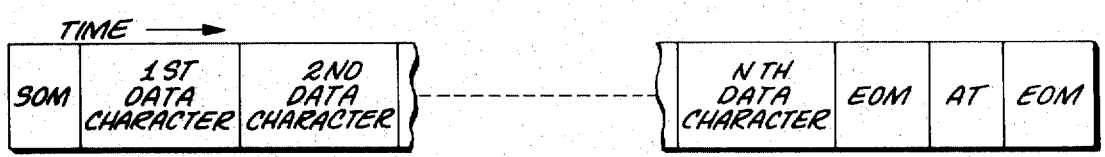

Fig. 17

| WORD R+0<br>1ST WORD | 4TH DATA<br>CHARACTER | 3RD DATA<br>CHARACTER | 2ND DATA<br>CHARACTER | 1ST DATA<br>CHARACTER | |
|---|---|---|---|---|---|
| WORD R+1<br>2ND WORD | 8TH DATA<br>CHARACTER | 7TH DATA<br>CHARACTER | 6TH DATA<br>CHARACTER | 5TH DATA<br>CHARACTER | MESSAGE #1<br>(TYPICAL) |
| WORD R+2<br>3RD WORD | 12TH DATA<br>CHARACTER | 11TH DATA<br>CHARACTER | 10TH DATA<br>CHARACTER | 9TH DATA<br>CHARACTER | |
| WORD R+3<br>4TH WORD | STATUS | AN | AM | AT | |

CURRENCY BIT

Fig. 18

| RECEIVE BASE<br>ADDRESS | MESSAGE LOCATION | WORD # |
|---|---|---|
| 14 — 11 | 10 — 2 | 1 — 0 |

LINE WORD COUNT

Fig. 19

DATA COMMUNICATION SYSTEM INCLUDING AUTOMATIC INFORMATION TRANSFER CONTROL MEANS

BACKGROUND OF THE INVENTION

The present invention relates generally to data communication systems and, more particularly, to an online data communication system including means for automatically regulating the transfer of message information from a plurality of external user devices to a data processor.

1. Field of the Invention

In the data communications field it is customary to provide a scanner or control means between a plurality of remote terminals and a data processor memory for controlling the transfer of information from the terminals to the data processor. The scanner usually selectively polls or interrogates the terminals. When a selected one of the terminals is interrogated, if it has information to transfer, the scanner will effect a single communication link for the transfer of the information from the terminal to the data processor. When the scanner senses the end of the information transfer from the selected terminal, it will selectively poll a different terminal and the information transfer process is repeated. In this manner information from the terminals may be concentrated into a single communication link for transfer to the data processor for storage into the processor memory.

2. Description of Prior Art

Data communication systems most prevalent in the art are comprised of a plurality of remote terminals which communicate with a data processor memory through a suitable information transfer control. The transfer control usually consists of a plurality of scanners for scanning the terminals and a concentrator for multiplexing information received from the scanners into the data processor. The most prevalent philosophy in the prior art is to provide a free-running scanner which sequentially polls or interrogates each terminal for a predetermined length of time. When a terminal is interrogated by the scanner, if it has information to transmit, it so indicates this fact to the scanner. The scanner will then allow the information to be transferred therethrough to the concentrator. After the information has passed through the scanner it will sequentially interrogate the next terminal. In this manner, the information from the terminals is freely transferred through the scanners to the concentrator without any means of stopping it. Since the scanner is completely free running, the concentrator which receives the information from the scanners usually must buffer or temporarily store the information until it can be stored in the processor memory. However, the concentrator usually has a very limited storage capacity and cannot retain the received information for a long period of time. If it attempts to do so, there is the possibility that other information from the scanners may be lost since there is no room for it to be stored in the concentrator. Since all information is placed in the data processor memory from the concentrator, a heavy burden is placed on the data processor to store the information in its memory at a rate at least as fast as it is being received by the concentrator. If the processor cannot retrieve the information from the concentrator fast enough, the information will be lost. This problem of losing information is usually overcome by incorporating a faster data processor having a memory capacity large enough to be able to hold the required amount of received information until it can be processed by the data processor. This approach, however, is expensive and still does not eliminate the possibility of losing information, especially in large communication systems where several hundred terminals may be transferring information to the processor simultaneously. Therefore, the expense incurred, which may be compounded by an overly sophisticated system, is essentially wasted.

SUMMARY OF THE INVENTION

The communication system of the present invention alleviates this problem of the prior art by signalling, when appropriate, a plurality of scanners in the system to stop interrogating a plurality of terminals connected to each of the scanners.

The terminals in the present system are adapted to transmit information to a data processor memory via the scanners and a communication controller in the system in response to an interrogation by the scanners. Thus, the terminals are prevented from sending messages or information to the processor memory until they are interrogated.

The communication controller reads information from the data processor memory and tests to make a determination to see if the memory storage capacity is being exceeded by information transmitted from the terminals. If when the communication controller makes this test, the processor memory contains too much information, suitable logic within the controller will automatically generate a stop-message command. This stop-message command is transferred from the communication controller to each of the scanners, thus signalling them to stop their interrogation of the terminals.

Periodically the data processor will provide a start-message command to the communication controller which in turn will transfer the start-message command to the scanners, thus allowing the scanners to resume interrogating the terminals.

In this manner the communication system controls the transfer of information from the terminals into the processor memory to automatically adjust itself to the system data transfer rate and the scanning rate of the scanners.

It is therefore an object of the present invention to provide a data communication system having enhanced information transfer capabilities;

Another object is to provide a data communication system including means for preventing the loss of information being transferred from a plurality of terminals to a data processor;

Still another object is to provide a data communication system capable of automatically inhibiting the transfer of information from a plurality of terminals to a data processor by preventing a plurality of scanner devices in the system from interrogating the terminals;

Still another object is to provide an information transfer and director in a data communication system having means to generate a stop-message command for stopping the interrogation of a plurality of terminals in the system;

A still further object is to provide means in a communication controller responsive to inputs thereto from a data processor for generating a stop-message command resulting from an excessive number of message words contained within a data processor memory;

Still another object is to provide means within a communication controller in a data communication system for inserting a message identifier in incoming messages received thereby from a plurality of scanners;

A further object is to provide a scanner in a communication system having terminal interrogation means and means responsive to a stop-message command signal received from a communication controller for inhibiting the interrogation of a plurality of terminals by the interrogation means.

The foregoing and other objects will become apparent as this description proceeds and the features of novelty which characterize the invention will be pointed out in particularlity in the claims annexed to and forming a part of this specification.

BRIEF DESCRIPTION OF THE DRAWING

The present invention may be more readily described and understood by reference to the accompanying drawing, in which:

FIG. 3 illustrates the signal lines which interface the data processor with the communication controller of FIG. 1 and also the signal lines which interface a central transmit control with a transmit line control within the communication controller of FIG. 1;

FIG. 4 illustrates a typical memory format for the placement of data in the data processor working store of FIG. 1;

FIGS. 5 and 19 illustrate message address formats for utilization in developing the memory addresses for the working store as shown by FIG. 4;

FIGS. 6, 16 and 17 illustrate typical message information formats utilized in the system of the present invention;

FIG. 10, taken collectively with FIG. 9, constitutes a detailed logic schematic drawing showing the movement of information within a one of the transmit line sections;

DESCRIPTION OF THE PREFERRED EMBODIMENT

Figure 1:
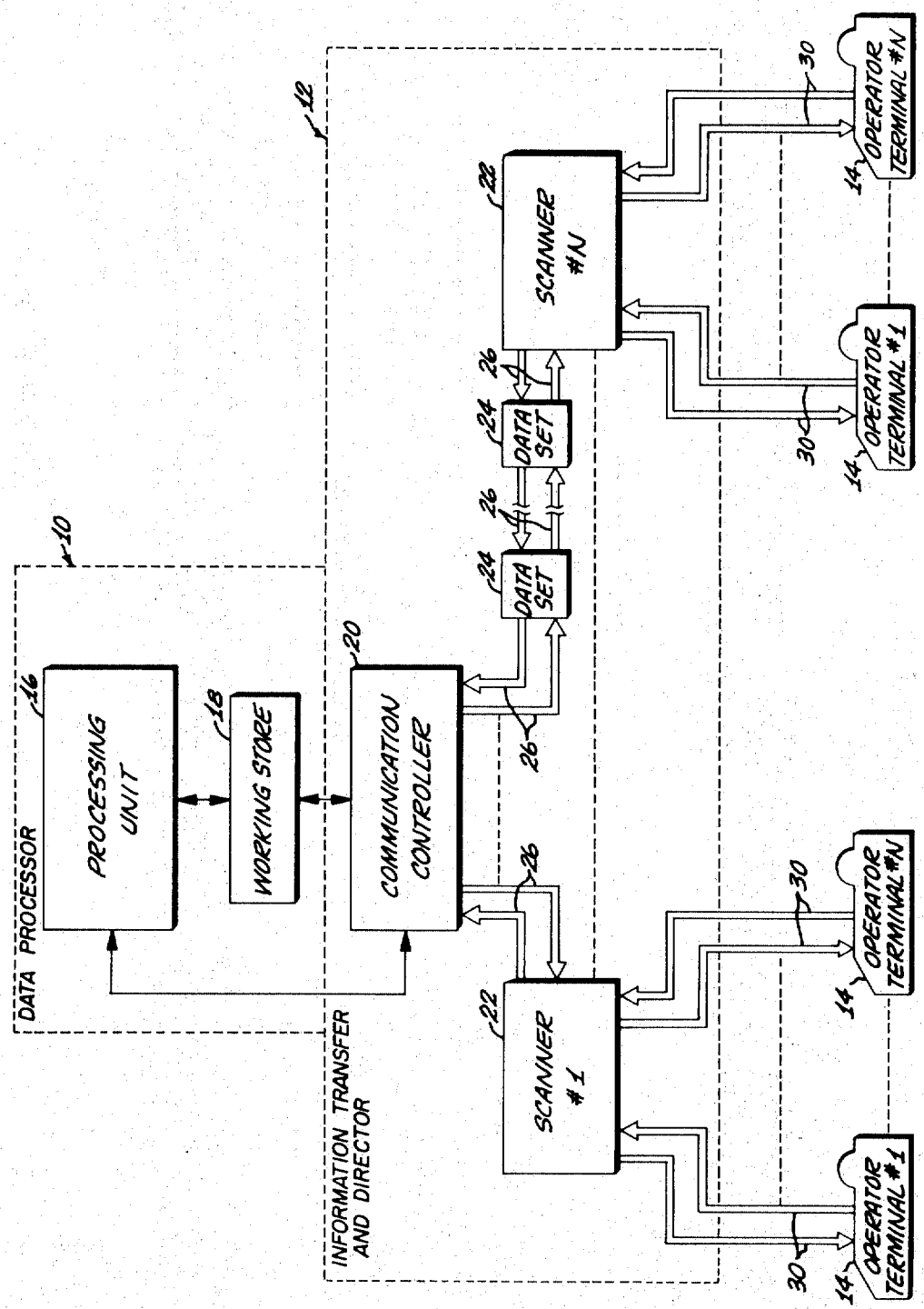
FIG. 1 is a major block diagram illustrating the major components of the data communication system of the present invention.

Referring now to FIG. 1 there is shown in block diagram form a data communication system comprising, a data processor 10, an information transfer and director 12, and a plurality of terminal devices (terminals) 14. Included within the data processor 10 is a processing unit 16 and a working store or memory 18. The data processor 10 operates in conjunction with the director 12 for the bidirectional transfer of information items representative of messages between the director 12 and the terminals 14.

The information transfer and director 12 is comprised of a communication controller 20 and a plurality of scanner devices 22 operating through full duplex communication lines 30 to the terminals 14. Also shown included in the director 12 are data sets 24 illustrating a typical interconnection of a one of a plurality of full duplex communication lines 26 between the communication controller 20, and a one of the scanner devices 22( scanner#N). These data sets are used to exemplify that telephone communication lines may be employed in the present system when the distances between the scanners 22 and the controller 20 necessitate long distance communication. However, if the distances between the controller 20 and the scanners 22 is relatively short, such as less than a mile, the scanners 22 may be connected directly to the controller 20 without the use of these data sets. This latter connection is illustrated in FIG. 1 by the connection of a different one of the full duplex lines 26 interconnecting a one of the scanners 22 (scanner#1) to the controller 20.

In a manner similar to lines 26, there is a full duplex line 30 interconnecting each of the terminals 14 to an associated one of the scanners 22. Full duplex lines 26 and 30 symbolically represent communication links for the transfer of information items between the terminals 14 and the controller 20, such as intelligence in serialized digital data form representative of alphabetic characters, numeric quantities, control characters, address entities, etc.

Also shown in FIG. 1 are lines interconnecting the processing unit 16 and the working store 18 to the controller 20. These interconnecting lines symbolically represent flow paths for the transfer of information items and memory or data cell addresses between the data processor 10 and the controller 20. They also represent control signal paths for control signals which control the flow of the information items between the communication controller 20 and the data processor 10.

In the following description, the preferred embodiment the data communication system of FIG. 1 will be described in three parts as follows: (1) System clock generation, (2) Transmit operation, and (3) Receive operation.

SYSTEM CLOCK GENERATION

Figure 2:
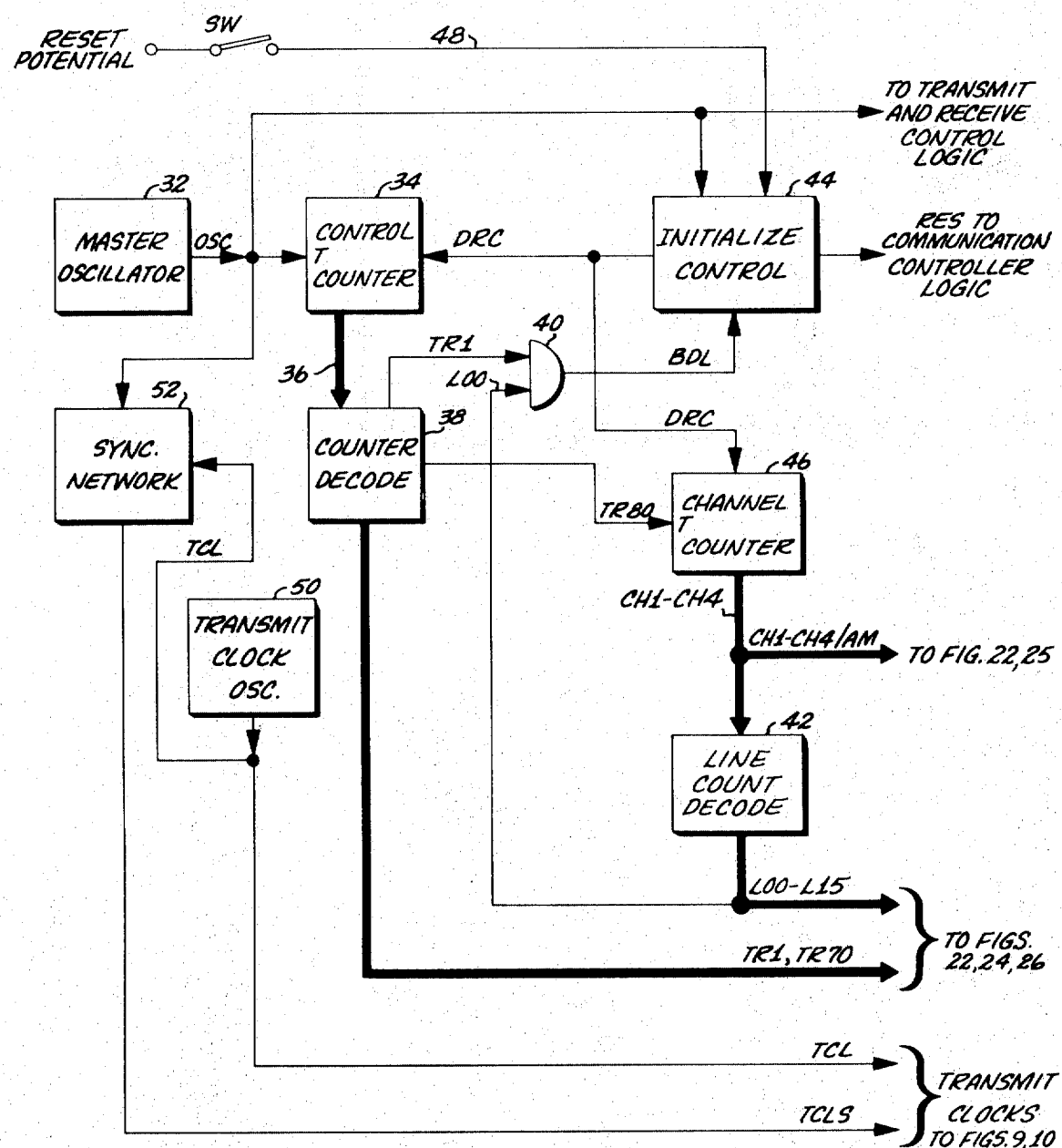
FIG. 2 is a block diagram illustrating a clock generation system for providing timing signals to the major components of the data communication system of FIG. 1.

Referring now to FIG. 2 there is illustrated in block diagram form a clock generation system utilized in the present embodiment for generating all of the clock signals for the data communication system of FIG. 1. The clock system is comprised of a master oscillator 32 which generates a repetitive output clock signal OSC. In the communication controller 20 of FIG. 1 the OSC signal is used to control the time of clocking control signals and message information through logic contained therein. A typical repetition frequency of master oscillator 32 would be approximately 4 megacycles.

The OSC signal from the master oscillator 32 is also applied to a T (trigger) terminal of a control counter 34. The control counter 34 is a binary counter which counts OSC input pulses and provides binary output signals on lines 36 to a counter decode 38. The counter decode 38 decodes the binary signals on lines 36 and in response thereto provides a plurality of timing receive count output signals designated TR1, TR70 and TR80. Timing counts TR1 and TR70 from the counter decode 38 are utilized in the controller 20 during receive operations for controlling the sequence of operations therein. The lines conveying TR1 and TR70 are shown going from FIG. 2 to FIGS. 22, 24 and 26. In addition, the TR1 timing signal from the counter decode 38 is applied to an AND-gate 40 in conjunction with an L00 signal from a line count decode 42. AND-gate 40 develops a BDL signal (beginning of delay line) which is applied to an initialize control 44. The purpose of BDL will be explained in the description of the receive operation.

Timing count TR80 from the counter decode 38 is applied to a T (trigger) input terminal of a channel counter 46 which also receives a DRC signal (disable and reset counters) from the initialize control 44. The channel counter 46 is a binary counter which provides a plurality of binary channel count output signals CH1–CH4/AM to FIG. 25 and to a line count decode 42. The line count decode 42 generates a plurality of output signals L00–L15 representative of 16 lines in the controller 20 which are used in receive operations.

To explain the operation of the clock system, assume that a switch SW (FIG. 2) is momentarily depressed to the closed position. This closing causes a reset potential to be applied to the initialize control 44 via line 48. Upon application of the reset potential to the initialize control 44 the DRC signal (disable and reset counters) is simultaneously applied to the control counter 34 and to the channel counter 46. The presence of the DRC signal will prevent the control counter 34 and the channel counter 46 from counting their respective input signals OSC and TR80. At the same time the DRC signal disables the counters from counting, it also conditions both counters 34 and 46 so that the TR1 and L00 signals from the counters are present at the inputs of AND-gate 40. When the reset potential is removed from the initialize control 44 (SW not closed), the DRC signal is removed from the control counter 34 and the channel counter 46, thus removing the disable signal and allowing both counters to run or count in response to the OSC and TR80 signals, respectively. The control counter 34 will begin to count on the next OSC signal after the removal of the DRC signal.

At the same time the reset potential on line 48 is applied to the initialize control 44, an RES (reset) signal is generated from the initialize control which is applied to various portions of the communication controller logic to condition the logic for transmit and receive operations. However, due to suitable logic within the initialize control, the RES signal will remain active until a BDL signal (beginning of delay line) is applied to the initialize control 44.

The BDL signal is generated when there is coincidence at AND-gate 40 between the TR1 and L00 signals. Since that time when the control counter 34 was conditioned by the DRC signal, the output of the counter decode 38 has been providing a TR1 signal to AND-gate 40. Further since the channel counter 46 was conditioned by the DRC signal, the output of line count decode 42 has been applying an L00 signal to AND-gate 40. Upon the removal of the DRC signal and when the control counter 34 begins to count, the output of the counter decode 38 will change to TR2. The generation of TR2 occurs upon application of the first OSC signal applied to the control counter 34 after the DRC signal is removed. In addition, due to a one OSC signal built in delay in the initialize control 44 the BDL signal will have no the initialize on the control 44 until the generation of the next BDL signal. The control counter 34 counts from 1 to 80 and back to 1. Each time the control counter achieves a count of 80 the counter decode 38 will generate the TR80 signal which is applied to a T (trigger) input terminal of channel counter 46. The channel counter 46 will count up by one each time the TR80 signal is applied thereto. Upon the occurrence of the first TR80 signal after the DRC is removed, the channel counter will count up to change the binary count provided to the line count decode 42. On this first count the line count decode 42 will generate an L01 output signal on an associated one of the lines L00-L15; thus, removing the L00 signal from the input to AND-gate 40.

The channel counter 46 is similar in operation to the control counter 34, in that it is also a binary counter which counts continually from its conditioned state to its maximum count and then returns to the conditioned state to resume counting. From the previous description it can be seen that the RES signal will remain active until the control counter 34 and the channel counter 46 have counted all the way around to their original conditioned states. At this time there is again coincidence between TR1 and L00 to produce the BDL signal which is applied to the initialize control 44 to, in turn, remove the RES signal from the communication controller logic. In this manner the RES signal is applied to the controller logic sufficiently long to reset all shift registers, counters and flip-flops, as well as reset logic associated with delay line buffers in the communication controller 20 (FIG. 1).

Also included within the clock generation system of FIG. 2 is a transmit clock OSC 50 which is a free-running oscillator providing a repetitive output signal TCL (transmit clock) to a sync network 52 and to the communication controller 20 for use with outgoing messages transmitted from the communication controller to the external scanner devices 22 (FIG. 1). The sync network 52 also receives the OSC signal in conjunction with the TCL signal. The resultant output from the sync network is a signal TCLS (transmit clock synchronization) which is utilized within the communication controller 20 for controlling the clocking of information through various portions of the controller logic during a transmit operation. A typical repetition frequency for the TCL and TCLS signals, which are synchronized, would be 2 kilocycles.

All of the signals generated by the clock system of FIG. 2 are shown as inputs to the appropriate places in the drawings associated with the following discussion of the communication controller, with the exception of the RES signal which is utilized throughout the entire controller to reset various portions of the logic therein. For purposes of expediency and simplicity, the RES signal is not shown on any of the drawings except FIG. 2. It is implied, however, that the RES signal is used only one time, and that is during the system reset operation just described wherein the controller logic is placed in a reset condition in preparation for transmit and receive operations.

TRANSMIT OPERATION

In the transmit mode of operation information items or outgoing messages in the form of memory words are extracted or retrieved from the data processor working store 18 (FIG. 1) by memory addresses developed by the information transfer and director 12. These outgoing messages are transferred from the working store, hereinafter referred to as memory, through the communication controller 20 to individual ones of the scanners 22 via selected one of the communication lines 26. The messages received by the scanners 22 from the memory are from data cells contained in the memory. The messages are retrieved from the memory 18 in accordance with cell addresses which correspond to individual ones of the communication lines 26. Address entities or characters which are contained within the outgoing messages to the scanners are utilized thereby to further direct the outgoing messages, via lines 30, to individual ones of the terminals 14 in accordance with the address entities.

The terminals 14 are adapted to receive message information from the information transfer and director 12 and respond back through the director 12 via lines 30 and 26 to the data processor 10. The information to which the terminals 14 are adapted to respond may be representative of input data provided to the terminals by the outgoing message information from the director 12, information entered into the terminals by an operator, or by input media to the terminals such as from a reading device operating with the terminal.

With reference now to FIG. 3, there is shown an interface major block diagram of a transmit portion of the communication controller 20. The transmit portion includes a central transmit control 54 and a transmit line control 56. The transmit line control 56 includes a plurality of transmit line sections 58, designated section 0–section 3, for transmitting outgoing messages to the scanners via lines 26 as shown. Communication lines between the central transmit control 54 and the data processor 10 and between the transmit line control 56 and the central control 54 are also shown. It should further be noted, as shown to the right of the communication controller 20, that each of the transmit line sections has connected thereto 16 transmit lines 26, each of which represents one-half of a full duplex line as shown in FIG. 1. Each of these transmit lines 26 is comprised of a data line (labeled DATA) and a transmit clock line (labeled TCL). Each of the full duplex lines is connected either directly to an associated one of the scanner devices 22 or through the data sets 24 as shown in FIG. 1.

The interface lines shown in FIG. 3 are defined as follows:

I. Interface lines between the central transmit control 54 and the data processor 10.
  A. Transmit address lines XAD00–XAD14. These lines serve to provide data cell or memory addresses to the working store 18 for the retrieval therefrom of outgoing message information destined for selected ones of the scanners 22 (FIG. 1).
  B. Processor data lines PD00–PD23. These processor data lines serve to coney outgoing message information items to the transmit control 54 from the processing unit 16. The outgoing message information is provided to the processing unit 16 via lines 60 from data cell locations in the memory 18 as specified by the XAD00–XAD14 lines. Control lines 62 serve to provide control signals between the memory 18 and the processing unit 10 to synchronize the operation therebetween.

C. General transmit line GXC. This line transfers a general transmit command signal GXC from the processing unit 16 to each of the transmit line sections 58 via the central transmit control 54. The GXC line provides a start signal which enables each of the transmit line sections 58 to be put into a transmit operational mode so that each of the transmit line sections may begin requesting outgoing message information to be retrieved from the memory for subsequent transfer to the scanners.

D. Memory data available line MDA. This line provides a memory data available signal (MDA) from the processing unit 16 to the transmit control 54 whenever message information from the memory is available to the transmit control 54 on lines PD00–PD23 and when the data processor 10 is ready for a new memory address.

E. The transmit memory service request line XMSR provides an XMSR signal from the transmit control 54 to the processing unit 16 whenever the transmit control requests information to be transferred from the memory to the control 54 via lines PD00–PD23.

II. Interface lines between the central transmit control 54 and the transmit line sections 58.

A. Transmit address lines XA0–XA7. A portion of the data cell addresses provided to the memory are selectively transferred over these lines from the transmit line sections 58 to the transmit control 54 when individual ones of the transmit sections require outgoing messages to be retrieved from the memory.

B. Request transmit lines RQX0–RQX3. Each of the transmit line sections 58 provides its own RQX signal to the central transmit control 54 over these lines whenever a transmit section corresponding to a one of the RQX0–RQX3 signals requires an outgoing message or a portion of an outgoing message to be retrieved from the memory.

Figure 21:
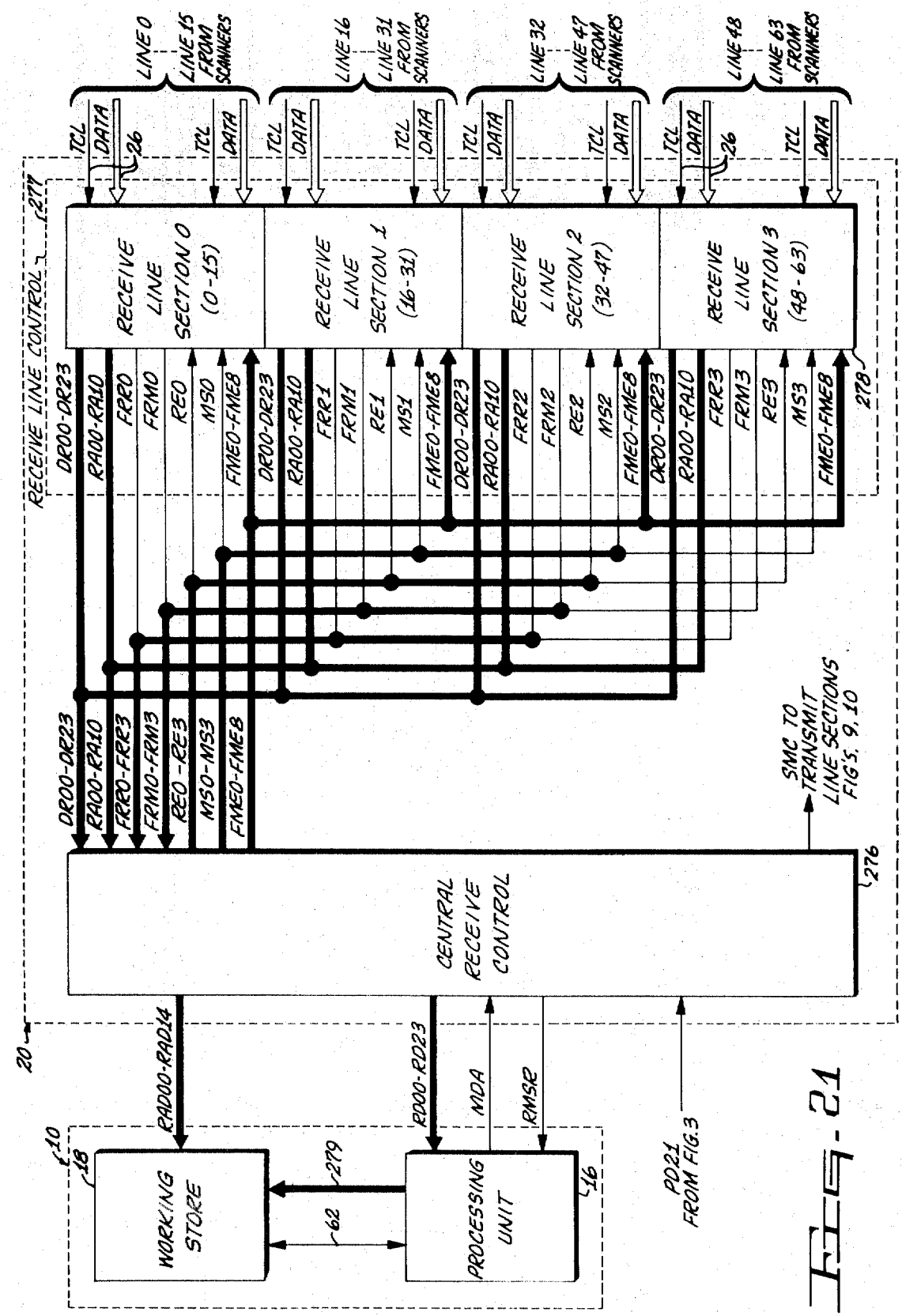
FIG. 21 illustrates the signal lines which interfere the data processor with the communication controller of FIG. 1 and the signal lines therein interfacing a central receive control with a receive line control in the communication controller.
Figure 27:
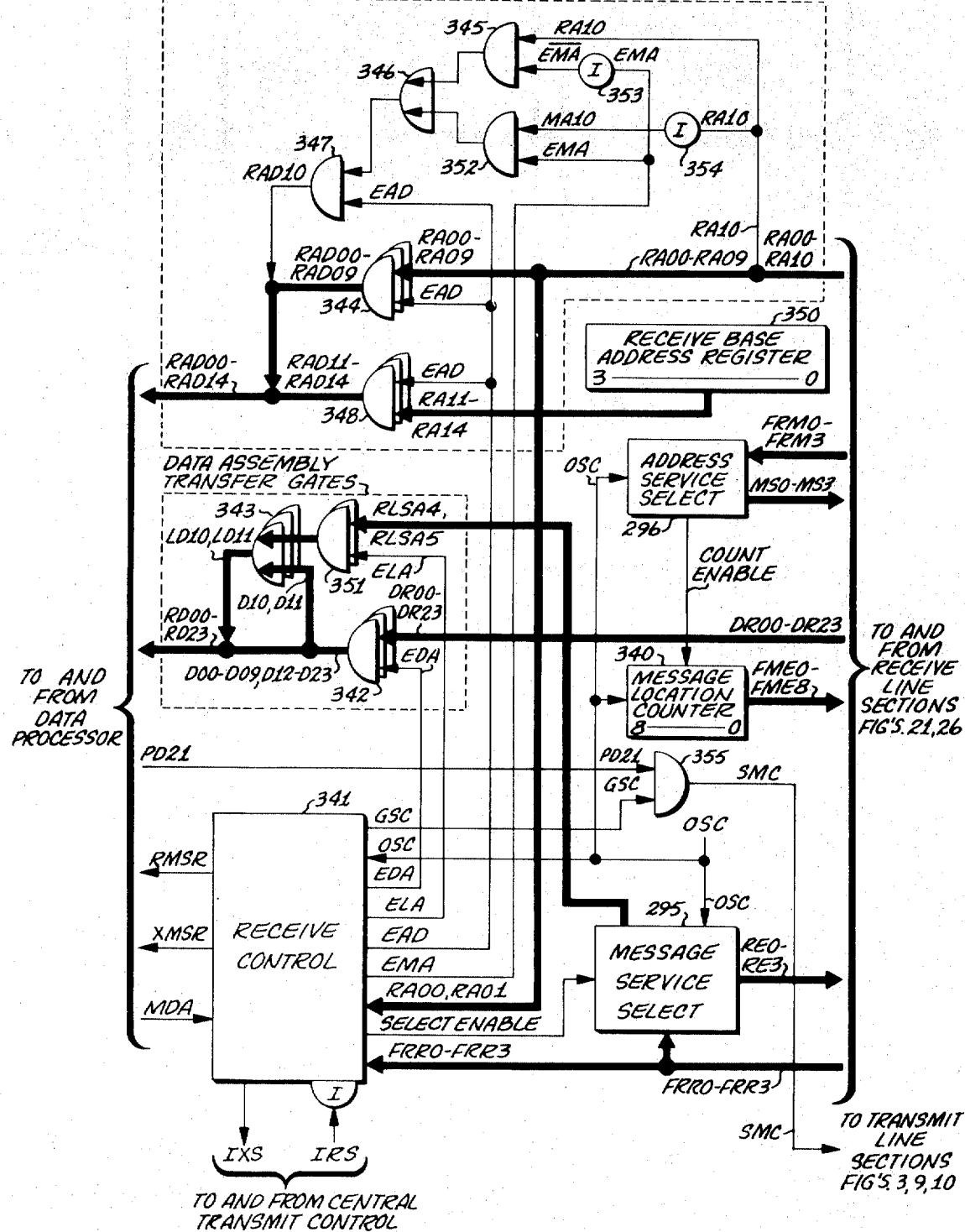
FIG. 27 constitutes a detailed schematic block diagram of the central receive control of FIG. 21.

C. Stop message request line SMR. This line conveys a stop message request signal SMR from any of the transmit line sections 58, under certain conditions, after the transmit line sections have received a stop message command signal SMC from a central receive control (FIGS. 21 and 27). The SMC line is used when the communication controller 20 is in the receive operate mode.

D. Gate data enable line GDE. This line provides a gate data enable signal GDE to each of the transmit line sections 58 whenever the transmit control 54 transfers the message information retrieved from the working store to the transmit line sections via lines DL00–DL23.

E. Transmit enable lines XE0–XE3. These lines selectively provide transmit enable signals XE0–XE3 to associated ones of the transmit line sections 58. They are used to selectively enable the transmit line sections to transfer the XA0–XA7 address signal to the transmit control 54 and to cause the selected transmit line section to receive outgoing message information via a plurality of data lines DL00–DLc) These transfer enable signals XE0–XE3 are correspondingly generated in response to the RQX0–RQX3 signals provided to the central control by the transmit line sections.

F. Data lines DL00–DL23. This plurality of lines is used to transfer outgoing message information words retrieved from the memory to individual ones of the transmit line sections in accordance with the XE0–XE3 transmit enable signals applied to each of the transmit line sections.

G. Stop message command line SMC. The stop message command line SMC is a special line used when the communication controller is in the receive mode. It provides an SMC signal to each of the transmit line sections from the central receive control (FIGS. 21 and 27) The SMC signal is used by each of the transmit line sections 58 to generate the SMR signal and RQX0–RQX3 from associated ones of the line sections 58.

Prior to proceeding further with the discussion of the communication controller 20 in the transmit mode of operation, it is well to consider the organization of the message information in the memory 18 and the manner in which the memory data cell addresses are developed by the communication controller.

Figure 7:
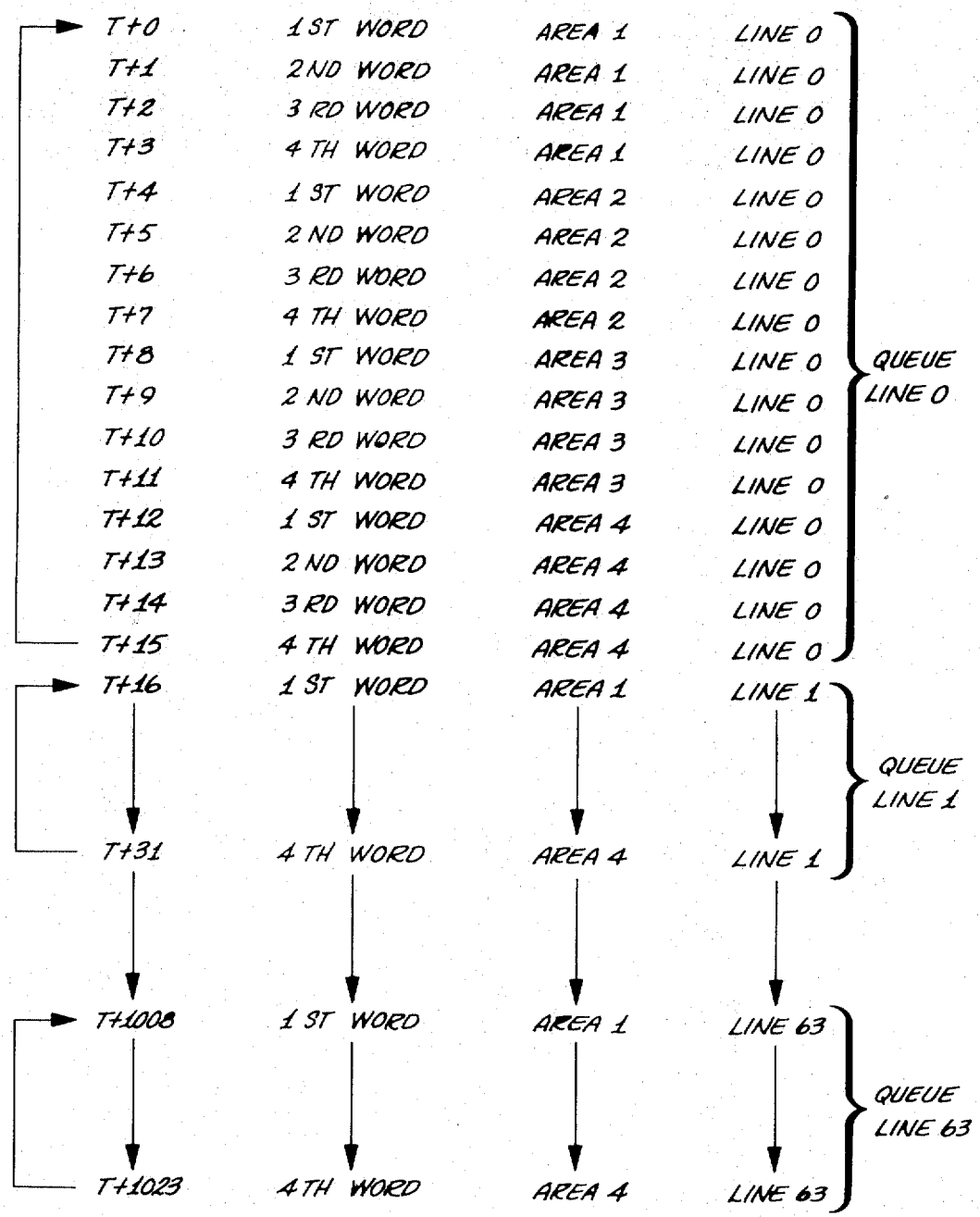
FIG. 7 is an expansion of FIG. 4 which shows in greater detail how message information is placed into the data processor working store.

In the preferred embodiment, the memory used is a coincident core memory having parallel read and parallel write capability. Messages, or portions of messages, to be transferred from the data processor to selected ones of the scanners are organized in the working store as shown by FIGS 4 and 7. The organization of outgoing message information in the memory is a function of the operating software or master program utilized by the data processor. In the memory of the preferred embodiment a 24 bit word is used which may represent an outgoing message or a portion of an outgoing message. Each word is organized, as shown in FIG. 4, into four six-bit characters each. Further, the memory words are organized into message areas of four consecutive word locations in each area. Referring to FIG. 7, there is shown a representation of the message information layout within the memory. Each of the 64 transmit data lines as shown in FIG. 3 (Line 0–Line 63) is allocated 16 word locations designated as a queue in the memory. Each of these allocated 16 word locations of the memory forms a transmit queue for retaining outgoing messages associated with corresponding ones of the transmit lines 0–63 as shown in FIG. 7. Further, the transmit queues are each separated into four distinctive message areas (Area 1–Area 4), of which FIG. 4 may be representative of a one of the message areas of FIG. 7. In addition, each of the areas is separated into four distinctive words (1st word–4th word).

In FIG. 5 there is shown a drawing representing an address format for addressing the memory transmit queues. This address format is provided to the memory on lines XAD00–XAD14 (Fig. 3). It will be noted that bits 10–14 of the address format represent a transmit base address which is shown in FIGS. 4 and 7 as T. The letter T being representative of a transmit base address or starting point for the 64 transmit line queues to be addressed in memory. It should be recalled, as shown in FIG. 3, that each of the transmit line sections 58 has associated with it 16 transmit data lines 26. Directly correspondent with each of these 16 transit lines in the various transmit sections are bits 4–7 as shown in the format of FIG. 5 in a segment designated LINE. Further as shown in FIG. 3, there is a plurality of four transmit line sections in the transmit line control 56. In the LINE segment of the address format of FIG. 5, bits 8 and 9 are used to designate four distinct addresses which are associated with individual ones of the transmit line sections 58. Thus, bits 4–7 provide 16 ($2^4$) addresses each associated with a corresponding one of the 16 transmit lines in each of the transmit line sections. When bits 8 and 9 are taken in combination with bits 4–7 the entire LINE segment of FIG. 5 provides the capability of developing 64 transmit queue addresses ($2^6$), each corresponding to a one of the Lines 0–63 of FIG. 3. Bits 2 and 3 of FIG. 5 provide an area count segment AC which provides a binary address count from 0–3, thus providing four possible message area counts for each of the queues 0–63 (FIG. 7). Bits 0 and 1 of FIG. 5 contain a WC segment (line word count), which designates the four words (1st word–4th word) which can be extracted from each given message area (Area 1–Area 4) associated with a corresponding line (Line 0–Line 63) identified by bits 4–9 in the LINE segment of FIG. 5.

As an example of the manner in which an address is constructed to retrieve outgoing message information from the memory, assume that the LINE segment, the AC, WC and base address (T) segments are all binary 0's. It should be mentioned at this time that the transmit base address segment is a constant, thus T can be any binary number from 0 through $2^5-1$. It is apparent, since the base address T can be any number as described, that the 64 queues can be located anywhere in the store according to the address specified by T.

Referring now to FIGS. 5 and 7, with the above assumptions stipulated, the LINE segment shown in FIG. 5 addresses the memory queue location corresponding to line 0 of transmit line section 0 (FIG. 3). Also, since the area count AC is binary 0's, Area 1 of Line 0 is being addressed. Further, since the word count WC and T are binary 0'S, the memory address is T+0. That is, the 1st word at location T+0 as shown in FIGS. 4 and 7, would be the first word to be retrieved from memory when the transmit control sends an address to the working store conforming to the format shown in FIG. 5. When the 1st word is retrieved from memory the communication controller 20 will examine the outgoing message word to see if it contains an SOM character in a first character position as shown in FIG. 4. The SOM character designates to the controller the start of a message from the memory. If there is no SOM character in the message, the communication controller will remain in an idle or nonactive condition and will not transmit the message. However, if the SOM character is present in the first word retrieved from memory, the controller will go into an active condition, retain the message word and being to transmit the outgoing message word to the scanner via the transmit line 26 (FIG. 3) associated with the transmit queue (Line 0) being addressed by the controller. When the controller takes the 1st word from the working store for retention, the controller updates the memory address to location T+1 as shown in FIGS. 4 and 7. The address now represents the second word of Area 1 of Line 0. This updating of the address is accomplished by counting the word count segment WC up by one (FIG. 5). The next time that Line 0 of the controller requests a word from the working store, the 2nd word from location T+1 will be retrieved and the message word T+1 will be transferred from the controller to the scanner as previously described. This retrieval of message words from memory will continue until a word is retrieved from memory which contains an EOM character (end of message). An example of the EOM character location is shown in FIG. 4 in the bottom left-hand corner of the 4th word (T+3). The EOM character may, however, be present in any character position of any word, except that if it is located in the 1st word, it should appear in the leftmost character position (T+0 in FIG. 4).

As previously mentioned, messages are transmitted on an area basis and the message words will be transmitted until an end-of-message character is detected. If an EOM is not detected anywhere in the four words of a message area which is being transmitted, then the next area will also be transmitted. In this manner areas may be linked together to form long messages.

In FIG. 4 there is shown an AT character left of and adjacent to the SOM character in the 1st word. This AT character is present in the 1st word of each new outgoing message retrieved from the memory by the controller. When a one of the scanners receives the second character (AT) of a message, the scanner utilizes the character as a terminal address to direct the message to a one of the terminals as specified by the AT character.

Still referencing FIG. 4, the data characters which make up that part of the message structure, excluding the SOM, AT and EOM characters, is shown. The message words are sequentially retrieved in parallel from the memory transmit line queues by areas, beginning with the 1st word through to the 4th word. After the messages are retrieved from memory they are transferred in serial form from the controller to the various scanners, in the message format as shown by FIG. 6.

FIG. 6 shows the serial message format where the SOM character precedes the AT character and where the 1st to the Nth data characters follow the AT characters.

The EOM character is shown following the Nth data character, thus signifying the end of a complete outgoing message from a one of the transmit memory queues. Comparing FIGS. 4 and 6, it is seen that the 1st word in FIG. 4 corresponds to the four characters, SOM, AT, 1st data character and 2nd character of FIG. 6. All characters which follow the 2nd character in FIG. 6 can similarly be grouped into four character words as they appear in FIG. 4 in the 2nd through the 4th word locations. This comparison of FIGS. 4 and 6 shows that the outgoing message words retrieved from memory are organized by the controller into a single message for serial transmission to the various scanner devices.

Figure 8:
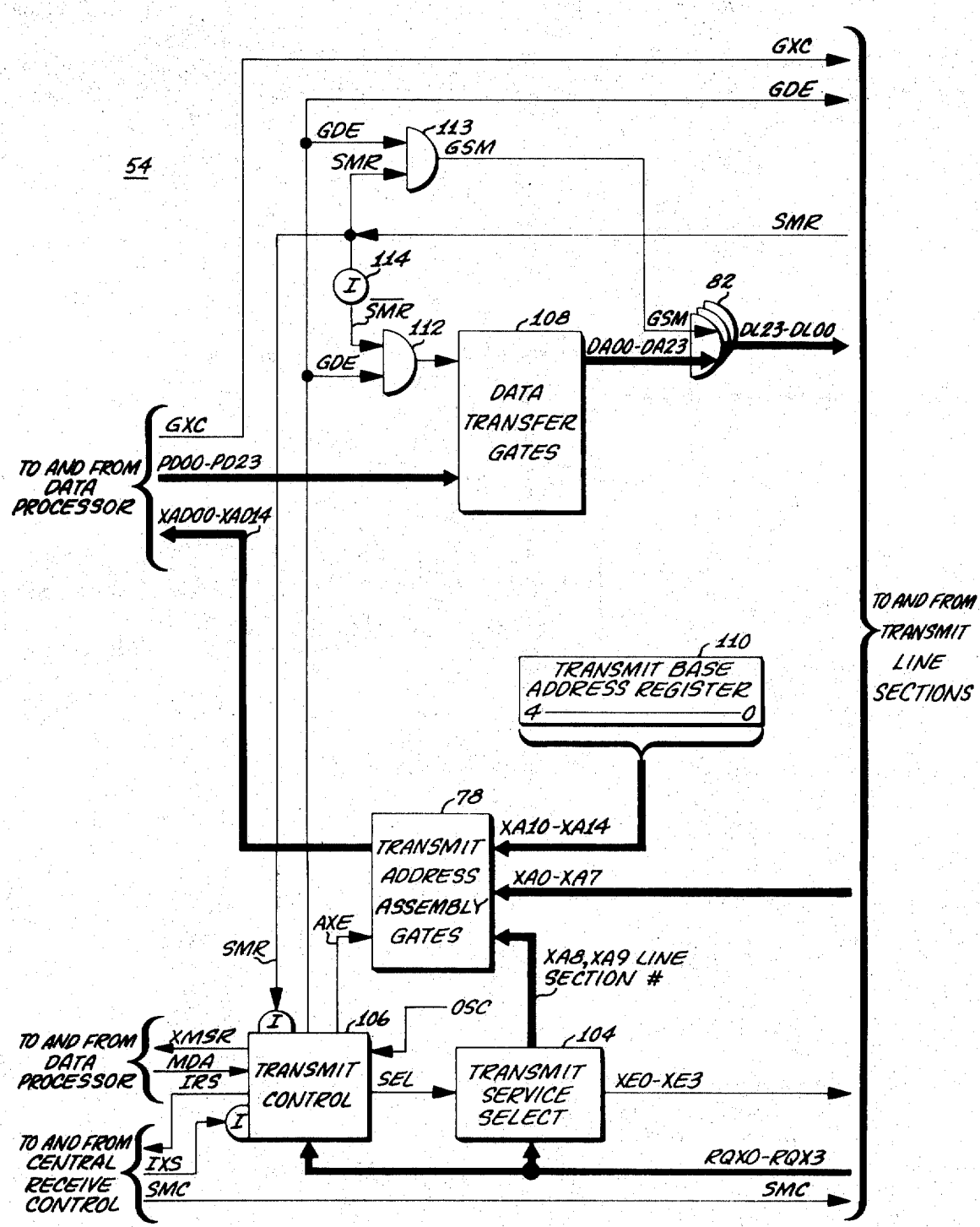
FIG. 8 is a detailed schematic block diagram of the central transmit control of FIG. 3.
Figure 9:
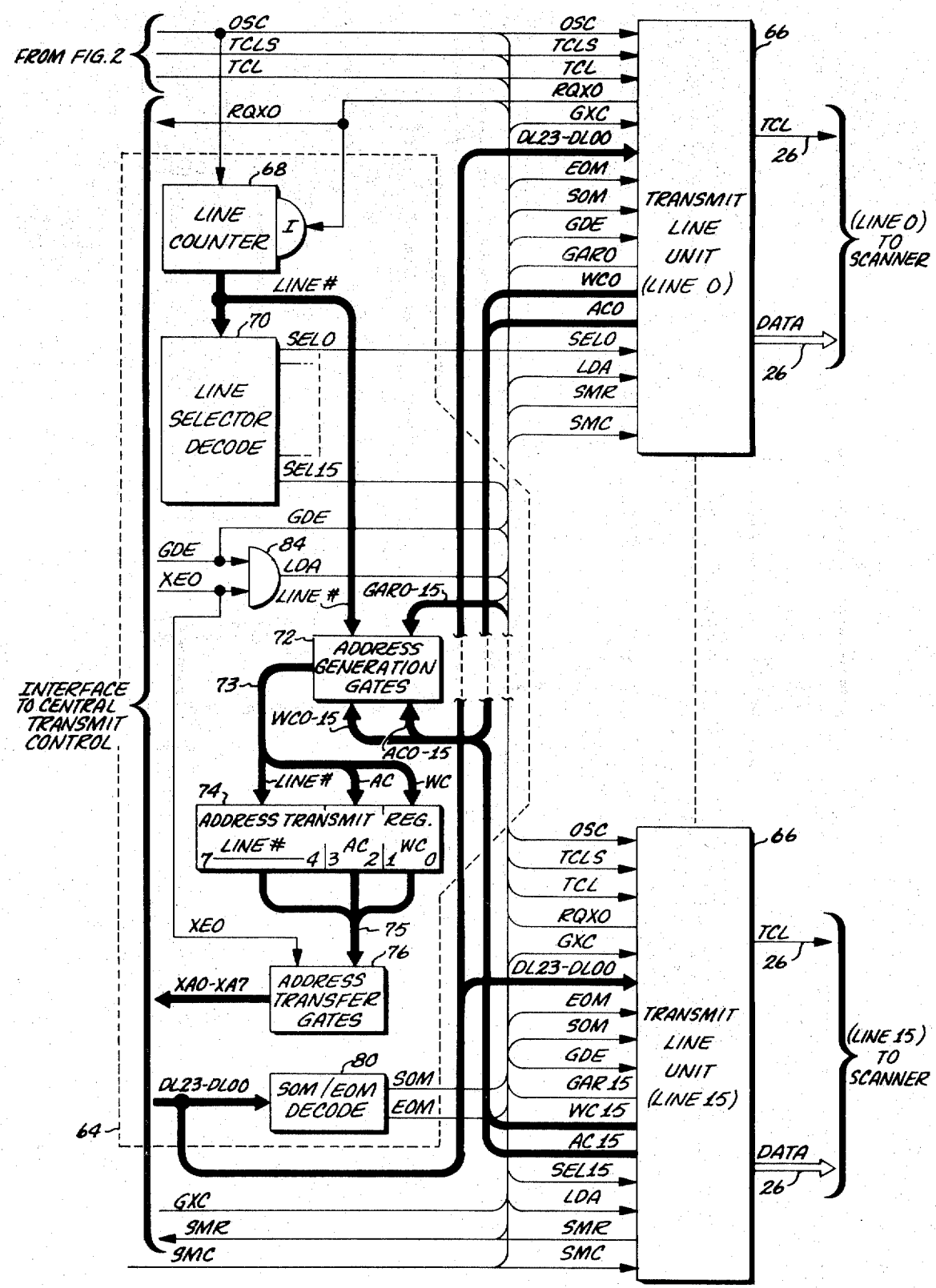
FIG. 9 is a detailed schematic and block diagram of a one of the transmit line sections of the transmit line control of FIG. 3.
Figure 10:
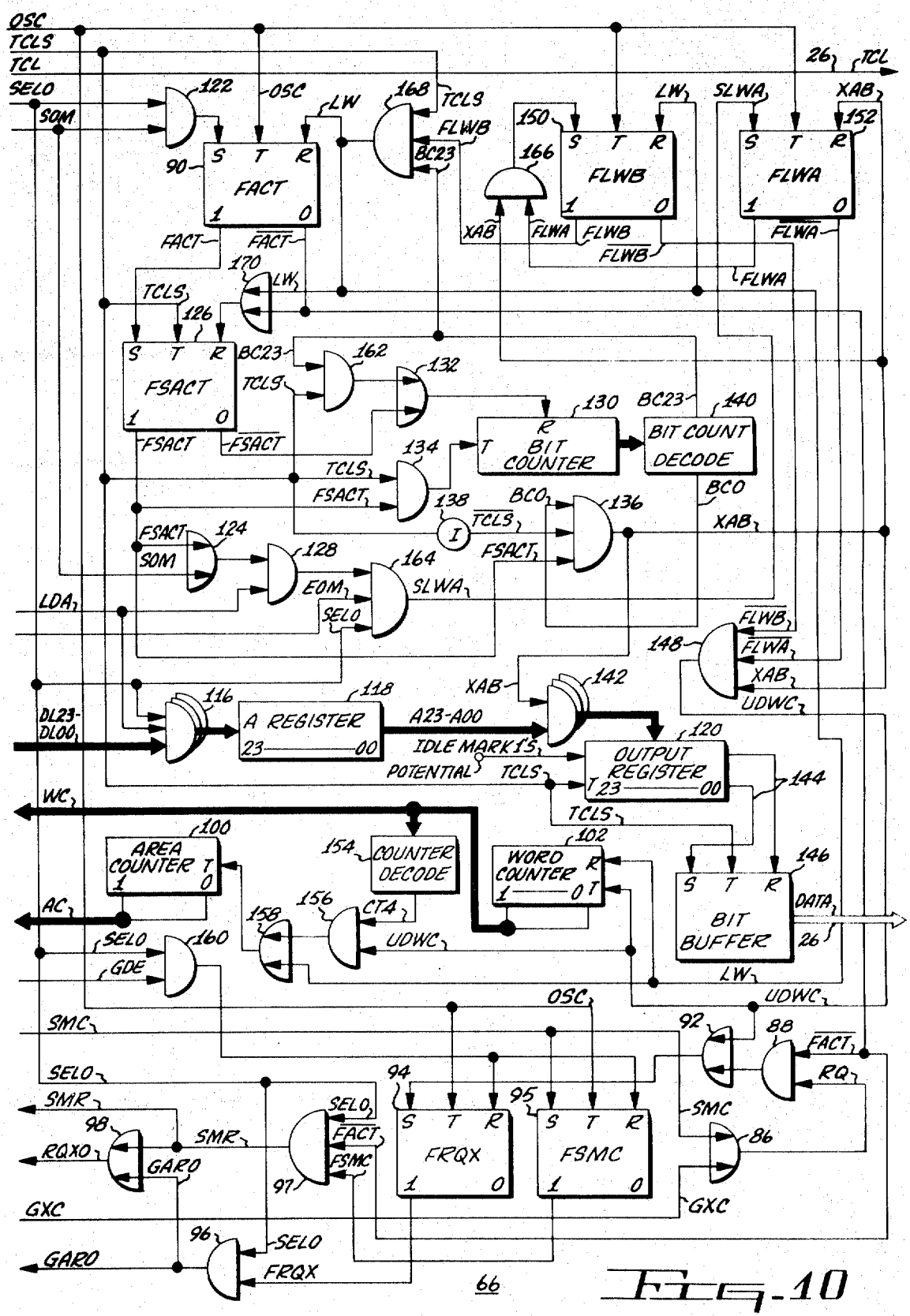
FIG. 10 is a detailed logic schematic of a one of the transmit line units of FIG. 9.

Reference is now made to FIGS. 8, 9 and 10 in combination. Referring first to FIG. 9, there is shown a typical one of the plurality of transmit line sections 58 as shown in FIG. 3. Included within each transmit line section 58 is a common logic 64 and a plurality of transmit line units 66, designated Line 0–Line 15 respectively. Each of the line units 66 is capable of transferring outgoing message information to a one of the scanner devices 22 (FIG. 1) connected thereto. Since, in the present embodiment each of the transmit line sections 58 are similar in their logic design and operation, only the operation of the transit line section pertaining to line section 0 (FIGS. 3 and 9) will be described. Further, since each of the 16 transmit line units 66 of the transmit line sections 58 functions in a similar manner, only the transmit line unit (Line 0) of transmit line section 0 will be described (FIGS. 9 and 10).

The common logic 64 includes a plurality of functional logic blocks which interface the line section 58 with the central transmit control 54 (FIGS. 3 and 8) and the transit line units 66. This common logic 64 operates in common with all of the transmit line units 66 to control the transfer of outgoing messages into the line units 66 and for selectively developing at least a portion of each of the transmit queue addresses for the memory in response to address indicia generated therewithin and further in response to additional address indicia provided thereto from the line units 66.

Placing FIGS. 8 and 9 side by side with FIG. 8 to the left of FIG. 9, it is possible to trace the interface lines between the two figures. Referencing FIG. 8, there is shown in block diagram form the central transmit control 54 of FIG. 3. The logic of FIG. 8 serves to provide a transfer control means for transferring address information to data cells in the memory and for retrieving outgoing message information from the memory for transfer to the transmit line sections 58 (FIGS. 3 and 9). Message information is retrieved from the memory under control of the central transmit control 54. It is then transferred to the common logic 64 (FIG. 9) where the information is disbursed to various ones of the scanner devices 22 (FIG. 1) via the transmit line units 66 (Lines 0–15) of FIG. 9 in accordance with the data cell addresses provided to the memory.

As shown in FIG. 9, the common logic 64 is comprised of a binary line counter 68 which receives the clock timing signal OSC from FIG. 2 at a trigger input terminal T. This OSC signal causes the counter to count up by 1 each time it is applied thereto. The line counter 68 also has an inhibit input terminal I, which receives the RQX0 signal from transmit line unit 66, Line O. When the RQX0 signal is not present at the I terminal, the line counter 68 counts continuously from 0 through 15, back to 0, etc. However, when the RQX0 signal is present at I terminal the line counter 68 will be inhibited from counting. Thus, the line counter 68 may be arbitrarily stopped by the RQX0 inhibit input signal at whatever line number count it happens to be on at the time that the RQX0 signal appears at the I terminal. Line counter 68 also provides a plurality of output lines designated Line # to a line selector decode 70 and to an address generation gates 72.

The line selector decode 70 and the line counter 68 in combination comprise a line selector for providing a plurality of binary address Line # output signals to the address generation gates 72 and for providing a plurality of select signals SEL0–SEL15 corresponding to the Line # signals from the line selector decode 70 to individual ones of the transmit line units 66. The line selector and the address generation gates 72 function together to select individual ones of the line units 66 and to simultaneously generate a first portion of a data cell address which corresponds to the line units 66 individually selected by the line selector. This simultaneous function is accomplished as follows. The line selector decode 70 responds directly to the output Line # signals from the line counter 68 as does the address generation gates 72. Whenever the line counter 68, for example, is at a binary count of 0, the line selector decode 70 will decode the binary 0 count to provide an SEL0 output signal to select transmit line unit (Line 0) for a transmit operation. The address generation gates 72 are also receiving, at the same time, Line # signals from the line counter 68 to generate the first portion of a data cell address corresponding to the transmit line unit (Line 0) selected by the selector decode 70.

The address generation gates 72, which provide an address generation means for generating data cell addresses, also receives a plurality of word count input signals WC0–15 from associated ones of the transmit line units 66. Similarly, the generation gates 72 receive a plurality of area count input signals AC0–15 from corresponding ones of the transit line units 66. That is, WC0 and AC0, which represent a second portion of a data cell address, are supplied to generation gates 72 from line unit 66 (Line 0), WC1 and AC1 from line unit 66 (Line 1), etc. The generation gates 72 further receive a plurality of input signals GAR0–15 (gate address register) from individual ones of the transmit line units 66 in a manner similar to the AC0–15 and WC0–15 signals. Only one of the GAR0–15 signals will be present at the generation gates 72 at any one time. Therefore, the first and second data cell address information provided to generation gates 72 by the Line # signals from the line counter 68, and word count signals WC0–15 and the area count signals AC0–15 from line units 66 will be selectively gated through the address generation gates 72 into an address transmit register 74 in accordance with the occurrence of the GAR0–15 signals from the line units 66.

The address information generated by the address generation means 72 is provided through a plurality of lines 73, designated Line #, AC (area count) and WC (word count) to an address transmit register 74.

The address transmit register 74 is implemented in such a fashion that it will directly follow the output signals, Line #, AC and WC from the generation gates 72. Contained within the address register 74 are three address fields, Line #, AC and WC, which provide data cell output signals via a plurality of lines 75 to an address transfer gates 76. Supplied to the address transfer gates 76 from FIG. 8, is a transmit enable, transmit line section 0 signal XE0. The XE0 signal is utilized by the address transfer gates 76 to transfer that portion of the data cell address contained in the address transmit register 74 via lines XA0–XA7 to transmit address assembly gates 78 of the central transmit control 54 (FIG. 8).

Referring again to the common logic 64 of FIG. 9, there is shown an SOM/EOM decode 80. This decode 80 receives outgoing messages or portions of outgoing messages via data lines DL23–DL00 from a plurality of AND-gates 82 (Fig. 8). The DL 23–DL00 lines provide a common transfer path for the transfer of outgoing message information from the memory into selected ones of the transmit line sections 58 and to selected ones of the line units 66 as shown in FIG. 9. It should be recalled from the previous description that when the first word of a new outgoing message is retrieved from memory and when the word is transferred into the communication controller, the controller performs a check to determine if a start-of-message character SOM is present in the message being retrieved. Detection of this SOM character is performed in the SOM/EOM decode 80. Whenever an SOM character is present in the first message word retrieved from memory, the SOM/EOM decode 80 generates an SOM signal which is applied to each of the transmit line units 66. As will subsequently be described, this SOM signal is utilized by the transmit line units to place them into an active condition for the transmission of outgoing messages to the scanners.

Whenever the communication controller 20 (FIG. 9) retrieves a message word from a one of the transmit queues in memory, the communication controller will perform a check to determine if there is an EOM character present in that message word. When an EOM character is detected by the SOM/EOM decode 80, the SOM/EOM decode will generate an EOM signal, which is also applied to each of the transmit line units 66. Also, as will be subsequently described, the EOM signal is utilized within the transmit line units 66 to place them into an inactive or idle condition in preparation to receive a new outgoing message from memory.

The message information provided to the common logic 64 on the data lines DL23–DL00 is also provided to each of the transmit line units 66 as shown in FIG. 9. As will be later described, the message information transferred over these lines is forwarded to the transmit line units 66 on a selective basis, as determined by the line selector decode 70 which provides the output select signals SEL0–SEL15.

Also included in the common logic 64 is an AND-gate 84 which generates a load data signal LDA in response to the XE0 (transmit enable) and GDE (gate data enable) signals provided thereto from the central transmit control of FIG. 8. The purpose of these two signals will be made clear in the subsequent discussion of the transmit line unit, Line 0, in FIG. 9.

In further explanation of the transmit operation of the controller of FIGS. 8, 9 and 10, assume that the RES signal has been applied to all of the control flip-flops, counters, shift registers and control logic in the communication controller 20 as described in the system clock generation of FIG. 2. The established conditions at this time are that the entire communication controller is in a nonactive or idle condition, and the system clock counters are counting. Thus, the clock system of FIG. 2 is generating clock signals OSC, TCL and TCLS for use in the transmit operating mode. In the present embodiment, an idle condition exists when the serialized data being transferred, bidirectionally, between the controller 20 and the operator terminals 14 via lines 26 and 30 is a constant string of binary 1 signals at least one character length in duration. Further, the EOM character is also considered to be a character of all binary 1 bits.

Proceeding now with the transmit operation description, assume that the data processor executes an internally generated command which causes the GXC, general transmit command signal, to be applied to each of the transmit line units 66 as shown in FIG. 9. Referring now to FIG. 10, to the transmit line unit, Line 0, is described. The GXC signal is applied to an OR-gate 86 which in turn applies an RQ request signal to an AND-gate 88. The other input to AND-gate 88 is a $\overline{FACT}$ (not active) signal from a FACT flip-flop 90. Since, at this time, all control flip-flops within the communication controller are in the reset state, the $\overline{FACT}$ signal will cause AND-gate 88 to be enabled and provide an output signal to an OR-gate 92, which provides a binary 1 set input signal to an S input terminal of an FRQX (request transmit) flip-flop 94. The FRQX flip-flop 94 is placed in a set state when the OSC timing signal from the timing generator, FIG. 2, is applied to a T (trigger) input terminal thereof. When flip-flop FRQX sets, a 1 output terminal thereof will provide an FRQX signal to an AND-gate 96. In the present discussion, since the line unit for Line 0 is being discussed, the line selector decode 70 is generating an SEL0 signal to enable AND-gate 96 which generates a GAR0 (gate address register) output signal. The GAR0 signal is simultaneously applied to an OR-gate 98 and to an address generation gates 72 of FIG. 9. The output of OR-gate 98, in response to the GAR0 signal, provides an RQX0 signal (request transmit line section 0) to the central control transmit section of FIG. 8. The RWX0 signal is also applied to the inhibit (I) input terminal of the line counter 68 (FIG. 9). The RQX0 signal will inhibit the line counter 68 from counting until the RQX0 signal is removed. Thus, the line counter 68 will remain in the binary 0 count condition for the duration of the RQX0 signal.

Since the line counter 68 is inhibited on a binary 0 count, the Line # input signals to the address generation gates 72 are representative of an address corresponding to Line 0, and the line selector decode 70 is providing a corresponding SEL0 output signal to select transmit line unit, Line 0.

Referring once again to FIG. 10, attention is called to an area counter 100 and a word counter 102. The area counter 100 provides a plurality of area count signals AC to the address generation gates 72 of FIG. 9. The AC signals are representative of the area count (AC) corresponding to a portion of a memory data cell address as shown in the address format of FIG. 5. The word counter 102 provides a plurality of word count output signals WC to the address generation gates 72. The AC signals and the WC signals each provide a portion of a memory data cell address as shown in FIG. 5.

Since all counters within the communication controller are in a reset state, the outputs of both the area counter 100 and the word counter 102 are presently representative of a binary 0 count. In addition, since the line counter 68 (FIG. 9) is also a binary 0 condition the Line # signals applied to generation gates 72 are also representative of a binary 0 address. Thus, the address being generated by address generating means 72 will be representative of memory location T+0 as shown in FIG. 7. It will be recalled that the GAR0 signal is applied to address generation gates 72, which in response thereto, gate the generated address (T+0) to the transmit address register 74 via lines 73.

The RQX0 signal generated by OR-gate 98 of the transmit line unit (Line 0) of FIG. 10 is applied (via FIG. 9) to a transmit service select 104 and a transmit control 106 of FIG. 8. The RQX0 output signal from each of the several transmit line units is bussed together into a common RQX0 signal, thus indicating that a particular transmit line section (line section 0 in the present discussion) is requesting a transmit service select from the transmit service select 104 in FIG. 8.

The transmit service select 104 is basically a priority selector device. It selectively provides output signals XE0–XE3 to associated ones of the transmit line sections 58 (FIGS. 3 and 9) in order to grant the line sections access to the memory via the central transmit control 54 (FIGS. 3 and 8). The granting of access requests by the service select 104 is accomplished by simultaneously sampling each of the RQX0–RQX3 request signals applied thereto by the transmit line sections 58. This sampling is done on a periodic basis by an SEL signal applied to the service select 104 from the transmit control 106. In the course of this simultaneous sampling, the service select dynamically assigns a higher access priority to one of the transmit line sections 58 in a manner dependent upon the last line section granted access and further dependent upon which of the several line sections 58 requested access between the samplings. In addition, the service select 104 provides a plurality of output transmit address signals XA8 and XA9 to transmit address assembly gates 78. These XA 8 and XA 9 signals are representative of the line section numbers (section 0–section 3) of the transmit line sections selectively granted access to the memory by the XE0–XE3 signals from the service select 104. In the present discussion, these address signals, XA8 and XA9, represent an address corresponding to transmit line section 0 in response to the RQX0 signal from section 0, since the XE0 signal is granting line section 0 access to the memory. These line section number address signals XA8 and XA9 represent a portion of the data cell address and constitute a third part of the complete data cell address. For a more thorough understanding of the transmit service select 104, reference is made to copending application Ser. No. 829,925 filed June 3, 1969, entitled, "Priority Selector," and assigned to the assignee of the present invention.

Upon the application of the RQX0 signal to the transmit service select 104 and the transmit control 106, the XE0 signal is generated when the select signal SEL is applied to the transmit service select 104 from the transmit control 106. The transmit control 106 generates the SEL signal in response to the application thereto of the RQX0 signal, the absence of an IXS signal applied to a first inhibit terminal I thereof, and the presence of the OSC signal from the master oscillator 32 (FIG. 2). When the IXS signal from the receive control 341 of FIG. 27 is a binary 1 it prevents the transmit control 106 from going into a transmit sequence. At the same time the SEL signal is generated, the transmit control 106 provides an XMSR (transmit memory service request) signal to the processing unit 16 (FIG. 3). This XMSR signal is generated in response to the RQX0 signal, the OSC signal and the absence of an SMR signal (stop message request) applied to a second inhibit terminal I of the transmit control 106. The data processor utilizes the XMSR signal to recognize that the communication controller 20 is requesting a message, or a portion of a message to be retrieved from the memory from the data cell location specified by the XAD00–XAD14 address lines.

When the memory is free, the data processor will retrieve the message word from the memory. Simultaneously, the processor will provide an MDA (memory data available) signal to the transmit control 106 and the message word to a data transfer gates 108 via the PD00–PD23 lines. The operations performed upon the message information received by the transfer gates 108 will be subsequently described.

The XE0 signal is applied to an AND-gate 84 and to address transfer gates 76 (FIG. 9). The application of XE0 to address transfer gates 76 will cause the contents of the address transmit register 74 to be transferred through gates 76 to the transmit address assembly gates 78 of FIG. 8 via lines XA0–XA7. Additional inputs are provided to the address assembly gates 78 from a transmit base address register 110 via a plurality of address lines XA10–XA14. The transmit base address register 110 is shown to be representative of a constant base address which is combined with the portions of the memory address supplied thereto on lines XA0–XA7, XA8 and XA9. The XA10–XA14 address lines define a relocatable starting point in the memory (location T) for the beginning of the 64 transmit queues illustrated in FIG. 7. The transmit base address register 110 is illustrative of a means of providing constant address information to the memory as the base address could be provided by any suitable means; for example, through a plurality of switches corresponding to the address lines XA10–XA14. Also provided as another input to the address assembly gates 78 is an AXE signal (address transfer enable) from the transmit control 106. The AXE signal is utilized by the address assembly gates 78 to transfer the three portions of the memory address provided to the assembly gates 78 to the memory via lines XAD00–XAD14.

When the central transmit control 54 receives any one of the RQX0–RQX3 signals (RQX0 in the present illustration) the transmit control 106 provides the AXE signal to assembly gates 78 in response to the application thereto of the OSC signal. It is at this time that the memory address is transferred to the working store via lines XAD00–XAD14, along with the XMSR signal as previously described.

AND-gate 112 (FIG. 8) receives two input signals, a GDE signal (gate data enable) from the transmit control 106 and a $\overline{SMR}$ signal from an inverter 114. The GDE signal is generated by the transmit control 106 in response to the MDA signal, any one of the RQX0–RQX3 signals and the OSC signal. Since the RQX0 signal is still present at the transmit control 106, the GDE signal is generated when the processing unit provides the MDA signal. Assuming that the $\overline{SMR}$ signal is present at this time, AND-gate 112, is, therefore, enabled. Thus, the message information on lines PD00–PD23 is transferred through the data transfer gates 108 to a plurality of OR-gates 82 via lines DA00–DAc) The message information on lies DA00–DA23 is passed through the OR-gates 82 to each of the transmit line sections 58 via a plurality of lines DL23–DL00. The transfer path for this message information to each of the transmit line sections is shown in FIGS. 3 and 9. It is also shown in FIG. 9 that each of the transmit line units 66 within each of the transmit line sections 58 receives the message information on lines DL23–DL■ )

Referring now to FIG. 10, a plurality of AND-gates 116 receive as one input thereto the message information on lines DL23–DL00. A second input is the SEL0 signal provided thereto by the line selector decode 70 of FIG. 9 and a third input is a signal LDA which emanates from AND-gates 84 (FIG. 9). Since at the beginning of the present discussion it was assumed that Line 0 is being selected, AND-gates 116 are enabled for the parallel transfer of message information therethrough into an A register 118, where the information is temporarily stored for subsequent transfer to an output register 120.

Assuming that the special SOM character is present in the word just retrieved FSACT the processor memory, the SOM signal from decode 80 (FIG. 9) is applied as one input to an AND-gate 122 and to an OR-gate 124 (FIG. 10). The other input to AND-gate 122 is the SEL0 signal from the selector decode 70 (FIG. 9). Since line 0 is being selected by the line select decode 70, AND-gate 122 is enabled to apply a set input signal to an S terminal of a FACT flip-flop 90 which will then achieve a set state upon the occurrence of the OSC signal applied to a trigger input terminal T thereof. When the FACT flip-flop goes into a set state, a 1 output terminal thereof will provide a FACT set signal to an S terminal of a FSACT sync active flip-flop 126. The FSACT flip-flop 126 has applied to a trigger input T thereof the TCLS transmit clock synchronization signal from FIG. 2. Thus, upon the application of the TCLS signal, the FSACT flip-flop will achieve a set state. The setting of the FSACT flip-flop places the transmit line unit, line 0, in an active operating condition or mode such that this unit may now begin to receive further message words, if required, from the data processor each time the transmit line, line 0, provides an RQX0 signal to the central transmit control 54.

OR-gate 124, which also receives the SOM signal from the SOM/EOM decode 80, transfers this signal to an AND-gate 128. AND-gate 128 receives as a second input an LDA signal from AND-gate 84 (FIG. 9). As previously described AND-gate 84 is enabled each time transmit line section 0 is selected by the XE0 signal and when the GDE signal gates the message information from the central control (FIG. 8) to the line sections.

When the FSACT flip-flop 126 is in a reset state, an $\overline{FSACT}$ signal from its 0 output terminal is applied as a reset signal to an R input terminal of a bit counter 130 via OR-gate 132. In this manner, bit counter 130 is held in a reset condition and prevented from counting until the transmit line unit achieves an active state; i.e., the FSACT flip-flop achieves a set state.

Recalling that the FSACT flip-flop 126 is presently in a set state, the one output terminal thereof provides the FSACT signal to AND-gate 134. The TCLS signal is also applied to AND-gate 134 to thereby enable this gate. Gate 134 will thus apply a count signal to a T terminal of the bit counter 130, causing the counter to count up one for each count signal applied thereto. In this manner the bit counter 130 counts in synchronization with the occurrence of each synchronized transmit clock signal TCL which is transferred to the scanner via lines 26.

The 1 output terminal of the FSACT flip-flop 126 is also applied to an AND-gate 136. Other inputs to AND-gate 136 are a $\overline{TCLS}$ signal from an inverter 138 which occurs during the absence of the TCLS signal and a BCO signal (bit count=0) from a bit count decode 140. Since it was assumed at the beginning of the present discussion that all counters within the transmit line units were reset to binary 0's, the output of the bit counter 130, which applies a binary bit count to the bit count decode 140, is representative of binary 0's. Thus, the output (BCO) of bit count decode 140 is representative of the binary 0 count of counter 130. With the presence of the BCO and FSACT signals at AND-gate 136, when the $\overline{TCLS}$ is applied thereto, gate 136 will be enabled to generate an XAB signal (transfer A register to buffer register).

The XAB signal is applied to a plurality of AND-gates 142, which also receives the message from the A register 118 via A register lines A23-A00. Upon the application of the XAB signal to gates 142, the word contained in the A register 118 is parallel transferred into the output or buffer register 120. The TCLS signal is applied to a trigger input terminal T of the output register 120 for serially shifting the message information contained therein out of the output register 120 via lines 144, which are connected to S (set) and R (reset) input terminals of a bit buffer 146.

The bit buffer 146 is also shifted or triggered by the TCLS signal which is applied to a T input terminal thereof. The shifting operation of the output register 120 and the buffer 146 is such that each time the register 120 is shifted one bit, the message bit which is in the bit buffer 146 is shifted to the data line 26 in synchronization with the TCLS signal. The data line 26 is connected to an associated one of the scanners 22 (FIG. 1). Simultaneously, when the message bit is shifted out of buffer 146, the bit in the least significant bit position (position 00) of the output register 120 is shifted into the bit buffer 146. It is significant to note that an idle mark 1's potential line is connected to the output register 120. The purpose of this idle mark 1's potential is to insert a binary 1 bit into the bit position 23 of the output register each time the output register is shifted. In this manner, the data communication system of the present embodiment may transmit a constant stream of binary 1 bits from the output register 120 to the bit buffer 146 over the data lines 26 to each of their associated scanners when a transmit line is in an idle or nonactive state. As was previously mentioned, a string of binary 1's at least one character in length is recognized in all parts of the system as the designation of an end of a message (see EOM FIG. 4).

Still with reference to FIG. 10, the XAB signal is also applied to an AND-gate 148. Other inputs to AND-gate 148 are an $\overline{FLWB}$ signal and an $\overline{FLWA}$ signal from a 0 output terminal of two flip-flops FLWB 150 and FLWA 152 respectively. Since, at the present time, these two flip-flops are each in a reset state, AND-gate 148 will be enabled to develop a UDWC output signal (update word count) which is applied to a trigger input terminal T of a word counter 102, thus triggering the word counter to count up by one.

The output of the word counter 102 forms the (WC) portion of the memory queue address for the development of the subsequent address to be used for retrieving the next message word required by this line unit from the memory. The output of the word counter 102 is applied through a plurality of WC lines to a counter decode 154 which recognizes when the word counter 102 achieves a binary count of four. When this occurs, the counter decode 154 will provide a CT4 signal as one input of an AND-gate 156. AND-gate 156 also receives the UDWC signal from AND-gate 148. Thus, when the CT4 signal is present concurrently with the UDWC signal, AND-gate 156 will provide an output signal via an OR-gate 158 to a T input terminal of an area counter 100. Area counter 100 will thus count up once for each four words retrieved from the memory. When the area counter 100 achieves a binary count of 3, it will roll over to 0 upon application of the next count signal from OR-gate 158. In this manner, Area 1 is addressed in the same manner as when the RES signal was applied thereto from FIG. 2.

It will be recalled that the GDE signal is generated by the central transmit control 54 (FIG. 8) when a message word is transferred from the data transfer gates 108 to the transmit line units 66. Referring now to FIG. 10, an AND-gate 160 receives as one input the GDE signal and as a second input the SEL0 signal from selector decode 70 (FIG. 9). These two input signals will cause AND-gate 160 to be enabled and to apply a reset signal to an R input terminal of each two flip-flops, FRQX and FSMC, 94 and 95 respectively. Since each of these flip-flops is triggered upon the application thereto of the OSC signal at a T input terminal, they are both placed in a reset state at the time each message word is transferred into the A register 118 from the transfer gates 108 (FIG. 8). This, when the FRQZ and FSMC flip-flops 94 and 95 achieve a reset state, the request signal RQX0 issuing from OR-gate 98 is terminated, which in turn removes the RQX0 request from the transmit service select 104 (FIG. 8).

The FRQX flip-flop must again achieve a set state in order to request access to memory for another message word. This occurs when the UDWC signal, which is applied to OR-gate 92, causes OR-gate 92 to provide an output set signal to a set input terminal (S) of the FRQX flip-flop 94. Thus, when the A register 118 is transferred to the output register 120, the word counter 102 is updated (area counter 100 being updated as necessary) and the FRQX flip-flop 94 is placed in the set condition upon the occurrence of the OSC signal. This conditions a transmit line unit to request access to the memory for another message word.

Bit counter 130 began counting on the first TCLS signal applied to AND-gate 134 after the FSACT flip-flop 126 was placed in a set condition. So long as the FSACT flip-flop remains in the set condition, bit counter 130 will continue to count on each TCLS signal. As the binary count output signals of the bit counter change, the bit count decode outputs will change to provide two decoded output signals BC0 and BC23. When the bit count decode BC0 output signal is removed from AND-gate 136, the XAB signal is no longer generated. When the bit counter 130 reaches a binary count of 23, thus signifying the completion of the transfer of an entire 24 bit message word from the output register 120, the bit count decode 140 will develop the BC23 output signal which is applied to an AND-gate 162. The other input to AND-gate 162 is the TCLS signal. The output of AND-gate 162 provides a reset signal through OR-gate 132 to a R (reset) input terminal of the bit counter 130. This will reset the bit counter to all binary 0's, thus conditioning the bit counter to again begin to count out the message bits as they are shifted out of output register 120.

Referring now to FIG. 9, when a message word containing an EOM character is transferred from the memory to the SOM/EOM decode 80 it generates an EOM signal which is applied simultaneously to each of the transmit line units, lines 0–15.

As shown in FIG. 10, this EOM signal is applied to an AND-gate 164, which also receives the SEL0 signal and the output of AND-gate 128 whose inputs are the FSACT signal from the FSACT flip-flop 126, via an OR-gate 124, and the LDA signal from FIG. 9. AND-gate 164 is thus enabled to generate a SLWA (set last word in A register) signal, which is applied to a set input terminal of a FLWA flip-flop 152 (last word in A control flip-flop).

The FLWA flip-flop 152 will achieve a set state upon the occurrence of the OSC signal applied to its T input terminal. When the FLWA flip-flop achieves a set state, a 1 output terminal thereof will supply a FLWA signal to an AND-gate 166. The setting of the FLWA flip-flop is indicative of the receipt of the end of a message (EOM) character. Therefore, the transmit line logic must be conditioned to transfer the last portion of the message from the A register 118 into the output register 120 and to then revert to an inactive status or idle condition.

The XAB signal forms the second input to AND-gate 166. When the XAB signal is generated in the manner as previously described, AND-gate 166 will generate an output signal, which is applied to an S input terminal of a FLWB flip-flop 150 (last word in buffer). The FLWB flip-flop will then be placed into a set state upon the occurrence of the OSC signal applied to its T input terminal. The setting of the FLWB flip-flop signifies that the last word of the message has been transferred to the output register 120 and that the transmit line may revert back to an inactive state upon transfer of the remainder of the message to the scanner.

When the FLWB flip-flop 150 achieves a set state, a signal from a 1 output terminal thereof is applied to an AND-gate 168. AND-gate 168 is also receiving as inputs the TCLS and the BC23 signals, the latter signal coming from the bit count decode 140, and indicating that the last bit of the message word has been transferred from the output register 120 to the scanner 22. Upon the concurrence of the FLWB, BC23 and the TCLS signals, AND-gate 168 is enabled to generate a last word signal LW, which is applied to a reset input terminal R of FACT flip-flop 90. Thus, FACT flip-flop 90 will reset upon the occurrence of the next OSC signal applied to its T terminal. When the FACT flip-flop resets, it indicates that the transmit line unit has achieved a nonactive condition, and is eligible to receive another message word from the memory. The LW signal from AND-gate 168 is also applied to a reset terminal R of the FSACT flip-flop 126 via an OR-gate 170 to the FSACT flip-flop to reset. In addition, a 0 output terminal of the FACT flip-flop 90 is connected through OR-gate 170 to apply a $\overline{\text{FACT}}$ reset signal to the R terminal of the FSACT flip-flop whenever the FACT flip-flop 90 is in a reset state, thus preventing the FSACT flip-flop 126 from achieving a set state when the line is not active. The LW signal is also applied to a reset terminal R of the FLWB flip-flop 150 to reset this flip-flop at the same time as the FACT and FSACT flip-flops are reset.

The LW signal is further applied to a reset input terminal R of the word counter 102. Whenever the last word is transferred from the transmit line unit to the scanner, the last word signal LW resets the word counter 102 to the binary 0 state to prepare it to address the first word of the next message area in memory (FIG. 7).

As shown in FIG. 10, the XAB signal serves as an input to a reset input terminal R of the FLWA flip-flop 152. Thus, the FLWA flip-flop will be reset upon the application of the OSC signal thereto whenever the last message word in the A register 118 is transferred into the output register 120. Further, when the last bit of the last message word is transferred from the output register 120 to the bit buffer 146, it is necessary to update the area counter 100 to prepare the memory address for the retrieval of the first word of the next message from the next message area. To this end, the LW signal is applied via OR-gate 158 to a trigger input terminal T of the area counter 100, thus counting the area counter up by one to the next message area in the memory.

It will be recalled, as shown in FIGS. 9 and 10, that the FRQX flip-flop 96 is placed in a reset state each time a message word is transferred from the central transmit control (FIG. 8) to the A register 118. Thus, when the FRQX flip-flop achieves a reset state the RQX0 signal to the transmit service select 104 (FIG. 8) is removed. Further, the RQX0 signal is removed from the inhibit terminal I of the line counter 68 (FIG. 9) to allow the counter 68 to be triggered by the OSC signal to the next binary count. In the present discussion the counter 68 counts from a binary 0 count to a binary 1 count. Upon achieving the binary 1 count the Line # signals applied to the address generation gates 72 are representative of the line number memory address for addressing the memory transmit queue associated with line 1. In addition, the line selector decode 70 will generate a SEL1 output signal to select transmit line unit (line 1) for the receipt of message information from the memory.

It can be seen from the operation of the line selectors 68 and 70 that each of the transmit line units (lines 0–15) will be sequentially selected by the SEL0–SEL15 signals. Further, when a transmit line unit is selected, if its associated FRQX flip-flop (flip-flop 94 in FIG. 10) is in a set state, the selected line unit will be granted access to the memory by the transmit service select 104 (FIG. 8).

It should also be pointed out that a transmit line unit cannot begin to request access to the memory unless the line is in an inactive condition and it has received the GXC signal from the data processor. In FIG. 10, this is shown by the logic structure of an AND-gate 88 which receives the $\overline{\text{FACT}}$ and RQ signals. After a transmit line has gone into an active condition, the line cannot request access to memory until the message word in the A register 118 is transferred to the output register 120. This is shown by OR-gate 92 which receives a first input from AND-gate 88 and a second input signal UDWC from the AND-gate 148.

From this discussion, it can be seen that it is possible for all of the transmit line units to be transferring outgoing messages simultaneously to their associated scanners. This is accounted for by the fact that the line counter 68 scans or selects the transmit line units at a much faster rate (approximately 4-megacycle OSC clock signals) than the message information is transmitted to the scanners (approximately 2-kilocycle TCL and TCLS clock signals).

SCANNER OUTGOING MESSAGE OPERATION

As previously described, the communication controller 20 (FIG. 1) has a plurality of output data lines for transferring message information to individual ones of the scanners 22. Since each of these scanners 22 are similar in their operation, only one of the scanners will be explained in subsequent discussions.

Figure 11:
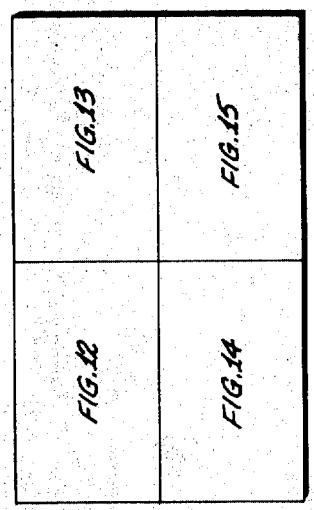
Figure 15:
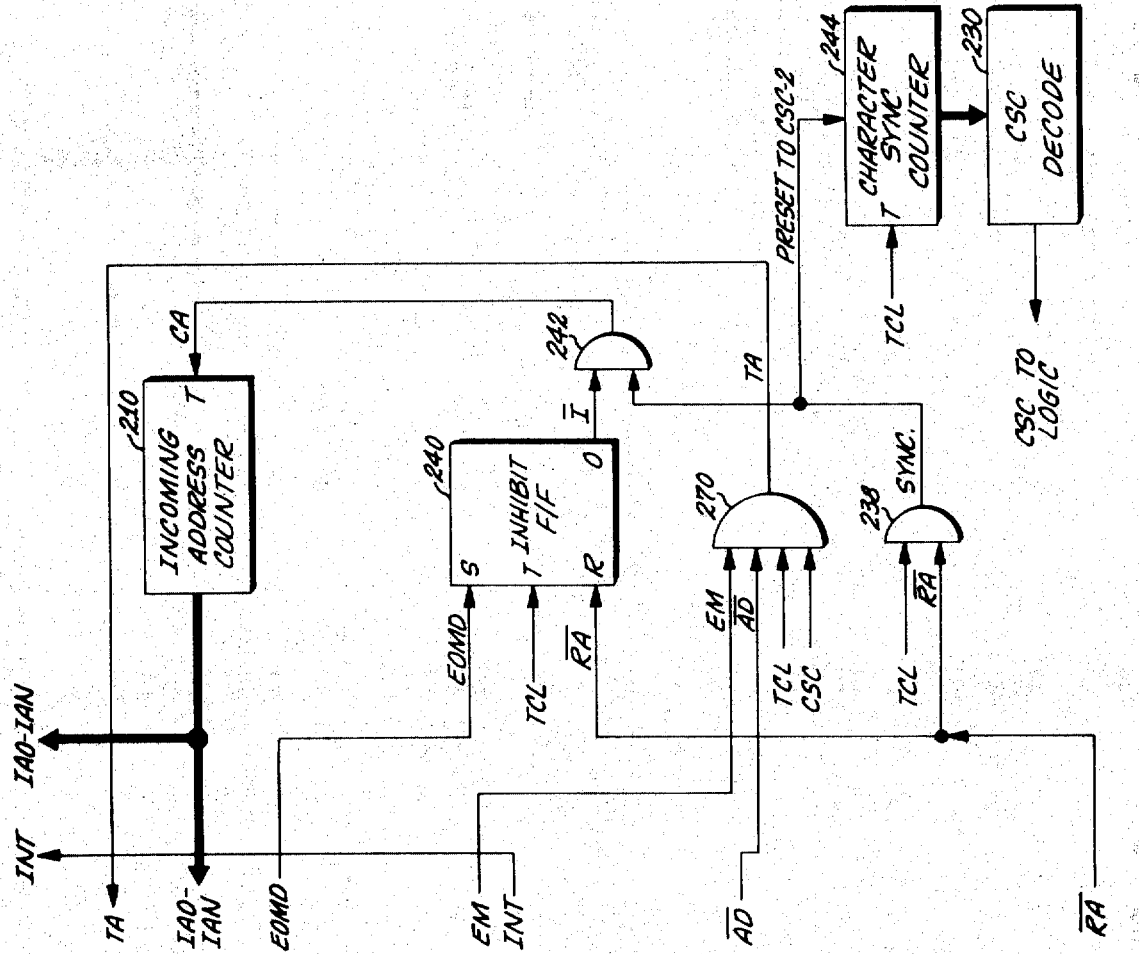
FIGS. 12 through 15, taken collectively as shown in FIG. 11, constitute a detailed schematic logic drawing which show the movement of information within the scanner of FIG. 1.
Figure 12:
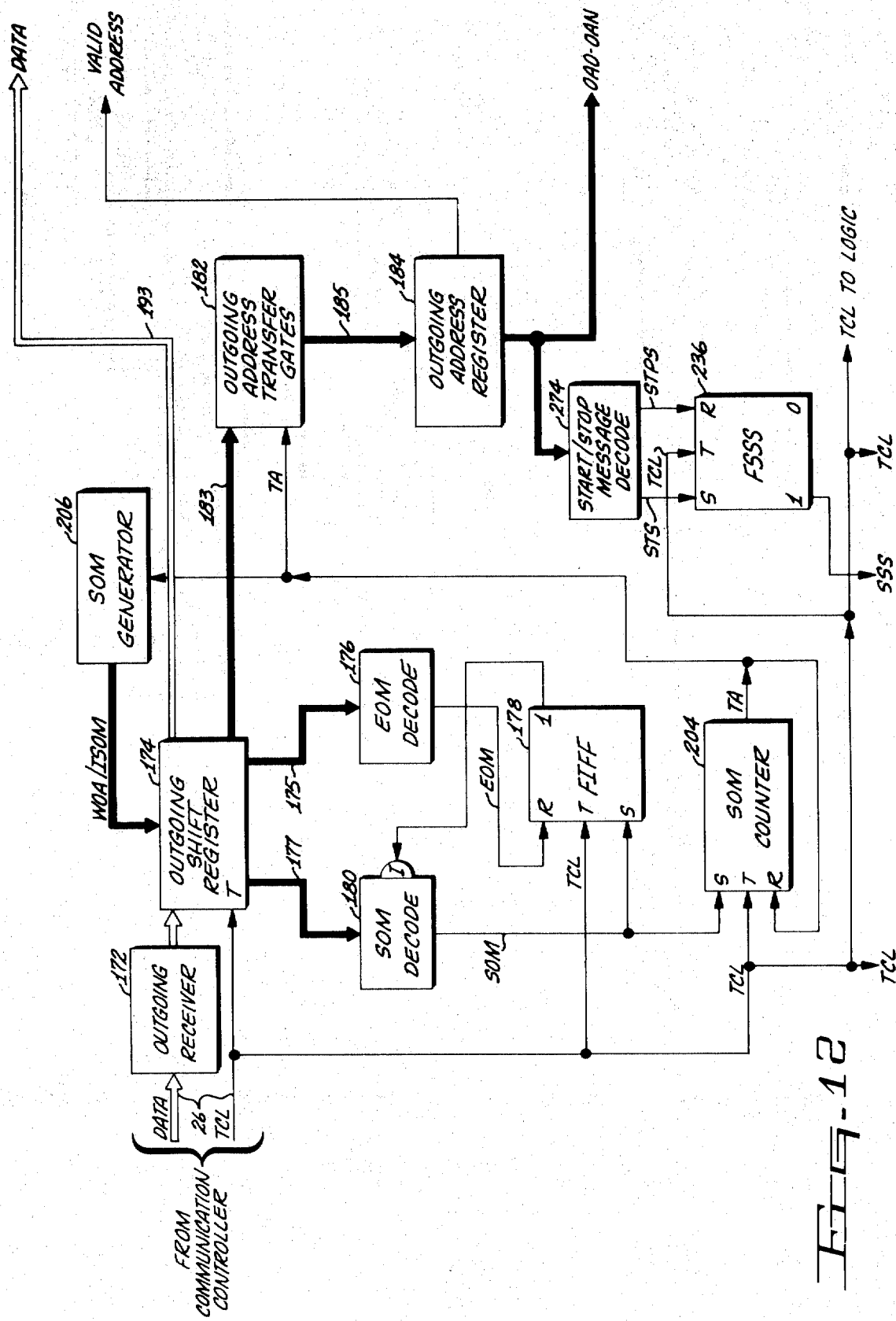
Figure 13:
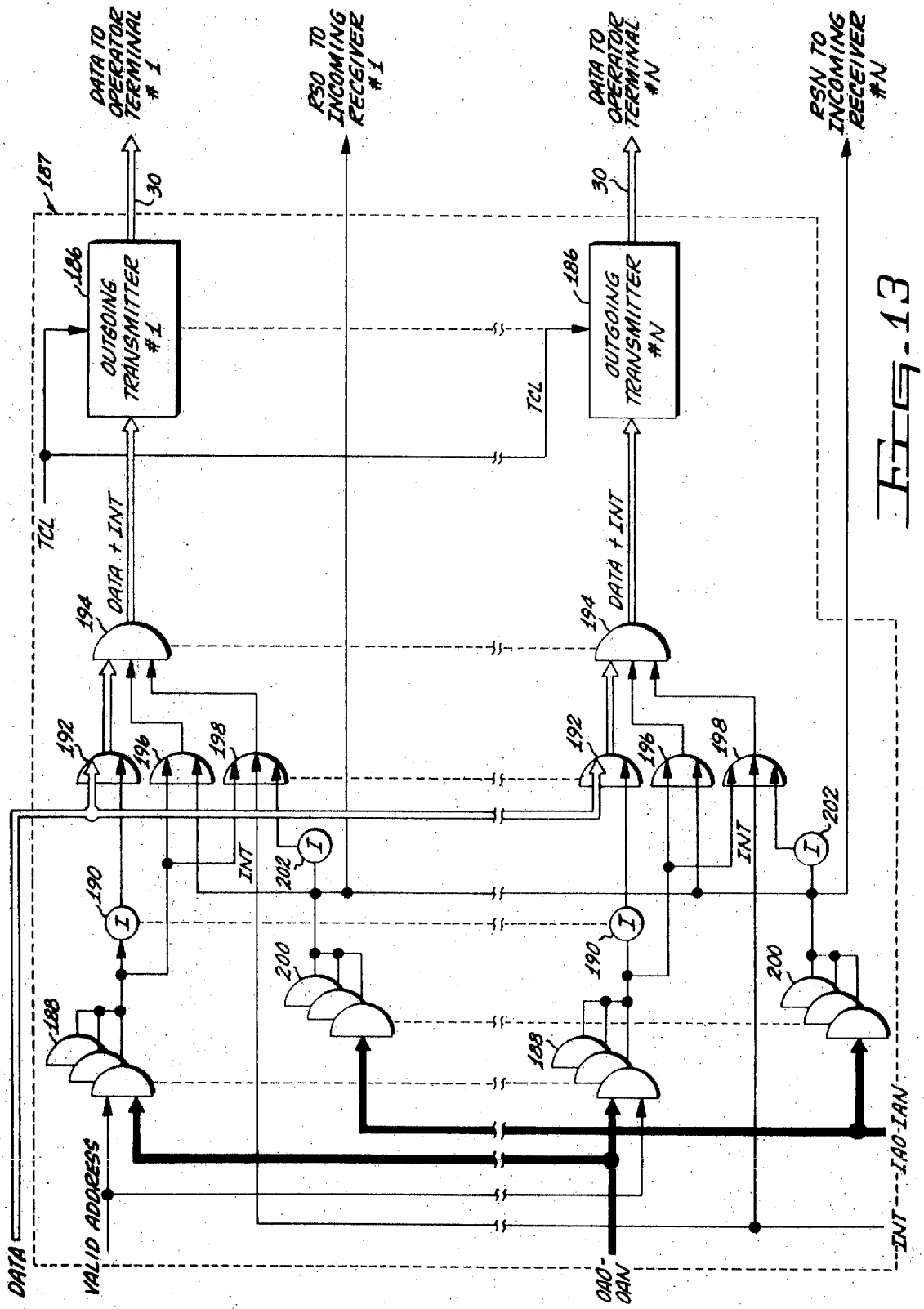
Figure 14:
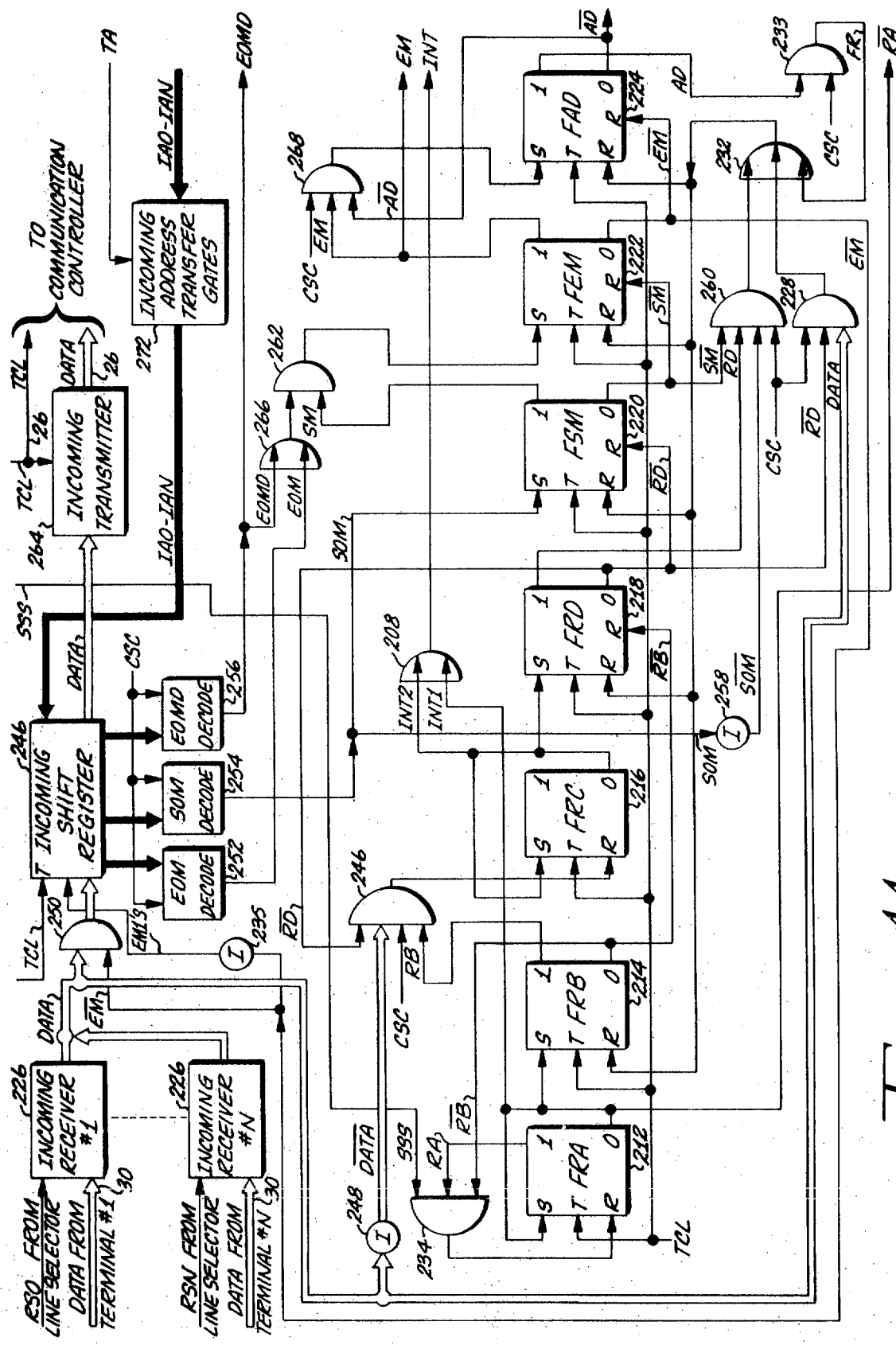

FIG. 11 is a pictorial diagram which shows the interrelationships between FIGS. 12, 13, 14 and 15 of a one of the scanners 22. The scanner is basically organized into three sections. One of these sections is an outgoing section as shown in FIG. 12 which receives outgoing messages for transfer to the operator terminals from a one of the transmit line units 66 (FIG. 9). A receive section is shown in FIGS. 14 and 15, and a terminal selector section 187 is shown in FIG. 13.

The selector section 187 of FIG. 13 is common to the operation of the scanner 22 in that it is utilized in both the outgoing and incoming message operations.

It is considered well, at this time, to briefly reiterate on the structure of the outgoing serial message format transferred over the data lines 26 from the communication controller to the scanner devices Referring to FIG. 6, it will be recalled that each outgoing message from the communication controller to the scanners has, as a first character, an SOM character immediately followed by an AT character, which is subsequently followed by a first character, a second character, etc., through an Nth character. The Nth character is in turn followed by an EOM (end of message) character. As previously discussed, the scanner utilizes the AT character to determine the destination of the outgoing message from the communication controller. That is, it will direct the message, according to the AT address, to a one of the operator terminals 14 selected by the selector in FIG. 13.

The scanner utilized in the present embodiment has no buffering capability. It is strictly a device in which information or messages coming into the scanner from the communication controller are not buffered or stored in any way. The scanner operates on the outgoing messages on a character basis and forwards the information on to the terminals as it is received.

As previously defined, an idle condition is defined as the transmission of a string of binary 1's at least one character long between the communication controller and the scanner devices. The scanner can best be understood by first assuming that the communication system is in an idle condition.

Referring now to FIG. 12, there is shown a one of the data lines 26 from the communication controller connected to an outgoing receiver 172. The TCL (transmit clock signal) is also transmitted as a part of data line 26 from the communication controller and is utilized within the scanner as the basic clock signal for transferring control signals and message information through the scanner. As previously mentioned, the TCL signal is in synchronization with the serialized data being transferred from the communication controller to the scanner. The constant stream of binary 1's is received by the outgoing receiver 172 and transferred therethrough into an outgoing shift register 174.

The serialized data is shifted into the outgoing shift register 174 by the TCL signal which is applied to a T terminal thereof. An EOM decode 176 receives, from the shift register 174, a plurality of signals on lines 175. The EOM decode 176 utilizes the signals on lines 175 to decode for the presence of an end of message (EOM) in the outgoing message string. That is, a string of binary 1's in the shift register 174 will cause an end-of-message signal EOM to be generated by the EOM decode 176, which is applied to a reset (R) input terminal of an inhibit flip-flop FIFF 178.

So long as the EOM decode is providing the EOM signal to the reset input, the FIFF flip-flop will remain in a reset state due to the presence of the TCL signal applied to a T terminal thereof. With the FIFF flip-flop 178 in a reset state, a 1 output terminal thereof provides a noninhibit signal to an inhibit input terminal I of an SOM decode 180. This noninhibit signal will prevent the SOM decode from being inhibited. That is, the SOM decode 180, similar to EOM decode 176, receives a plurality of signals on lines 177 from the shift register 174 which are decoded for the presence of a start-of-message character (SOM) in a message string.

The shift register 174 provides AT address signals to transfer gates 182 on a plurality of lines 183. Address transfer gates 182 also receive a transfer address signal TA which is utilized to transfer the AT address information from the shift register 174 into an outgoing address register 184 via a plurality of lines 185. However, at the present time with the system in an idle condition, there is no TA signal present at the input of the transfer gates 182. Under this condition the signals being provided to the address register 184 from the transfer gates 182 are representative of an invalid address. Therefore, a binary 0 disable signal from register 184 is present on a line designated valid address. This binary 0 disable signal on the valid address line is provided to the selector section 187 (FIG. 13).

Prior to proceeding further with the discussion of the scanner outgoing message operation, it is considered advantageous to describe the operation of the terminal selector 187. As shown in FIG. 13, two outgoing transmitters 186 are illustrated designated respectively as outgoing transmitter #1 and outgoing transmitter #N. Each of the outgoing transmitters has associated with it a group of logic comprised of AND-gates and OR-gates for purposes to be hereinafter explained. Dotted lines between the transmitters and the associated logic of each indicate similar intermediate configurations. FIG. 13 also shows that each of the outgoing transmitters 186 is connected to an associated one of the terminals 14 (FIG. (FIG. via a one of the data lines 30. which is Since each of the outgoing transmitters 186 and its associated group of logic functions in a similar manner, only that concerning outgoing transmitter #1 of FIG. 13 will be described. The valid address line is connected to the selector 187 via a plurality of AND-gates 188 associated with each of the respective outgoing transmitters 186. When the valid address line presents a binary 0 signal to AND-gates 188 they will be disabled to generate a binary 0 output signal. This latter binary 0 signal is applied as an input to an OR-gate 196, an OR-gate 198, and to an inverter 190. The output of inverter 190 is a binary 1 signal which is applied as an input to an OR-gate 192. The output of OR-gate 192, in turn, provides a binary 1 signal as the input of an AND-gate 194. AND-gate 194 also receives an input from OR-gate 196. A second input to OR-gate 196 is from a plurality of AND-gates 200, the output of which can be either a binary 0 or a binary 1 at this time. Thus, the output of OR-gate 196 can be either a binary 0 or a binary 1, depending upon the input from AND-gates 200.

0, that the output of AND-gates 200 is a binary 0, the output of OR-gate 196 will also be a binary 0 due to the binary 0 input from AND-gates 188. However, if the output of AND-gates 200 is a binary 1, the output of OR-gate 196 will be a binary 1, thus enabling two inputs of AND-gate 194.

An inverter 202 also receives an input from AND-gates 200. The output of inverter 202 is applied to an OR-gate 198 whose output forms an input to AND-gate 194. If the input to inverter 202 is a binary 1, the output of inverter 202 will be a binary 0. Assuming that an INT input signal to OR-gate 198 is also a binary 0, and since the input to OR-gate 198 from AND-gates 188 is a binary 0, the output of gate 198 applied to AND-gate 194 is also a binary 0, thus disabling AND-gate 194. In the idle condition presently being described, AND-gate 194 will always be disabled. This disabling action is due to the operation of OR-gates 196 and 198 in combination with inverter 202. If the output of AND-gates 200 is a binary 1, as just described, the signal will be inverted through inverter 202 to a binary 0 which is thus applied to AND-gate 194 as a disable signal. However, if the output of AND-gates 200 is a binary 0, the binary 0 signal is applied through OR-gate 196 to AND-gate 194 to keep it disabled. In this manner, during the idle condition of the scanner, the serialized message data which is provided to OR-gate 192 via a line 193 from the outgoing shift register is prevented from passing through AND-gate 194 to the outgoing transmitter #1.

When the input to the outgoing transmitter #1 from AND-gate 194 is a binary 0, each time the TCL signal is applied to the outgoing transmitter, a binary 1 signal will be transmitted from the outgoing transmitter #1 to the associated terminal #1. In this manner a constant string of binary 1's is transferred to the terminals which recognize the string as an end of message.

FIGS. 12 and 13 will now be used to describe how outgoing messages are communicated to the terminals when they are received by the scanner from the communication controller. With the scanner in the idle mode as previously described, assume that a transmit line unit in the communication controller transfers an outgoing message to the scanner which appears on line 26 at the outgoing receiver 172 (FIG. 12). This message is transferred serially into the outgoing shift register 174 each time a TCL signal is applied to the T input terminal of the shift register 174. As shown in FIG. 6, in a new message the first character to appear at the outgoing shift register will be the start-of-message character (SOM). When the complete SOM character is shifted into the outgoing shift register, the SOM decode 180 generates an SOM output signal which is applied to a set (S) input terminal of FIFF flip-flop 178 and to a set (S) input terminal of an SOM counter 204. Upon the occurrence of the TCL signal next following the generation of the SOM signal, the FIFF flip-flop 178 will achieve a set state and a first stage of the SOM counter 204 will set to place a binary 1 into counter 204.

When the FIFF flip-flop sets, its 1 output terminal supplies a binary 1 inhibit signal to the I input terminal of the SOM decode 180 to inhibit the further generation of an SOM signal.

The FIFF flip-flop 178 will remain in the set state until an end-of-message character (EOM) is received in the outgoing shift register 174. When this occurs, the EOM decode 176 will apply an EOM signal to a reset input terminal R of the FIFF flip-flop 178 to place it into the reset state. Until the FIFF flip-flop is placed in a reset state, the SOM decode cannot generate another SOM signal because of the inhibit signal applied to the I input terminal of SOM decode 180. In this manner it is possible to include an SOM character in the data character portion of any message transferred from the data communication controller to the terminals.

The SOM counter 204 is designed to count TCL input signals and to generate a TA (transfer address) signal at a predetermined count. It will be recalled that when the SOM signal is applied to the set input terminal of counter 204, and when the TCL signal is applied to the T input terminal thereof, that a binary 1 is placed in the first stage of the counter 204. Each time the TCL signal occurs after the original placing of this binary 1 in the counter, the binary 1 will continue to be shifted through the counter for a predetermined number of counts. In essence, the SOM counter counts the number of bits in the first character which is the AT character being shifted into the outgoing shift register 174 immediately after the generation of the SOM signal. In the present embodiment, each of the data characters contained in the memory is considered to be a six-bit character. Thus, the SOM counter will count the number of bits in the AT character and generate the TA (transfer address) signal when the last bit of the AT character is shifted into shift register 174. The SOM character which precedes the AT character is shifted out of register 174 and is lost. This is because in an idle mode, no message information can be transferred to the terminals since AND-gate 194 (FIG. 13) is disabled.

The TA signal is applied to a reset input terminal R of the SOM counter so that upon the occurrence of the next TCL signal following the generation of the TA signal, the SOM counter 204 will be placed in a reset condition. The TA signal is also applied to an SOM generator 206. The purpose of the SOM generator 206 is to generate and insert, in parallel, an SOM character into the outgoing shift register 174 in response to the TA signal to replace the SOM character which was lost.

This inserted SOM character is placed into the register 174 on top of the AT character, thus wiping out the AT address character and inserting the SOM character. The inserted SOM character is gated into register 174 from the SOM generator 206 via a plurality of lines designated WOA/ISOM (wipe out address and insert start of message).

It will also be noted that outgoing shift register 174 provides signals representative of the terminal address AT on a plurality of lines 183 to the outgoing address transfer gates 182. The outgoing address transfer gates are gated by the TA signal such that the instant that the TA signal appears, the AT address, which is in the outgoing shift register, will be transferred in parallel through transfer gates 182 into the outgoing address register 184 via lines 185.

In brief summary, whenever the TA signal is generated the SOM generator 106 will insert a new start-of-message character into the outgoing shift register 174 and wipe out the AT address character which is in the outgoing shift register. Further, the TA signal will cause the AT character to be transferred from transfer gates 182 into the outgoing address register 184.

Assuming now that the outgoing address AT which is in the outgoing address register 184 is a valid address, register 184 provides a binary 1 valid address signal to AND-gates 188 of FIG. 13. In addition, the output of outgoing address register 184 provides a plurality of outgoing address signals OAO–OAN to each of the plurality of AND-gates 188 in the selector 187. Also, assuming that the AT address in address register 184 contains a terminal address which selects outgoing transmitter #1, the AND-gates 188 of transmitter #1 are enabled to provide a binary 1 output signal to inverter 190 and to OR-gates 196 and 198. With the binary 1 input from AND-gate 188, the output of inverter 190 is a binary 0 and the output of each of the OR-gates 196 and 198 is a binary 1. With the two binary 1 inputs from OR-gates 196 and 198 to AND-gate 194, AND-gate 194 is conditioned to transfer the message information from the outgoing shift register 174 via OR-gate 192 and AND-gate 194 over a DATA+INT line to the outgoing transmitter #1.

As each message bit is shifted out of the outgoing shift register 174 the message bit in the outgoing transmitter 186 is simultaneously shifted onto the line 30 for transmission to terminal #1 by the same TCL signal applied to transmitter #1. The outgoing message will continue to be shifted through the scanner to operator terminal #1 in a serial message format as shown in FIG. 16.

When the outgoing shift register 174 receives an end-of-message character EOM, the EOM decode 176 generates an EOM output signal which is applied to the reset input terminal R of the FIFF flip-flop 178, so that upon the occurrence of the next TCL signal after the generation of the EOM signal the FIFF flip-flop will reset. When the FIFF flip-flop resets, its 1 output terminal will go to a binary 0, thus removing the inhibit signal to the I input terminal of the SOM decode 180. As such the SOM decode is now conditioned to be able to recognize the start of a new message when the SOM character of the next outgoing message is received by the outgoing shift register 174.

The outgoing address register 184 will retain the AT address until another message is received in the outgoing shift register 174 which has a different AT address. At that time, upon generation of the TA signal the new AT address will be transferred into address register 184. It should be pointed out that it is insignificant as to what AT address is in the outgoing address register 184 because, when the system is in the idle mode, the data being transferred between the communication controller and the outgoing section of the scanner will be a string of binary 1's (end of message). The string of binary 1's will continue to be transferred from the shift register 174 to the outgoing transmitter 186 via OR-gate 192 and AND-gate 194 in a manner similar to an ordinary message. Thus the terminals will be receiving a string of binary 1's which they in turn detect as an end of message, thus keeping the terminals in an idle mode.

From the previous explanation of how the scanner routes outgoing messages to selected ones of the terminals, it can be seen that any outgoing message coming in to the scanner from the communication controller will be routed to a one of the terminals as determined by the AT address. As will be explained in the following discussion of the receive operation of the data communication system of FIG. 1, the AT character utilized by the scanner for directing outgoing messages to the operator terminals is a terminal address AT which is added by a receive or incoming message section of the scanner during a receive operation. This AT character is placed in each incoming message received from the scanner from the terminals.

RECEIVE OPERATION

In the receive mode of operation, incoming messages or information items are transferred from the terminals 14 to the scanners 22 as shown in FIG. 1. The terminals, upon selective interrogation by the scanners 22, transfer messages to the scanners via lines 30 from selected ones of the terminals 14. If a terminal has a message to transfer to the scanner 22, it will respond to a special interrogation signal from the scanner by sending an incoming message to the scanner which includes a start-of-message character (SOM) developed by the terminal in response to the interrogation signal. This incoming message is transferred by the scanner via lines 26 to the communication controller 20.

When an incoming message is transferred through the scanner 22, the scanner will add a special terminal address character AT, and an end-of-message character EOM to the message. As described with respect to the transmit operation, this AT character is the same character which the scanner utilizes to direct the outgoing messages to the terminals which originated the messages during the receive operation.

It will be noted that the communication controller 20 (FIG. 1) contains a plurality of full duplex lines 26. As incoming messages from the scanners are received by the communication controller 20, the controller adds an AM character (multiplexer or scanner address) to each message which identifies which of the scanners the incoming messages are coming from. The operating software keys on the AM character of each message such that, when the messages are processed, the resultant calculations from the processing of each message may be placed into a one of the output queues associated with a particular one of the scanners 22 as identified by the AM character in each incoming message.

The communication controller 20 also adds a special binary 1 message identifier or currency bit to each of the incoming messages for use by the operating software and the communication controller 20. This binary 1 currency bit is always set to a binary 0 by the operating software when the software processes each message. The communication controller utilizes this currency bit to test to determine if the messages being placed into the memory are being received faster than the data processor is capable of processing them. When the controller tests the currency bit and finds a binary 1, the controller automatically generates a special stop-message command to all of the scanners to stop all incoming messages.

Message information is placed into the memory in an input circular queue assigned by the communication controller 20. Each time the communication controller places a complete message into the input queue, it will test the currency bit of the message located halfway around the circular queue to determine if the queue is overflowing. That is, is the queue receiving messages faster than the processor can process the message data? If the queue is overflowing, the communication controller will automatically generate the special stop-message command which is transferred via lines 26 to the scanners to signal the scanners to stop interrogating the terminals 14. In this manner messages cannot come into the data processing unit until the data processor has had an opportunity to process the existing messages in the queue.

The operating software of the data processor will automatically generate a special start-scan message command which is transferred via the communication controller 20 over lines 26 to the scanners 22 to signal the scanners to resume their interrogation process. This is done to start the scanners again after the operating software has had an opportunity to process a predetermined number of messages in the input queue.

Reference is now made to FIG. 16 which shows a serialized format of incoming message information as transferred from the terminals 14 via lines 30 into the scanners 22. In a manner similar to that used in the transmit mode of operation, an SOM character precedes the 1st data character. The Nth data character, as in the transmit mode of operation, is followed by an EOM character defined, in the present embodiment, as a string of binary 1's at least one character in length.

FIG. 17 shows a format of the incoming messages which is transferred from the scanners to the communication controller 20. The incoming messages have added thereto, after the EOM character, a terminal address character AT representative of the terminal originating the message. This AT character is added by the scanner. The AT character is followed by another EOM character which is also generated by the scanner.

When incoming messages arrive in the communication controller 20, the SOM character in the message is discarded and the message is formated and placed into the data processor memory in the format shown in FIG. 18. It will be noted in FIG. 18 that the incoming messages are placed into four consecutive memory word locations R+0, R+1, R+2, and R+3, somewhat similar to that described in the transmit operation output queues. The 1st data character through the 4th data character are placed in the R+0 location, the first word of a message. The 2nd word of a message is placed in location R+1, the 3word is placed into location R+2, and the 4th word of the message is placed in word location R+3. The message words in locations R+0, R+1 and R+2 contain data characters whereas location R+3 always contains a special format word.

The AT (terminal address) character is placed in the most right-hand character position of the 4the word. The multiplexer or scanner address AM is placed into the position immediately to the left of the AT character, and an AN character is placed to the left of the AM character. A status character, which contains the previously mentioned message identifier or currency bit, is placed into the leftmost character position. The AN character is a special one which is added by the communication controller and is a character space reserved for an additional level of multiplexer or scanner addressing. For example, it may be desirable, in some data communication systems, to have two scanners operating in series between the operator terminals and the communication controller. Under this condition it would be possible to add another scanner address by another scanner which may be connected between the scanners 22 and the communication controller 20.

Figure 20:
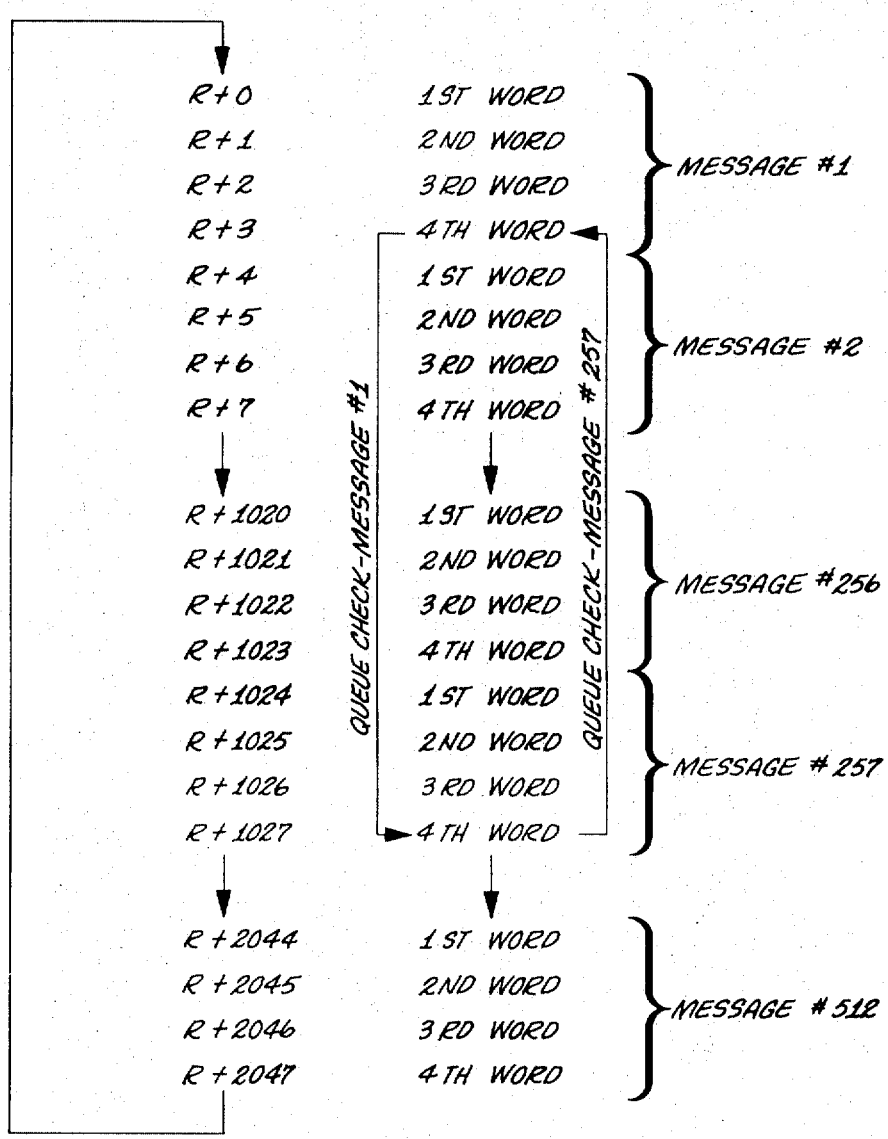
FIG. 20 is an expansion of FIG. 18 which shows the placement of message information in the data processor memory.

FIG. 19 shows the basic incoming message memory address format utilized in the present system. The address format contains a message location segment, bits 2 through 10, which provides the capability of addressing $2^9$ (512 messages) memory locations in the memory. These 512 message locations are shown in FIG. 20 as message #1, message #2 through message #256, and message #257 through message #512. Further, there is a word # segment which is utilized as a line word count to address one of four words in a given message number location. For example, to address the 1st word of message #1 location in the processor memory input queue from the communication controller, assume that the message location segment (bits 2-10) and the word # segment (bits 1 and 0) are all binary 0's. This queue address is shown in FIGS. 19 and 20 as the R+0 location in memory, whereas R, similar to the transmit base address portion, is representative of a memory constant which defines a relocatable starting point in memory for the circular receive queue.

Using the R+0 location as an example, when the communication controller places the first word of a message in memory, it will address the first word of message #1. Once the word is placed into memory, the communication controller will then update the word # segment of FIG. 19 to the second word, which will be location R+1. Thus, when the next message word is placed into memory it will go into the second word position of the message #1 location and so on until the fourth word is placed into memory into location R+3 of the message #1 location.

As previously mentioned, the communication controller has the capability of testing to see if the input queue is receiving messages faster than the data processor can process them out of the queue. Whenever the communication controller places the fourth word of any message into the memory queue, it performs a test on the fourth word of the message located halfway around the queue. FIG. 20 shows an arrowed line drawn from the fourth word of message #1 location to the fourth word of message #257 location. The arrowed line is shown as an example to indicate that during a receive queue check the controller checks halfway around the queue to the fourth word of message #257 location.

As shown in FIG. 18, the fourth word of each message placed into the receive queue contains a binary 1 currency bit which is placed in the status character of the format word by the communication controller. If a message in any given message # location has not been processed by the operating software, the currency bit will be a binary 1. When the communication controller performs a receive queue check to see if the message has been processed, if the currency bit is a binary 1, the communication controller will generate a special stop-message command which is transferred to all of the scanners to signal them to stop interrogating the terminals for incoming messages. However, when the operating software processes the fourth word of a message, it will reset the currency bit in the status character of the fourth message word to a binary 0. Therefore, when the controller performs the receive queue check, it will recognize the binary 0 currency bit, which is an indication to the controller that the message has been processed and that incoming messages can continue to be placed in the input memory queue.

Another example of this receive queue check, as shown in FIG. 20, is where the fourth word of message #257 would be placed into the receive queue by the communication controller, at which time the controller would again test halfway around the queue to the fourth word of message #1 to determine if the currency bit therein is either a binary 1 or a binary 0. This testing operation by the controller takes place when the fourth word of every message is placed into a one of the message locations (message #1–message #512) in the circular input queue.

Further, referring to FIG. 20, it is shown the fourth word of message #512 is in location R+2047. In FIG. 19, it can be seen that if the message location segment and the word # segment are combined, bits 0–10 of the address format provide the capability of addressing $2^{11}$ memory locations (2,048). It will be noted that when the message location segment reaches its maximum count and the word # location reaches its maximum count, the memory address will be R+2047. Further, when the message location address and the word # address of FIG. 19 go to all binary 0's the next memory address will be to message # 1, location R+0. Thus, the queue is circular in fashion.

Proceeding now with the detailed description of the receive operation of the present embodiment, reference is made to FIGS. 12, 13, 14 and 15, in combination. As previously mentioned, FIGS. 14 and 15 comprise the incoming message section of the scanners 22. Reference is now made to the terminal selector 187 (FIG. 13) and to an OR-gate 198 associated with each of the outgoing transmitters 186. An interrogate signal INT is applied to each of the AND-gates 198 from an OR-gate 208 of FIG. 14. This INT signal is generated by the incoming message section of the scanner to provide first and second interrogate signals to OR-gates 198 which transmit a special interrogate message or character via AND-gates 194, through the outgoing transmitters 186 to the individual ones of the terminals 14.

The scanner is capable of simultaneously transferring outgoing messages to selected ones of the terminals and receiving messages from the selected ones of the terminals with one exception. This exception is that a terminal which is being addressed by the outgoing address register 184 (FIG. 12) may not be interrogated by the scanner until a different terminal is addressed by register 184. This exception is best described with reference to FIG. 13. Assume that the output of AND-gates 188 associated with outgoing transmitter #1 is a binary 1, thus indicating that the outgoing transmitter #1 has been selected to transfer an outgoing message to its associated terminal #1. AND-gates 188 apply a binary 1 signal as one input to each of OR-gates 196 and 198. This binary 1 signal to OR-gates 196 and 198 will cause a binary 1 enable signal to be applied from each of the OR-gates to AND-gate 194. Therefore, the outgoing message information being serially shifted out of outgoing shift register 174 is transferred via OR-gate 196 and AND-gate 194 out through the outgoing transmitter 186 to terminal #1. It should be noted that there are two other inputs applied to OR-gate 198. One of these inputs is the INT signal which may fluctuate at the input of OR-gate 198 during outgoing message transmission. However, since AND-gates 188 are applying a binary 1 signal to OR-gate 198, the INT signal will not affect its output. In this manner the outgoing message information being transferred to operator terminal #1 will not be interrupted by the INT (interrogate) signal.

Let it now be assumed that the outgoing address register 184 of FIG. 12 is generating an outgoing address AT on lines OA0–OAN which selects some transmitter other than outgoing transmitter #1. Under this condition, the output of the AND-gates 188 associated with transmitter #1 will be a binary 0. Thus, one input to each of the OR-gates 196 and 198 will be a binary 0.

Referring now to AND-gates 200 of the selector 187, a plurality of input address lines IA0–IAN are connected thereto an incoming address counter 210 (FIG. 15). The incoming address counter 210 provides binary count address signals to each of the AND-gates 200 associated with the individual ones of the outgoing transmitters 186. These address signals will selectively enable individual ones of the AND-gates 200 to select the outgoing transmitters 186 for the transfer of an interrogate character to the terminals associated with each of the transmitters 186.

Assuming now that the IA0–IAN address signals are enabling AND-gates 200 associated with outgoing transmitter #1, the output of AND-gates 200 will be a binary 1 signal. This binary 1 signal 1 is applied to an inverter 202, which in turn provides a binary 0 signal as one input to OR-gate 198. However, the binary 1 output signal from AND-gates 200 is also applied to an OR-gate 196, thus allowing OR-gate 196 to provide a binary 1 signal as one input to AND-gate 194. Further, since AND-gates 188 are not enabled, the output therefrom is a binary 0 which is applied to OR-gates 196 and 198 and to inverter 190. The inverter 190 will invert the binary 0 from gates 188 to a binary 1; thus allowing a binary 1 signal to be applied as another input to AND-gate 194 via OR-gate 192. So long as the INT input signal to OR-gate 198 is a binary 0, the output thereof will be a binary 0, thus providing a binary 0 input to AND-gate 194. As previously described, this binary 0 signal will keep AND-gate 194 disabled and the output of the outgoing transmitter #1 will be providing a constant stream of binary 1's to the operator terminal #1.

Prior to proceeding with the discussion of the scanner incoming message operation, it is considered advantageous to provide a brief description of the interrogation process by the scanner.

When a selected one of tee terminal devices is interrogated by the scanner, the constant stream of binary 1's being transferred to the terminals is interrupted. The scanner generates first and second interrogation signals which, when combined, comprise an interrogate character which is inserted into the outgoing message of binary 1's. The scanner will generate a first interrogate binary 0 signal which is immediately followed by two binary 1 signals. Two bit times later, upon receipt of a binary 0 from the terminal being interrogated, the scanner will generate a second interrogate 0 which is followed by a string of binary 1's, thus indicating that the outgoing transmit line to the terminal has reverted back to an idle condition. This second interrogate binary 0 signal immediately follows the second binary 1 of the first interrogate signal. The manner in which the interrogate character is developed by the scanner will be more fully described subsequently in this discussion.

Proceeding now with the detailed description of the scanner incoming message operation, first assume that the INT signal momentarily goes from a binary 0 to a binary 1 and back to a binary 0. The output of OR-gate 198 will therefore apply a momentary binary 1 signal to AND-gate 194. During this time, AND-gate 194 will be enabled to provide a binary 1 signal to the outgoing transmitter #1 which inserts a binary 0 into the constant stream of binary 1's going to terminal #1.

In FIG. 14, there is shown a plurality of flip-flops FRA 212, FRB 214, FRC 216, FRD 218, FSM 220, FEM 222, and FAD 224. These flip-flops function in the incoming message section of the scanner to generate the interrogate signal INT and to control the sequence of operations. To explain the operation of the incoming message section of the scanner, assume the following conditions: (1) The FRA flip-flop 212 is in a set state; (2) the FRB flip-flop 214 is in a reset state; (3) the FRC flip-flop 216 is in a set state; and (4) flip-flops FRD 218, FSM 220, FEM 222, and FAD 224 are each in a reset state.

With the FRA flip-flop 212 in a set state, a binary 1 RA signal is applied to an AND-gate 234. AND-gate 234 also receives a start-stop scan signal SSS from the 1 output terminal of a start-stop scan flip-flop (FSSS) 236 shown in FIG. 12. The 0 output terminal of the FRB flip-flop, which is reset, supplies a binary 1 $\overline{RB}$ signal to AND-gate 234. These three binary 1 input signals to AND-gate 234 will thus enable the gate to provide a binary 1 output signal to the reset input terminal R of the FRA flip-flop 212.

When the transmit clock signal TCL is applied to a T terminal of the FRA flip-flop, it will reset causing a 0 output terminal thereof to develop a binary 1 output signal and simultaneously causing its 1 output terminal to develop a binary 0 signal. The binary 0 signal from the 1 output terminal of the FRA flip-flop will disable AND-gate 234, which removes the binary 1 reset signal from the R input terminal of the FRA flip-flop. Since the FRA flip-flop 212 is tied back on itself from its 0 output terminal to its set input terminal S, upon the application of the next TCL signal the FRA flip-flop will set. As such, the FRA flip-flop 212 can never be reset more than one TCL period which is equivalent to one message bit time.

The 0 output terminal of flip-flop 212 is connected to an OR-gate 208. When the FRA flip-flop goes into a reset state, the binary 1 signal from its 0 output terminal is propagated through OR-gate 208, applying a first interrogate binary 1 signal (INT 1) to each of the OR-gates 198 associated with the individual ones of the outgoing transmitters 186 (FIG. 13). As previously described, the INT signal will propagate through each of the OR-gates 198 to enable a one of the AND-gates 194, which is selected by address AND-gates 200. Therefore, a binary 0 signal is transferred for one TCL period over a data line 30 to the selected terminal via an outgoing transmitter 186. In this manner a binary 0 is inserted into the message stream of binary 1 information being transferred out of the selected outgoing transmitter 186 to its associated terminal. The FRA flip-flop 212 also applies a $\overline{RA}$ signal from its 0 output terminal as one input to an AND- gate 238 (FIG. 15) and to a reset input terminal R of an inhibit flip-flop (F/F) 240. Upon the occurrence of the next TCL signal after the $\overline{RA}$ signal is generated, the inhibit F/F 240, if it is in a set state, will be placed in a reset state. The primary purpose of the $\overline{RA}$ signal applied to the R input terminal of inhibit F/F 240 is to keep the flip-flop in a reset state, thus providing a binary 1 $\overline{I}$ output signal to an AND-gate 242.

The TCL signal, in conjunction with the $\overline{RA}$ signal will enable AND-gates 238 which provides a binary 1 sync. output signal. The sync signal is simultaneously applied to AND-gate 242 and to a character sync counter 244. It is important to note that the sync signal from gate 238 and the INT signal from OR-gate 208 are generated simultaneously. These two signals serve to synchronize the operation of the terminals with the scanner. The sync signal from AND-gate 238 presets the character sync counter 244 to a count of CSC–2, indicating that the character sync counter is preset to a value of two less than its maximum count. Sync counter 244 is a binary counter capable of counting from a binary count of 1 to a binary count of 6 and back to 1. It also has, as was indicated above, suitable input gating logic which allows the counter to be preset to the CSC–2 count. The character sync counter 244 receives a TCL input clock signal at its T terminal and counts up by one for each TCL signal received. Counter 244 also provides a plurality of binary count output signals to a CSC decode 230 which provide a character sync count signal CSC to various portions of the incoming logic section of FIGS. 14 and 15 each time a message character in an incoming message from the terminals has been completely shifted into an incoming shift register 246, FIG. 14.

In FIG. 15, AND-gate 242 receives the sync signal in conjunction with the $\overline{I}$ signal from the inhibit F/F flip-flop 240. Since the $\overline{I}$ signal is a binary 1 at this time, when the sync signal becomes a binary 1, AND-gate 242 develops a binary 1 count address signal CA which is applied to a T terminal of an incoming address counter 210. The incoming address counter 210 is also a binary counter having the capability of counting from 0 through N, back to 0, etc. Thus, each time the sync signal is generated by the FRA flip-flop 212 going through its transitional states, the incoming address counter 210 is triggered by the CA signal to update the incoming address by one. As will be more fully described, the address counter 210 generates the terminal address AT which is placed in each incoming message from the terminals. The incoming address (AT) is updated simultaneously with the generation of the first interrogate signal by the FRA flip-flop 212. For the present discussion, it will be assumed that the character advance signal CA causes the address counter 210 to change from a binary count of N to a binary count of 0. This will cause the incoming address signals IA0 –IAN to enable AND-gates 200 associated with outgoing transmitter #1. Thus, the first interrogate signal INT will be transferred via OR-gate 198 (FIG. 13) and AND-gate 194 out to terminal #1 on data line 30.

As previously mentioned, each of the terminals 14 is adapted to respond to the interrogate signals with a start-of-message character (SOM). Thus, as the first interrogate signal is received by a terminal, if it is in a condition to transmit a message back to the scanner, it will immediately generate a first part of the start-of-message character SOM. The scanner then generates the second interrogate signal in response to the first part of the SOM character from the terminal. It is, however, necessary for the scanner to wait a sufficient number of bit times for the first part of the start-of-message character to return to the scanner from the operator terminal. This is why the character sync counter 244, FIG. 15, is preset to a value of two less than its maximum count capability at the time the first interrogate signal is transferred to the terminal.

Referring again to the FRA flip-flop 212 (FIG. 14) its 0 output terminal is connected to an S input terminal of FRB flip-flop 214. When the FRA flip-flop is in a reset state, generating the first INT signal, the FRB flip-flop 214 will set upon the application to a T terminal thereof the first TCL signal following the resetting of the FRA flip-flop With the FRB flip-flop being in a set state, a binary 1 RB signal from a 1 output terminal thereof is furnished to an AND-gate 246. As will be recalled from the beginning of the present discussion, in that the FRD flip-flop 218 is in a reset state, the 0 output terminal of this flip-flop will apply a binary 1 $\overline{RD}$ signal to AND-gate 246.

AND-gate 246 receives two other input signals, $\overline{DATA}$ AND CSC. The generation the output of AND-gates 200 provides a these signals and the affect they have on the operation of the scanner is explained as follows. Incoming receivers 226

(FIG. 14) designated as incoming receiver #1—incoming receiver #N, each receives message information via lines 30 from the respective terminals #1–#N. Each of the incoming receivers 226 also receives a receiver select input signal designated respectively as RS0–RSN from an associated one of the AND-gates 200 of the selector 187 of FIG. 13. Since the incoming address (AT) from incoming address counter 210 is enabling the AND-gates 200 associated with outgoing transmitter #1, the output of AND-gates 200 provides a binary 1 receiver select signal RS0 to incoming receiver #1 of FIG. 14.

Incoming receiver #1 receives message information from terminal #1, and inturn places the message information on a data line which is connected to an inverter 248. Inverter 248 inverts its input signal and furnishes its output to AND-gate 246. If the inverter 248 receives a binary 0 signal from incoming receiver #1, it will provide a binary 1 $\overline{DATA}$ signal to AND-gate 246.

It will be recalled from previous discussion that each time the scanner interrogates a terminal it generates first and second interrogate signals which are transferred to the terminal. Those two interrogate signals are each three bits long and together represent an interrogate character or message to the terminal. When the scanner generates the first interrogate signal it interrupts the constant stream of binary 1's going to the terminals with a binary 0. The scanner then idles for two bit times by transferring two binary 1's after the first interrogate binary 0. At the termination of this two-bit time idle period, the scanner tests to see if the terminal has responded with a binary 0, the first bit of the first part of the SOM character. If the scanner receives a binary 0 from the terminal, the scanner will immediately generate the second interrogate binary 0 signal and the outgoing line will revert to the idle condition of transferring binary 1's to the terminal. Thus, the interrogate character which is transferred to the terminal is, in essence, a six-bit character. Reading from right to left, this interrogate signal takes on the binary representation of 110110, which equals the number of $66_8$.

Referring once again to AND-gate 246 of FIG. 14, assume that the appropriate terminal 14 provides a binary 0 signal to the scanner. The output of inverter 248 will therefore be a binary 1 $\overline{DATA}$ signal and AND-gate 246 will be enabled due to the application thereto of the binary 1 signals RB, $\overline{RD}$, $\overline{DATA}$ (binary 0 from terminal) and the CSC signal.

If the terminal does not respond to the scanner with a binary 0 signal but instead issues a binary 1, the output of inverter 248 will be a binary 0 and AND-gate 246 will be disabled. However, an AND-gate 228 will be enabled due to the binary 1 DATA signal, the CSC signal and a binary 1 $\overline{RD}$ signal. The $\overline{RD}$ signal is derived from a 0 output terminal of the FRD flip-flop 218. As such, AND-gate 228 will generate a binary 1 reset signal which propagates through an OR-gate 232 for application to the reset input terminal of the FRB flip-flop 214. Thus, upon application to a T terminal of the FRB flip-flop of the next TCL signal following the generation of the CSC signal (3 TCL times since INT 1) the FRB flip-flop will reset. When the FRB flip-flop resets it will again provide a binary 1 signal $\overline{RB}$ from its 0 output terminal to AND-gate 234. AND-gate 234 is thus enabled to allow the FRA flip-flop 212 to again generate the interrogate signal INT 1 upon the occurrence of the next TCL signal following the resetting of the FRB flip-flop. Thus, when the terminal fails to respond to the first interrogate signal with a binary 0, it is only necessary for the scanner to wait four bit times (4 TCL clocks) before it can interrogate another terminal.

Referring again to the character sync counter 244 and the CSC decode 230 of FIG. 15, it will be recalled that the sync counter is preset to a binary count of CSC–2 by the sync signal from AND-gate 238. It will further be recalled that the sync signal is generated at the same time as the first interrogate signal. In this manner the sync counter 244 is preset to count TCL signals from a binary count of CSC–2 starting in synchronization with the first interrogate signal transferred to the terminal. Further, the first part of the start-of-message character (SOM) transferred from the terminal to the scanner is in proper synchronization with the TCL signal which triggers the sync counter 244. However, the first bit of the first part of the SOM character is delayed by two TCL signal times due to the propagation delays in the data lines 30, the scanner and the terminal circuits. Thus, it is necessary to delay the enabling of AND-gate 246 for two TCL signal times which is equivalent to two message bit times. This is accomplished by presetting sync counter 244 to CSC-2 and then counting it up with the TCL signal. The first TCL signal will cause counter 242 to achieve a count of CSC–1 and the second TCL signal will cause the counter to achieve a maximum count.

The FRC flip-flop 216 is tied back upon itself in a similar fashion to the FRA flip-flop 212. Thus the FRC flip-flop can go through transitional states from set to reset and back to set in the same manner. When AND-gate 246 is enabled it applies a binary 1 reset signal to the R terminal of the FRC flip-flop 216 such that when the TCL signal is applied to the T terminal, the FRC flip-flop 216 will reset and subsequently set at the next TCL signal. The FRC flip-flop, when reset, provides a binary 1 output signal INT 2 from its 0 output terminal to OR gate 208. Therefore, the FRC flip-flop will generate a second interrogate signal INT 2 which is transferred to the terminal through the selected outgoing transmitter #1. Since the FRC flip-flop 216 can be in a reset condition for only one TCL clock period, the second interrogate binary 0 signal sent to the terminal will be only one bit time in duration.

When the FRB flip-flop is in a reset state, its 0 output terminal applies a binary 1 $\overline{RB}$ signal to a reset input terminal R of the FRD flip-flop 218. This insures that the FRD flip-flop will be in a reset state before the FRC flip-flop 216 achieves a reset state. Also, the resetting of the FRD flip-flop by the $\overline{RB}$ input signal sets up a reset chain reaction for flip-flops 220, 222 and 224. That is, as the FRD flip-flop resets, a binary 1 signal $\overline{RD}$ is applied to a reset input terminal R of FSM flip-flop 220. The FSM flip-flop 220 in a similar manner applies a binary 1 signal $\overline{SM}$ to a reset input terminal R of FEM flip-flop 222 which, in turn, provides a binary 1 output signal $\overline{EM}$ to a reset input terminal R of FAD flip-flop 224. This insures that all of the flip-flops FRD, FSM, FEM and FAD will be in a reset state in preparation for the receipt of the remainder of the message from the terminals. When the FRC flip-flop 216 resets it supplies a binary 1 set signal to an S terminal of FRD flip-flop 218 which will set with the next TCL signal.

In FIG. 14, an AND-gate 250 is shown at the input to incoming shift register 246. AND-gate 250 receives the serialized data or message information since the incoming receiver 226 is enabled by the RS0 signal from incoming receiver #1. AND-gate 250 also receives an enable input signal $\overline{EM}$ which is applied thereto from the 0 output terminal of the FEM flip-flop 222 which is in a reset state. The enabling of AND-gate 250 by the $\overline{EM}$ signal allows the incoming message information received from the terminal to be shifted into the incoming shift register 246 upon the occurrence of each TCL signal applied to a T terminal of register 246. After the generation of the interrogate message or character, if the terminal is in a ready condition to respond with a start-of-message character (SOM), upon the generation of the next CSC signal (one character time) after the first CSC signal which was applied to AND-gate 246, a test is made to determine if there is an SOM (start-of-message) character in the shift register 246. This is accomplished by an SOM decode 254 which receives the SOM binary signals from register 246 and generates an SOM output signal upon application thereto of the CSC signal. If the terminal does not respond with an SOM character, the output signal from SOM decode 254 will be a binary 0. This binary 0 signal is applied to an inverter 258, which in turn applies a binary 1 signal $\overline{SOM}$ to an AND-gate 260. Since the FRD flip-flop 218 is in a set state, a binary 1 signal RD from a 1 output terminal thereof will be applied to AND-gate 260. Also, since the FSM flip-flop 220 is in a reset state a binary 1 $\overline{SM}$ signal is being applied to AND-gate 260. Thus, when the first CSC signal after the CSC signal which enabled AND-gate 246 appears at AND-gate 260, it will be enabled to provide a binary 1 signal via an OR gate 232 to a reset input terminal of each of the flip-flops 214, 218, 220, 222 and 224. Upon the application of the TCL signal to a T terminal of each of these flip-flops they will reset to condition the sequence control flip-flops in preparation for the development of another interrogate character by the FRA flip-flop 212 and the FRC flip-flop 216.

Let it now be assumed that the operator terminal does respond with an SOM character which is shifted into the incoming shift register 246. With the presence of the SOM character in the incoming shift register, the SOM decode 254 provides a binary 1 SOM output signal which is applied to a set input terminal S of the FSM flip-flop 220. When the next TC1 signal appears at a T terminal of the FSM flip-flop, it will set, thus applying a binary 1 signal SM to AND-gate 262. The remaining incoming message information or characters following the SOM character will continue to be shifted into the incoming shift register 246 through AND-gate 250 with each TCL signal. The output of the incoming shift register shifts the message information, via a data line, into an incoming transmitter 264. The transmitter 264, which also receives the TCL signal, in turn transmits the message information via line 26 in combination with the TCL signal, to the communication controller 20. The incoming shift register will continue to shift the incoming message information out through the incoming transmitter 264 until an end-of-message character (EOM) is shifted into the incoming shift register.

When an EOM character is shifted into the incoming shift register 246, an EOM decode 252, which is in communication with the incoming shift register 246, generates a binary 1 EOM signal upon the occurrence of the CSC signal. The binary 1 EOM signal from EOM decode 252 will propagate through an OR gate 266 to AND-gate 262. The second input to AND-gate 262 is the SM signal from the FSM flip-flop 220 and the gate will be enabled to provide a binary 1 set signal to an S terminal of the FEM flip-flop 222.

Upon the occurrence of the next TCL signal, the FEM flip-flop will set. When the FEM flip-flop sets it provides a binary 0 signal on the $\overline{EM}$ signal line to the AND-gate 250 (FIG. 14), thus inhibiting the further transfer of incoming message information from incoming receiver #1. Simultaneously, upon achieving a set state, the FEM flip-flop 222 applies a binary 1 signal EM to an AND-gate 268. AND-gate 268 is also receiving, at this time, a binary 1 $\overline{AD}$ signal from a 0 output terminal of the FAD flip-flop 224 which is in a reset state. With the occurrence of the CSC signal, indicating that another message character of the incoming message has been shifted into the shift register 246, AND-gate 268 will generate a binary 1 set signal which is applied to an S input terminal of the FAD flip-flop 224 which achieves a set state upon the application thereto of the next TCL signal to its T terminal. When the FAD flip-flop 224 sets, it will apply a binary 0 signal from a 0 output terminal, via the $\overline{AD}$ line, to AND-gate 268, thus disabling AND-gate 268.

AND-gate 270 (FIG. 15) is utilized to generate a transfer address signal TA, which is provided to an incoming address transfer gates 272 of FIG. 14. The address gates 272 are utilized to transfer the incoming address AT therethrough via address lines IA0–IAN from the incoming address counter 210 into the incoming shift register 246. A second input to AND-gate 270 is an EM signal from the 1 output terminal of the FEM flip-flop 222. It will be recalled that FEM flip-flop 222 achieves a set state when an EOM character is detected. Therefore, the EM signal will apply a binary 1 input to AND-gate 270 at this time. In addition, the FAD flip-flop 224 provides a $\overline{AD}$ binary 1 signal to AND-gate 270 until the FAD flip-flop is set by the enabling of AND-gate 268 by the CSC signal. Upon the application of the TCL and CSC signals to AND-gate 270, a binary 1 transfer address signal TA is generated by gate 270. It should be noted that the FAD flip-flop does not achieve a set state until a full character count (generation of CSC) after the setting of the FEM flip-flop, thus providing sufficient time for the EOM character to be shifted through the incoming shift register 246 out to the data line 26.

It will be recalled that the incoming address counter 210 provides a plurality of address signals on lines IA0–IAN to the incoming address transfer gates 272. The signals appearing on lines IA0–IAN are representative of the binary count address (AT) of the particular incoming receiver being selected by the selector 187 of FIG. 13. It has been established that the TA signal from AND-gate 270 is generated after the EOM character has been shifted out of the incoming shift register to the incoming transmitter and on to the communication controller. Upon the generation of the TA signal, which is applied to the incoming address transfer gates 272, the AT address on lines IA0–IAN is transferred into the incoming shift register 264. In this manner the incoming address AT, which represents the address of the terminal originating the incoming message, is added to the message immediately following the EOM character.

At the time the next CSC signal occurs after the address AT has been transferred into the incoming shift register, the AT address will have been transferred on to the communication controller. Since the FAD flip-flop 224 is in a set state applying a binary 1 AD signal to an AND-gate 233, gate 233 is enabled when the CSC signal occurs. AND-gate 233 in turn provides a binary 1 final reset signal via OR gate 232 to each of the respective reset input terminals R of flip-flops (FRB) 214, (FRD) 218, (FSM) 220, (FEM) 222 and (FAD) 224. When the TCL signal is applied to each of these flip-flops they will each achieve a reset state, thus preparing the sequence control logic for the subsequent receipt of another start-of-message character from the next terminal addressed by the incoming address counter 210 via the selector 187 (FIG. 13).

In FIG. 14, reference is not made to AND-gate 250 and an inverter 235. It will be recalled that when the FEM flip-flop 222 achieves a set state, the $\overline{EM}$ line applies a binary 0 signal to disable AND-gate 250 and prevent the incoming message information from being shifted into shift register 246 during the time that the address AT is being transferred into register 246. Further the FEM flip-flop 222 does not achieve a reset state for one complete character shift time (time between CSC signals) after the address AT is transferred into register 246. This is done to insure that an end-of-message character EOM immediately follows the AT character added by the scanner. A full character of binary 1's (which are representative of an EOM character) is shifted into register 246 following the transfer of AT into register 246.

The shifting of the EOM character into register 246 is controlled by an inverter 235. When the FEM flip-flop is set, inverter 235 inverts the binary 0 signal on line $\overline{EM}$ to a binary 1. This binary 1 signal forces a binary 1 into a first flip-flop stage of register 246, so that each time the register is shifted by the TCL signal a binary 1 will be shifted into the register. In this manner, during the time that the FEM flip-flop 222 is in a set state an EOM character is shifted into the shift register 246.

When the final reset signal from AND-gate 233 resets the appropriate sequence control flip-flops, the FEM flip-flop 222 will again apply a binary 1 $\overline{EM}$ signal to AND-gate 250 to allow the message information from the next selected receiver to be shifted in shift register 246. Also, the binary 1 EM signal is inverted by inverter 235 to a binary 0, thus removing the forced binary 1 signal from the input of register 246.

The scanner is now in a logic condition to generate another interrogate character. When the FRA flip-flop 212 again goes through its transitional states, the first interrogate signal will be developed. Simultaneously, synchronization will be established by the AND-gate 238 (FIG. 15) which provides the sync signal to AND-gate 242 and to the sync counter 244 to again reset the counter to CSC-2. AND-gate 242 also receives a binary 1 $\overline{I}$ signal from inhibit F/F 240. Thus, gate 242 is enabled to provide a binary 1 CA signal to the incoming address counter 210 to update the terminal address AT to select the next operator terminal. In this manner the scanner sequentially scans and interrogates each of the terminals for the receipt of incoming messages from the terminals.

From the previous explanation it can be seen that it is only necessary to wait a maximum of one full incoming message character time to interrogate any one of the terminals. That is, when the first interrogate signal is generated by the scanner, the terminal immediately responds with the first part of the SOM character, if it has a message to transmit. The scanner will wait for a predetermined number of bit times to see if the first part of the SOM character is received from the terminal. If the first part of the SOM character is received, the second interrogate signal is generated in response to the receipt of the first part of the SOM character. However, if the terminal does not transfer an SOM character to the scanner in response to the interrogate message (first and second interrogate signals) within one complete character time the scanner will immediately reset itself, start the generation of another interrogate character and address the next sequential terminal by updating the incoming address counter 210 (FIG. 15).

In some applications of the present embodiment, it may be desirable to reinterrogate a terminal several times in succession. This may be desirable, for example, if a terminal cannot fully transmit a complete message upon receipt of a single interrogate character of if it is desirable to receive several messages in succession from a terminal. When this type of application is desired, the scanner has the capability of being able to reinterrogate any of the selected operator terminals as many times as required.

As shown in FIG. 14, connected to the incoming shift register 246 is an EOMD decode 256. (The abbreviation EOMD stands for end-of-message dummy, which is a different character than the EOM character previously mentioned.) The EOMD decode 256 is connected to the incoming shift register 246 through a plurality of lines which provide binary input signals thereto. The terminals are adapted to generate a special EOM character designated EOMD in the present embodiment.

When an incoming message containing the EOMD character is received in shift register 246, the EOMD decode 256 generates a binary 1 output signal EOMD at the occurrence of the CSC signal. This EOMD signal is simultaneously applied to the OR-gate 266 and to an S set input terminal of the inhibit flip-flop 240 of FIG. 15. With the presence of the EOMD signal at the S input terminal of flip-flop 240, when the TCL signal is applied to the T terminal thereof, the inhibit flip-flop 240 will set. When flip-flop 240 sets, its 0 output terminal will provide a binary 0 signal to AND-gate 242. In this manner AND-gate 242 is disabled so that, when the sync signal is generated by AND-gate 238 on the next interrogation by the FRA flip-flop 212, the incoming address counter 210 will not be updated by the CA signal. Therefore, the next interrogation character will be transmitted to the previously interrogated terminal. In this manner, so long as each incoming message from the selected operator terminal contains an EOMD character, the scanner will continue to reinterrogate the same terminal.

It will be recalled from the previous discussion that the communication system of the present embodiment is self-regulating to the extent that the communication controller has the capability of performing a test to determine if the input queue in the data processor memory is receiving incoming messages from the scanners faster than the queue can be emptied by the operating software. If this test indicates that the queue is overflowing with incoming messages, the communication controller will automatically generate a special stop-scan message which is transferred to each of the scanners via the data communication lines 26.

Referring now to FIG. 12, whenever the communication controller generates the stop-scan message, it is transferred into the outgoing receiver 172 through which the message is shifted into outgoing shift register 174. The stop-scan message has the same format as any other message with the exception that it does not contain a terminal address AT. However, the AT address is replaced by a special stop-message command code representative of the stop-scan message. Thus, when the first character following the SOM character appears in shift register 246, the stop-message command code will be transferred into the outgoing address register 184 via transfer gates 182.

The outgoing address register 184 provides a plurality of lines OA0–OAN to a start-stop message decode 274. The start-stop message decode 274 is designed to recognize only two special codes, the special stop-message command code and a special start-message command code, which is generated by the operating software. Whenever the stop-message command is received by the scanner and is decoded as a stop-message command by the start-stop message decode 274, a stop-scan signal STPS is provided to an R terminal of a start-stop scan (FSSS) flip-flop 236. Upon application of the TCL signal to a T terminal of the FSSS flip-flop, it will reset and provide a binary 0 output signal on a SSS line from its 1 output terminal to one input of AND-gate 234 (FIG. 14). This binary 0 signal disables AND-gate 234 which, in turn, prevents the FRA flip-flop 212 from changing states. Thus, the scanner cannot interrogate any of the terminals until the FSSS flip-flop 236 is placed into a set state.

The operating software of the present system will periodically send the communication controller a special start-scan message, which is transferred into the outgoing shift register 174 (FIG. 12) in the same manner as all other messages. This start-scan message has the same format as the previously mentioned stop-scan message and in the same manner is transferred into the outgoing address 184. The special start-scan code in the message is decoded by the start-stop message decode 274 to generate a start-scan command signal STS which is applied to an S input terminal of the FSSS flip-flop 236. When the TCL signal occurs the FSSS flip-flop will set, thus providing a binary 1 signal SSS from its 1 output terminal to the AND-gate 234 (FIG. 14). AND-gate 234 is now conditioned to allow the FRA flip-flop to change states and resume the interrogation process. In this manner the communication system of FIG. 1 is a self-regulating data transfer system since the scanners may be prevented from interrogating the terminals until the data processor has had sufficient time to process the incoming messages which have been placed in the memory input queue.

AND-gate 228 receives three input signals, CSC, $\overline{RD}$, and DATA. When the communication system of Fig. 1 is in an idle mode, it will be recalled that a constant stream of binary 1's (EOM) is transferred between the terminals and the scanners. Further, when the incoming message section of the scanner (FIG. 14) is not processing an incoming message the FRD flip-flop 218 will be in a reset state. Under this condition each time a CSC signal is generated, AND-gate 228 will be enabled to generate a binary 1 reset output signal via OR gate 232 which is applied to each of the flip-flops (FRB) 214, (FRD) 218, (FSM) 220, (FEM) 222 and (FAD) 224. This is due to the fact that the $\overline{RD}$ from the FRD flip-flop is a binary 1 and further the message bits on the DATA line to AND-gate 228 from receivers 226 will always be binary 1's during the idle mode.

RECEIVE OPERATION

In the receive mode of operation, incoming messages are placed into the memory input queue in the form of memory words. These incoming messages are transferred from the scanners via the communication controller into individual ones of the input queue locations as specified by memory addresses developed by the controller. As previously explained, these incoming messages are transferred from the scanners to the communication controller in the incoming message format shown in FIG. 17. FIGS. 18 and 20 show a typical message format of each of the message words as they appear in the four consecutive message number locations in the input queue, of which there are 512 message number locations for holding up to 512 messages, or 2,048 message words.

It will be recalled, as explained for FIG. 18, that the fourth word of each incoming message always contains a format word which is comprised of the AT, AM, AN and status characters. When the operating software processes the data contained within a particular incoming message, the operating software will key on the AM character to determine which one of the output queues (FIGS. 4 and 7) is to receive the processed data (outgoing message). During the processing of the incoming message, the operating software will properly format the outgoing message words. The software will place the AT character, which is in the fourth word position of the input queue, into the first word position immediately following the SOM character in the output queue. The operating software will also drop the AM, AN and status characters upon processing of each incoming message prior to placing the processed data (outgoing message) into the proper output queue. In addition, the operating software generates the end-of-message character, which is placed in the outgoing message of the output queue. Further, it will be recalled that the status character of the fourth word (FIG. 18) contains the previously mentioned binary 1 currency bit which is placed into bit position 21 of the fourth word as it is placed into the memory input queue by the communication controller. The operating software also resets this binary 1 currency bit to a binary 0 when the incoming message is processed.

Referring now to Fig. 21, there is shown an interface major block diagram of a receive portion of the communication controller 20, which includes a central receive control 276 and a receive line control 277. The receive line control 277 includes a plurality of receive line sections 278 designated receive line section 0—receive line section 3 for receiving incoming messages from the scanners via lines 26. Communication lines between the central receive control 276 and the data processor 10 and between the receive line control 277 and the central control 276 are also shown. To the right of the communication controller 20, each of the receive line sections has connected thereto sixteen receive lines 26, each of which represents one-half of a full duplex line 26 as shown in FIG. 1. Each of these receive lines 26, designated as line 0–line 63, is comprised of a data line labeled DATA and a transmit clock line labeled TCL. EAch of the full duplex lines 26 may be connected either directly to an associated one of the scanners 22 or through the data sets 24 as shown in FIG. 1. The preceding interface lines are further defined as follows (FIG. 21):

I. Interface lines between the central receive control 276 and the data processor 10.

A. Receive address lines RAD00–RAD14—These lines are used to provide data cell addresses to the memory 18 for the insertion of incoming messages into memory locations specified by the communication controller 20.

B. Receive data lines RD00–RD23—These receive data lines serve to convey incoming message information to the memory from the communication controller. (The incoming message information to the processing unit 16 is provided therefrom to the memory 18 via lines 279. Control lines 62 are the same lines as those described for FIG. 3, and serve to provide control signals between the memory 18 and the processing unit 16 to control the flow of message information therebetween.)

C. Memory data available (MDA) and transmit memory service request (XMSR) lines—These two lines are duplicated in FIG. 21 and are the same MDA and XMSR signal lines as shown in FIG. 3.

D. Receive memory service request line (RMSR)—This provides an RMSR signal from the central receive control to the data processor each time the control has a message word to be stored in the working store.

II. Interface lines between the central receive control 276 and the receive line control 277.

A. Data receive lines DR00–DR23—The purpose of these lines is to transfer messages or portions of messages in the form of memory words from selected ones of the receive line sections 278 into the central receive control.

B. Receive address lines RA00–RA10—A portion of the memory address provided to the memory 18 via lines RAD00—RAD14 is selectively provided by these lines to the receive control 276 from individual ones of the receive line sections 278 to address the input queue memory locations during a receive operation.

C. Receive service request lines FRR0–FRR3. A receive service request signal is provided to the central control 276 from each of the receive line sections 278 to indicate to the central control that individual ones of the receive line sections 278 have a message word ready to be stored in the memory receive message queue.

D. Message number service request lines FRM0–FRM23—These lines selectively indicate to the central control that individual ones of the receive line sections 278 need a new message number location in the receive message queue. These locations are assigned to the receive line sections from the central receive control via the lines FME0–FME8.

E. Receive enable lines RE0–RE3—These lines provide a one of the RE0–RE3 signals to associated ones of the receive line sections 278. The signals on these lines cause a selected one of the receive line sections to be enabled for the transfer of a 24-bit incoming message word and an 11-bit input queue address to the central receive control via lines DR00–DR23 and RA00–RA10 respectively.

F. Message select lines MS0–MS3—The purpose of these lines is to provide signals from the central control to selected ones of the receive line sections to enable the line sections to receive and store therein a nine bit memory address received on lines FME0–FME8.

G. Message number location lines FME0–FME8—These lines transfer message number location signals FIG.45 the central control to selected ones of the receive line sections for the storage therein of the next receive queue location in the memory which is assigned to receive an incoming message.

The central receive control also provides a stop-message command signal line SMC to the transmit line sections of FIG. 3. During a receive operation, under certain conditions, this line provides a stop-message command signal SMC to each of the transmit line sections of FIG. 3 to signal the line sections to transmit the special stop-scan message command to the scanners.

A detailed description of the receive operation of the communication controller 20 will now be given by first referencing FIGS. 21 and 22. In that the design and operation of each of the receive line sections 278 is similar, only the operation of the receive line section 0 of FIG. 21 will be described.

Figure 22:
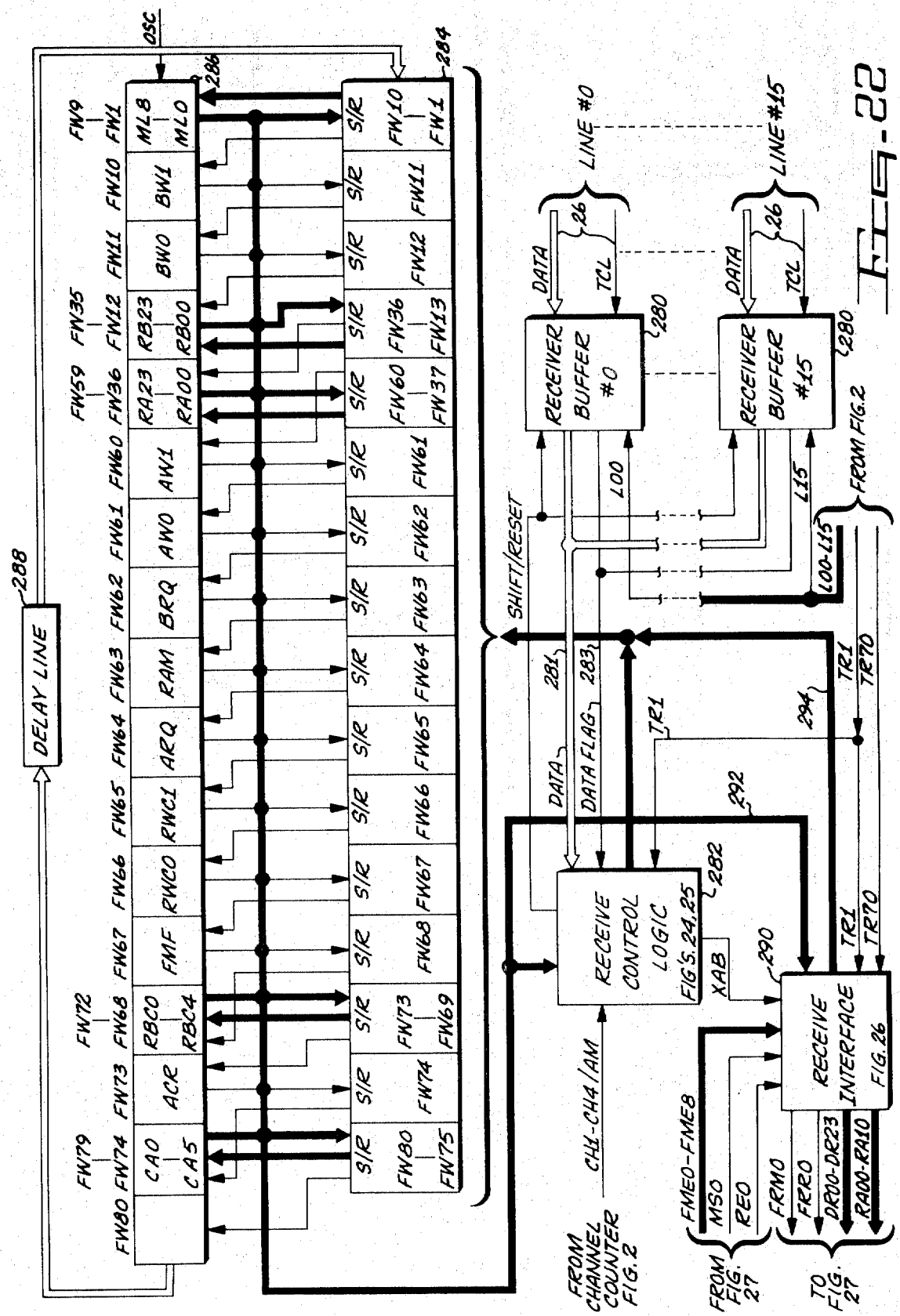
FIG. 22 is a block diagram illustrating paths of information movement within a one of the receive line sections of the receive line control of FIG. 21.

FIG. 22 shows a major block diagram of the receive line section 0 of FIG. 21. The basic storage device in the line section of the preferred embodiment is a delay line 288 which may, for example, be of the ultrasonic class delay line type having sufficient electrical length to contain all of the serialized data necessary to buffer the incoming message information from the 16 receive lines 26 connected to receiver buffers 280. The delay line 288 also provides sufficient electrical length to hold control and memory address information for controlling the operation of the communication controller during the receive operation. Delay line 288 is connected in series with a plurality of window flip-flops 286 designated FW1–FW80. In the basic operation of the receive line section, the information contained within the delay line is serially circulated through the window flip-flops 286 at the clock rate of the OSC signal which is applied to the flip-flops FW1–FW80.

Each of the receiver buffers 280 receives message information in bit serial form from an associated one of the scanners via lines 26 at the clock rate of the TCL signal. As each bit of the serialized information is received by the selected receiver buffer 280, the information bit is transferred into the delay line recirculation loop comprised of the delay line 288 and the window flip-flops 286 in combination with a plurality of S/R (set/reset) logic functions 284.

Each of the receiver buffers 280 associated with a one of the lines 0–15 is allocated a specified section in the overall electrical length of the delay line. As message information from each of the receiver buffers is placed into the delay line, it will be placed into the allocated section associated with that receiver buffer.

It will be noted in FIG. 22 that the plurality of S/R logic functions or blocks 284 is broken into segments corresponding to window flip-flops 286. The S/R logic 284 is made up of a plurality of logic functions designated S/R FW1–S/R FW80. Several of the S/R logic segments are shown to include more than one S/R logic function while other segments are shown to represent a single S/R logic function. However, each of the S/R logic function's basic design and operation is similar. For example, one of the segments of logic 284 includes a plurality of logic functions S/R FW1–FW10 each of which is similar to a single logic function such as is shown by S/R FW11. Further, it will be noted that the window flip-flops 286 and the S/R logic functions 284 have signal lines interconnecting them. The normal propagation path for data or information circulating through the delay line loop is from the output of delay line 288 to the S/R FW1 of the S/R FW1–FW10 segment and from there into the FW1 flip-flop of window flip-flops 286. Data is then circulated out of the FW1 flip-flop to the input of S/R FW2 of the FW1–FW10 segment, etc. In this manner data is circulated serially through the window flip-flops 286 and the S/R logic 284 from which data emerges from the S/R FW80 segment and is placed into the FW80 flip-flop. The output of the FW80 flip-flop is connected back into the delay line 288 for data recirculation through the delay line and back into S/R FW1 of S/R logic 284.

Figure 23:
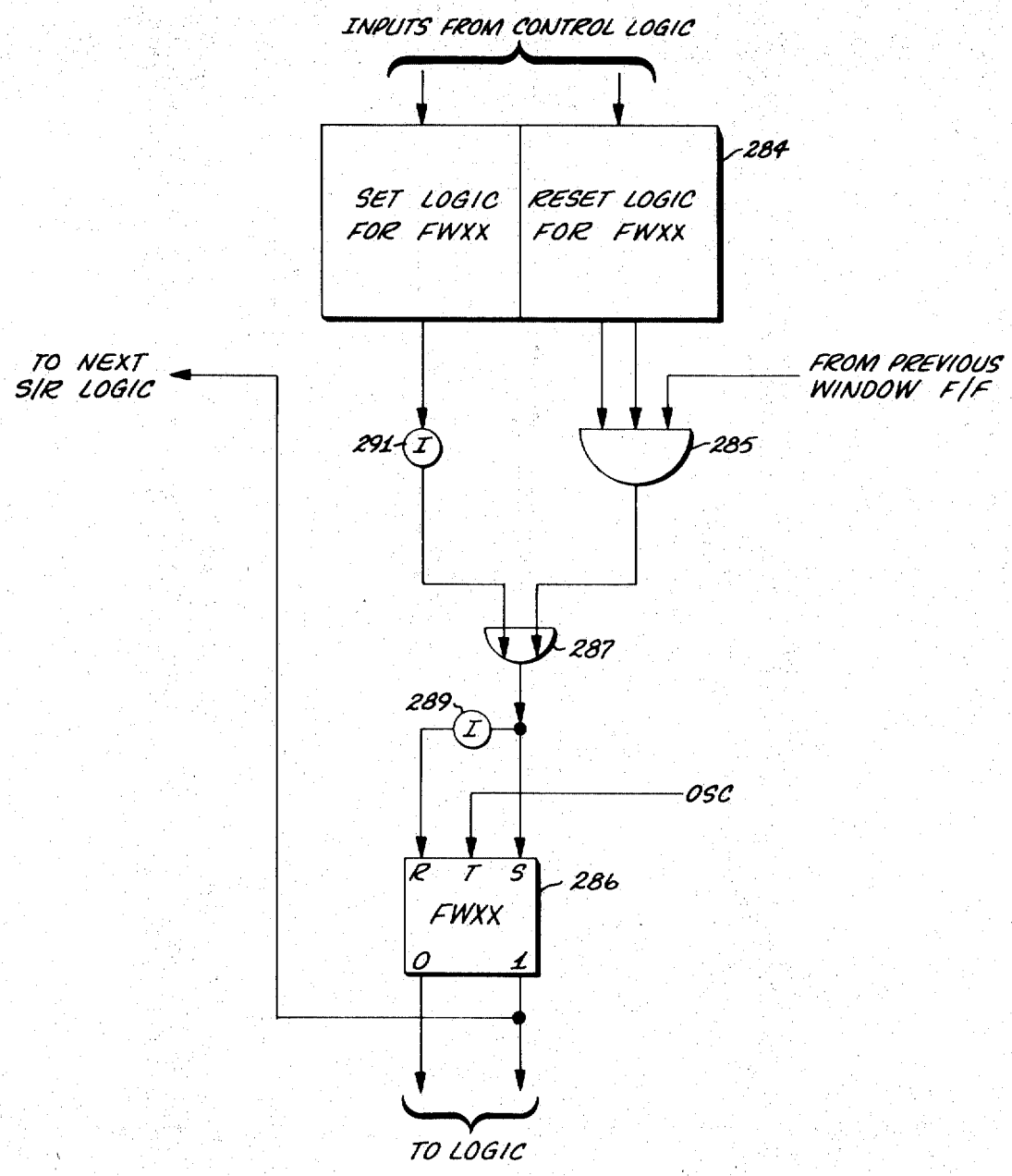
FIG. 23 is a schematic block diagram of a typical one of the logic functions shown in FIG. 22.

Each of the individual S/R logic functions 284 is associated with various ones of the window flip-flops 286. The S/R functions 284 also receive a plurality of input control signals and message information via a plurality of lines 294 from a receive control logic 282 and from a receive interface 290. Each of the S/R logic functions 284 is comprised of suitable logic to allow certain information to be transferred therethrough into various ones of the window flip-flops 286 during the receive operation. For purposes of simplicity and expediency, the operation of only one of the similar S/R logic functions 284 in combination with a one of the window flip-flops 286 will be explained as shown in FIG. 23. For explanatory purposes, the S/R logic function 284 is shown divided into two sections, a set logic for an FWXX flip-flop and a reset logic for the FWXX flip-flop. The inputs to the set and reset logic sections are provided (FIG. 22) by lines 294. As shown in FIG. 23, the normal circulation from window flip-flop to window flip-flop results from making all of the outputs of the S/R logic 284 remain in a binary 1 state. Therefore, if the data from the previous window flip-flop is a binary 1, AND-gate 285 will be enabled to provide a binary 1 output signal to an OR-gate 287. The OR-gate 287 will, in turn, provide a binary 1 set input signal to an S input terminal of the FWXX flip-flop 286. Upon the application of the OSC signal to a T terminal of FWXX 286, it will set. When the FWXX flip-flop achieves a set state, a 1 output terminal thereof will provide a binary 1 output signal to the next S/R logic. On the other hand, if the previous window flip-flop provides a binary 0 enabled input signal to AND-gate 285, the output of AND-gate 285 will be a binary 0. This binary 0 will in turn propagate through OR-gate 287 to be inverted to a binary 1 by an inverter 289. The binary 1 output inverter 289 will apply a reset input signal to an R terminal of the FWXX flip-flop 286, so that when the OSC signal is applied to the T terminal thereof, the flip-flop will achieve a reset state. In this state, the 1 output terminal of FWXX will generate a binary 0 signal which is applied to the next S/R logic (FIG. 23).

If, due to certain logic conditions within the receive interface 290 or the receive control logic 282 of FIG. 22, it is desired to reset a one of the window flip-flops 286, the reset logic for FWXX will supply a binary 0 signal at one or more of its outputs to disable AND-gate 285. During a reset operation the output of the set logic for FWXX will be a binary 1, which is inverted to a binary 0 signal by inverter 291. Thus, OR-gate 287 will receive a binary 0 input signal from inverter 291 and AND-gate 285. The output of OR-gate 287 will, therefore, generate a binary 0 signal which is inverted to a binary 1 by inverter 289 to apply a reset signal to the R terminal of the FWXX flip-flop 286. If it is desired to set a one of the window flip-flops 286, the output of the set logic for FWXX will generate a binary 0 output signal which is inverted by inverter 291 to a binary 1 for propagation through OR-gate 287. In this manner a binary 1 set signal will be applied to the S input terminal of FWXX 286 to allow FWXX to set upon the application of the OSC signal. Under these circumstances the FWXX flip-flop 286 will achieve a set state regardless of the signal (binary 0 or binary 1) applied to AND-gate 285 from a previous window flip-flop.

In the subsequent discussion of the receive line section of FIG. 22, a thorough understanding of the operation of the window flip-flop 286 and the S/R logic 284 will be assumed. As such, if it is stipulated that a particular one of the window flip-flops 286 is placed into a set state it will automatically be assumed that a binary 1 signal is applied to a S/R logic function associated with a particular one of the window flip-flops, thus placing the associated window flip-flop in a set state. The reverse would be true for the reset operation of the window flip-flops.

With reference still to FIG. 23, the 1 and 0 output terminals of the FWXX flip-flop 286 also provide signals to logic. The two signal lines from the FWXX flip-flop correspond to line 292 from each of the window flip-flops to the receive interface 290 and the receive control logic 282 of FIG. 22. It will be recalled that each of the receiver buffers 280, associated with corresponding ones of the lines 26 (line #0–line #15) is allocated a section in the overall delay line electrical length. In the present embodiment, each of the receive lines 26 is allocated 79 bits of storage in the recirculation loop. It will be further noted in FIG. 22 that there is a plurality of mnemonic designations recorded in the window flip-flops 286. For example, window flip-flops FW1–FW9 are additionally designated with the mnemonic ML0–ML8. Window flip-flop FW10 is designated BW1, and window flip-flop FW11, BW0, etc. These designations of the window flip-flops 286 are representative of the mnemonics assigned to various bits or groups of bits in each of the allocated receive line sections within the delay line loop. These mnemonics have been assigned to the various bits within the delay line loop to indicate their logic functions in the operation of the receive line sections.

Proceeding from left to right beginning with the FW80 flip-flop the descriptions are as follows: (1) FW80 window flip-flop—This flip-flop is a one-bit buffer flip-flop utilized to temporarily hold the CA5 bit from the FW79 flip-flop after a receive test operation by the receive control 282. (2) Character assembly register CA0–CA5 (FW74–FW79)—These six window flip-flops contain character assembly register bits which are used to assemble the bits of an incoming message as they are received into a six-bit character. As each assembled character is complete, it will be transferred into a register A RA00–RA23 (FW12–FW35). (3) ACR active receive flag (FW73)—The active receive flag ACR will be set to a binary 1 when the first character after the SOM character is received in an incoming message. The ACR bit will be reset to a binary 0 when the previously mentioned format word has been completely assembled by the receive line section. (4) RBC0–RBC receive bit counter (FW68–FW72) As each incoming message bit is received from the scanner associated with the receive line in the window flip-flops, the bit counter is incremented by one. The bit counter RBC014 RBC4 will be reset when the last character of an incoming message word has been assembled. (5) Format flag FMF (FW67)—The FMF bit is used to control the assembly of the format word of an incoming message. The receipt of an EOM character from the selected receive line via a corresponding one of the receiver buffers 280 will cause the FMF bit to be set to a binary 1, at which time the receive line section will begin to assemble the four character format word comprised of the AT, AN, AM and status characters. The FMF bit is reset to a binary 0 state when the complete format word has been assembled. (6) RWC0 (FW66) and RWC1 (FW65) two-bit word counter — The two-bit word counter is incremented to indicate the word count (address) of the message word being assembled. When a complete message word has been assembled in register A (FA00–FAc) the word count will be transferred to the AW0 and AW1 bits and the FWC0 and FWC1 bits will be updated to reflect the word count of the next word to be assembled. (7) ARQ, register A data request (FW64)—The ARQ bit is set to a binary 1 state when register A contains a full message word and needs to move its word to register B (RB00–RB23). The ARQ bit is reset to a binary 0 state when the message word is transferred from register A to register B. (8) RAM, register A message number flag (FW63)—The RAM flag bit is set to a binary 1 state when register A is in the process of assembling the first word of a new message. The RAM flag is reset to a binary 0 when register A is transferred to register B and when a new message number or location number is obtained from the receive central control. (9) Register B request BRQ (FW62)—The BRQ bit will be set to a binary 1 state when register B receives a word from register A. The BRQ bit activates the logic to request the central receive control to take the incoming message word held in register B and store the word into the memory input queue. The BRQ bit is reset to a binary 0 when the word is transferred to the receive interface 290 (FIG. 22). (10) AW0 (FW61) and AW1 (FW60), register A word count—This two-bit register contains the word count of the message word held in register A. As each new message word is assembled into register A the contents of RWC0 (FW66) and RWC1 (FW65) are transferred to AW0 and AW1. (11) Twenty-four-bit register A, RA00–RA23 (FW36–FW59)—RA23 is the most significant bit of the last character of register A and RA00 is the least significant bit of the first character of a message word contained in register A. Register A is an assembly register where complete four six-bit character words are assembled. When a full message word is assembled in register A, it is transferred to register B (RB00–RBc) which in turn holds the word until it is transferred through the receive interface 290 to the memory via the central receive control. (12) Twenty-four-bit register B RB00–RB3 (FW12–FW35)—RB23 is the most significant bit of the last character and RB0 is the least significant bit of the first character of the message word transferred into register B from register A. Register B is a holding or buffer register where incoming message words are temporarily stored for transfer to the memory via the receive interface and the central receive control.

Each incoming message word received from the scanners flows through the communication controller as follows:
1. Receive line bit buffer
   to
2. Character assembly register
   to
3. Receive register A
   to
4. Receive register B
   to
5. Receive interface
   to
6. Memory via the central receive control.) (13) Register B word count, BW0 (FW11) and BW1 (FW10)—This two-bit word count or word register holds the word count of the message word held in register B. The message word count for register A (AW0 and AW1) will be transferred to the register B word count register (BW0 and BW1) when a word is transferred from generating means, a plurality of signals CH1–CH4/AM. These signals are representative of the four least significant bits of the AM multiplexer or scanner address which is placed in the format word by the receive line section. During the operation of receiving an incoming message on one of the receive lines 26 via a corresponding one of the receiver buffers 280, when the last message word is to be placed into memory, the format word is formed by the receive line section. It is during the formation of this format word that the receive control logic, through suitable control signals received from the window flip-flops 286, places the AM character into register A (RA00–RA23). register A to register B. BW0 and BW1 are used as the two least significant bits of the incoming queue address. (14) Message location address, ML0–ML8 (FW1–FW9)— These nine flip-flops FW1–FW9 hold the message location number currently being used by register B to store the message word contained therein in the input memory queue. The message location number ML0–ML8 and BW0 and BW1 make up the receive line section portion of the memory queue address for incoming message words. The central receive control will add on the base address R to complete the memory address. In the basic operation of the preferred embodiment, at a predetermined time when a one of the receive line sections is completely contained in the window logic as shown in FIG. 22, the various bits of the window logic are interrogated or tested by the receive control logic 282 and the receive interface 290 to make logic decisions which affect the status of the various bits in the window flip-flops 286. The receive interface 290 receives a plurality of input signals via lines 292 from the window flip-flops 286. During the receive operation information contained on lines 292 is transferred through interface 290 to the central receive control 276 (FIG. 21). The receive interface provides a plurality of information output signals on lines 294 to the S/R logic 284. The information on lines 294 is placed into the delay line 288 via the S/R logic 284 and the window flip-flops 286 during the receive operation.

The receive control logic 282 receives from the channel counter 46 of FIG. 2, which serves as a scanner address When one of the receiver buffers 280 is selected, the receiver buffer provides a message bit via line 281 and a data flag via line 283 to the receive control logic 282. Upon receipt of the data flag by the receive control logic and a TR1 signal from the system clock generator (FIG. 2) the receive control logic generates a shift/reset signal which is provided back to the receiver buffers 280 to reset the buffer which is being selected for the transfer of the message bit.

The selection of receiver buffers 280 is accomplished by a plurality of signals L00–L15 from the system clock generator of FIG. 2. These L00–L15 signals sequentially select the receiver buffers 280 starting with receiver buffer #0 and proceeding through receiver buffer #15 back to receiver buffer #0. In this manner each receiver buffer 280 is momentarily selected to transfer a data bit therefrom into the receive control logic 282. Each time a one of the receiver buffers 280 is selected by a corresponding one of the L00–L15 signals, the message information in the delay line loop pertaining to the selected buffer will be present in the window flip-flops 286. More explicitly, as shown in FIG. 2, the channel counter 46 is updated by the TR80 signal which is the last count from the counter decode 38 prior to the counter decode generating the TR1 signal. When the channel counter 46 is updated by the TR80 signal, the CH1–CH4/AM outputs cause the output signals L00–L15 of the line count decode 42 to sequentially select each receiver buffer at TR80 time. Therefore, the information pertaining to the particular line selected is sitting in the window flip-flops 286 at TR1 time.

The TR1 signal is utilized in the receive control logic 282 (FIG. 22) to clock various logic decisions which are made at that time. At TR1 time, the results of the various decisions made by the receive control logic are gated into the S/R logic 284 which, in turn, provides various input signals to the window flip-flops 286 to set and reset the various control and data bits contained therein. After the occurrence of the TR1 signal, the OSC signal which is applied to the window flip-flops 286 will continue to shift the information therethrough. As the information in the window flip-flops pertaining to the particular line just selected is shifted therethrough, message information pertaining to the next succeeding receive line is shifted into the flip-flops 286.

The receive interface 290 receives a plurality of input signals from various ones of the window flip-flops 286. Also coming into the receive interface 290 are the previously described interface lines which traverse the receive line section and the central receive control 276 (FIG. 21). The receive interface 290 provides a plurality of output signals via lines 294 to the S/R logic 284. This information transferred over lines 294 is representative of various control bits for setting and resetting certain ones of the window flip-flops 286. Lines 286 also transfer the message location number (queue address), provided to the receive interface by the central receive control 276, into the ML0–ML8 segments of flip-flops 286.

An XAB signal is also provided to the receive interface 290 from the receive control logic 282 (FIG. 22). This XAB signal (transfer A to B) is generated by the receive control logic during the receive operation whenever the contents of register A are transferred to register B in the window flip-flops 286. This transfer of register A contents to register B is accomplished through the receive control logic 282. The function of the XAB signal within the receive interface 290 will be described in more detail in the subsequent description.

The TR1 signal also serves, in the receive interface 290, to clock various control functions. The TR70 signal from the system clock generator (FIG. 2) is also applied to the receive interface 290 where it is utilized to clock each new message location address number from the central receive control 276 into the window flip-flops 286 via lines 294 through the S/R logic 284.

Figure 24:
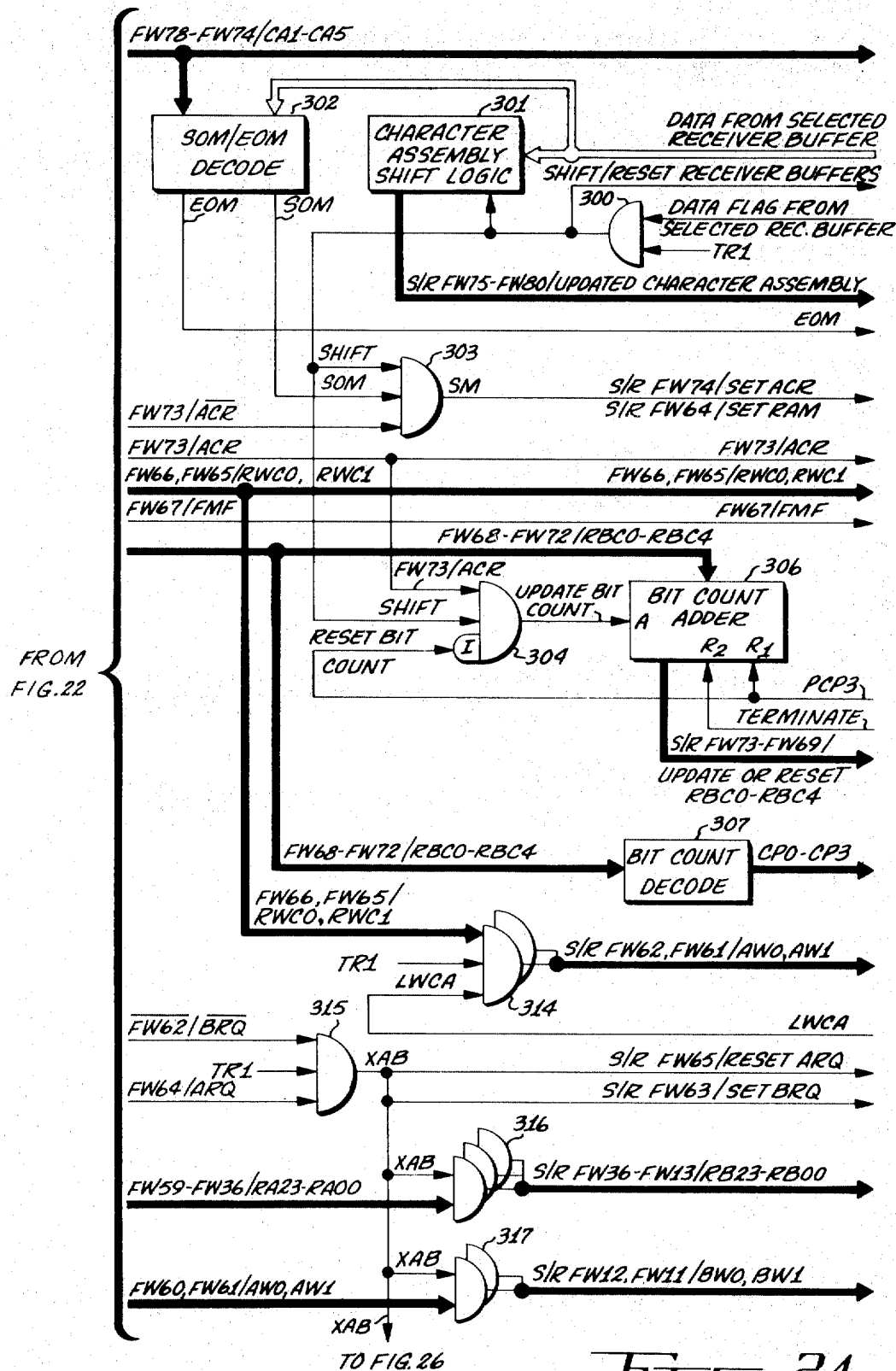
FIGS. 24 through 26, taken together collectively as shown in FIG. 28, constitute a detailed logic schematic drawing for the movement of information within a portion of a transmit line section of FIG. 22.
Figure 25:
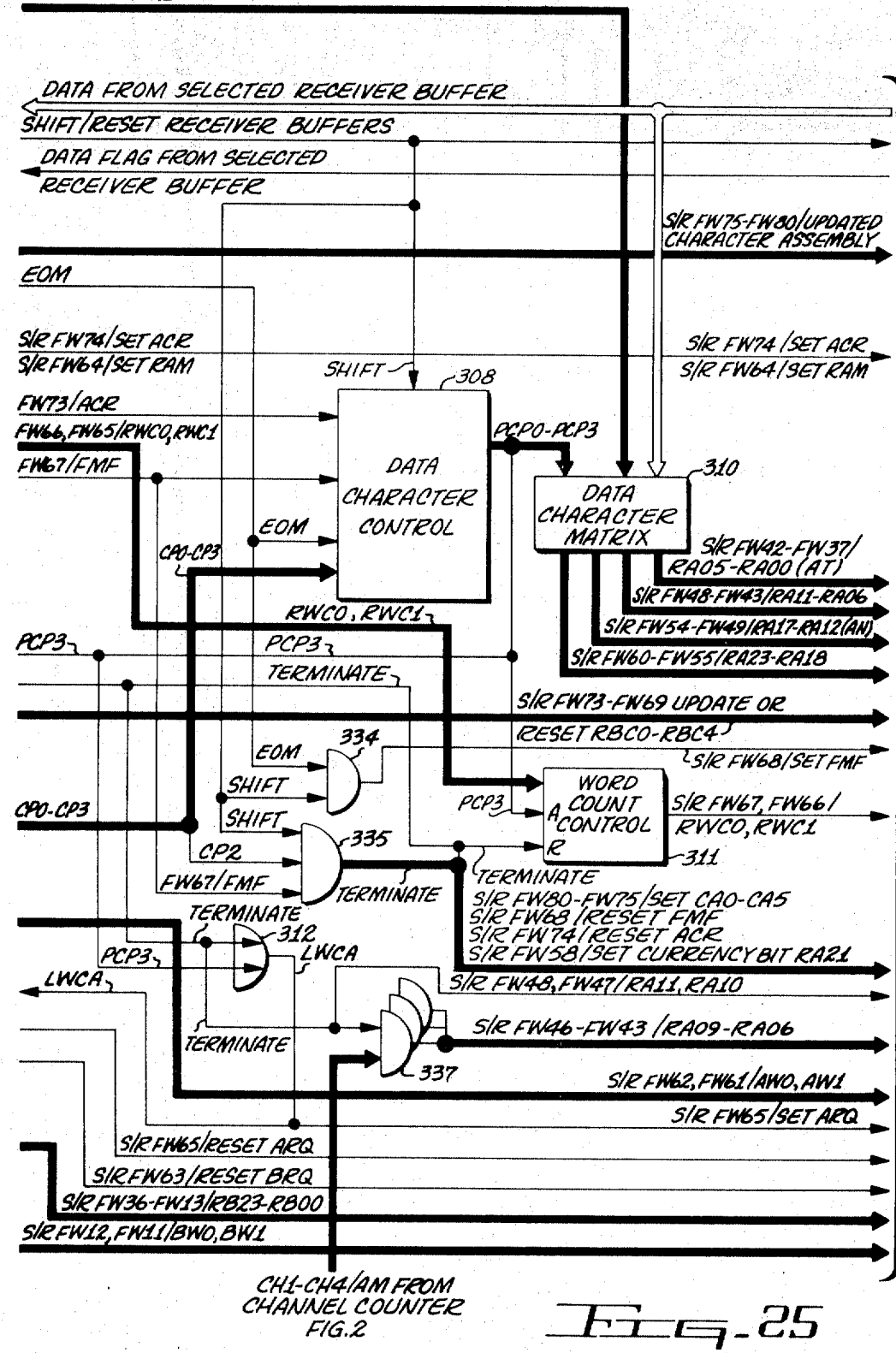
Figure 26:
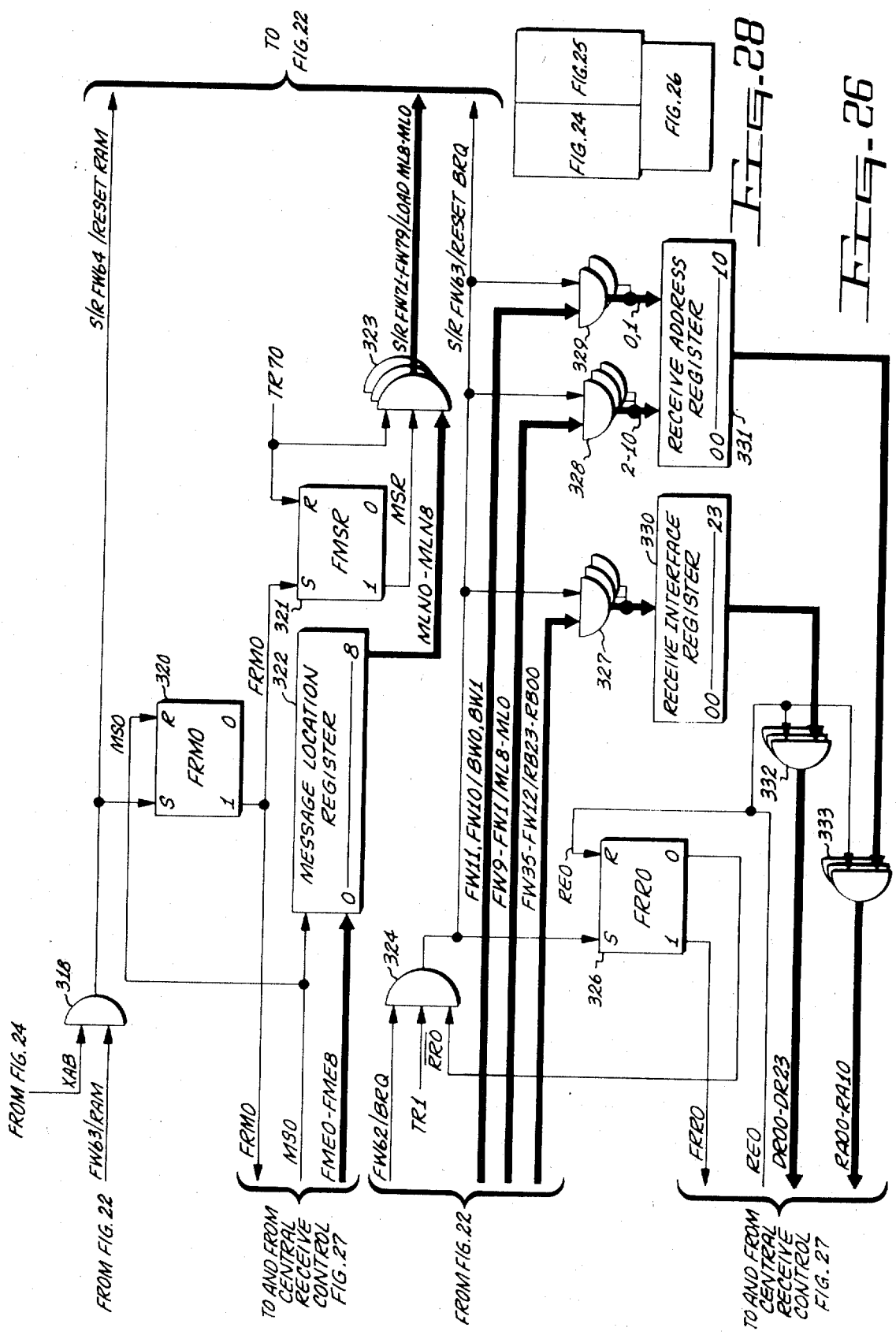

For a more thorough description of the receive operation of the line section of FIG. 22 in combination with the central receive control, it is necessary to refer to FIGS. 22, 24, 25, 26 and 27. FIGS. 24, 25 and 26 may be conjunctively considered as shown in FIG. 28.

On the left side of FIG. 24, which illustrates the details of the receive control 282, there are shown input signals from FIG. 22 from the various window flip-flops 286. These signals are those provided on lines 292 to the receive interface 290 and the receive control logic 282 (FIG. 22). In a similar fashion the output signals at the right of FIG. 25, which illustrate the details of the receive control logic 282, are provided to associated ones of the S/R logic 284 (FIG. 22) and are those transmitted via lines 294 in FIG. 22 from the receive interface 290 and the receive control 282.

FIG. 26 is a block diagram illustrating in greater detail the receive interface 290 shown in FIG. 22. The lines shown to the right of FIG. 26 also provide signals to the S/R logic 284 of FIG. 22 via lines 294. Input signals are provided from FIG. 22 to FIG. 26 at the left side thereof and are derived from various ones of the window flip-flops 286. It should be noted that the input signals coming in to the left side of Figs. 24 and 25 are shown with a window flip-flop number designation from one or more of the window flip-flops with a slash (/) followed by a mnemonic designation. For example, a FW73/ACR signal arriving at FIG. 24 from FIG. 22 is the signal ACR (active receive flag bit), and comes from the FW73 window flip-flop. In a similar fashion the signals leaving the right-hand side of Fig. 25 have indicated the destination of the signals as well as the function of the signal. For example, the signal designation S/R FW74/SET ACR indicates that the signal is going to the S/R logic FW74 and that the signal will set the ACR active receive bit (FW74).

The interface lines between the receive interface 290 shown in greater detail in FIG. 26 and the central receive control 276, the details of which are illustrated in FIG. 27, are shown to the left of FIG. 26. As previously explained for the interface lines as shown in Fig. 21, and as shown in greater detail in FIG. 27, the central receive control 276 receives the input signals FRM0–FRM3 and FRR0–FRR3 from corresponding ones of the line sections 278 and provides thereto the signals MS0–MS and RE0–RE3. These input and output signals are applied to and generated by, respectively, the address service select 296 and the message service select 295 of FIG. 27. Since in the present discussion only the receive line section associated with line section 0 of FIG. 21 is being described, only the signals FRR0, RE0, MS0 and FRM0 corresponding to line section 0 will be considered in the subsequent discussion. It should be noted that the other signals FRR1– FRR3, RE1'–RE3, MS1–MS3 and FRM1–FRM3 serve similar functions with respect to the operation of the corresponding receive line sections 1, 2 3.

In description of a typical receive operation sequence of the communication controller, first assumed that the RES signal from FIG. 2, as previously described, has just been applied to all of the logic in FIGS. 22, 24, 25, 26 and 27, thus placing all of the various flip-flops, shift registers, counters and control logic into a reset state. In this condition, the entire communication controller is in an idle or initialized state. It will be recalled from the description of the clock generation system of FIG. 2 that the beginning of delay line signal BDL from AND-gate 40 was not applied to the initialize control 44 to remove the RES signal until the control counter 34 and the channel counter 46 had counted all the way around from their minimum count to their maximum count and back to their minimum count to generate the TR1 and L00 signals. When the TR1 and L00 signals are simultaneously generated, the BDL signal is applied to the initialize control 44, thus removing the RES signal from the communication controller logic. The purpose of holding the RES signal up for this length of time is to allow each receive line section in the delay line loop of FIG. 22 to recirculate through the window flip-flops 286, which have applied thereto the RES signal In this manner all of the information in the delay line loop will be reset to binary 0's and the delay line loop is initialized for the receive operation.

By developing the beginning of delay line signal BDL from the TR1 and L00 signals, as shown in FIG. 2, it is possible to synchronize the beginning of the delay to line #0 associated with receiver buffer #0 of FIG. 22. That is, at TR1 time when the L00 signal selects receiver buffer #0, the delay line section for receiver buffer #0 (line 0) will be contained within the window flip-flops 286 (FW1–FW79) (FIG. 22). Further, since the channel counter 46 of FIG. 2 is triggered only once for every complete cycle count of the control counter 34 (TR1–TR80), the line count decode will only change one of its output signals L00–L15 for each corresponding line as it is shifted into the window flip-flops 284. In this manner all the information in the delay line pertaining to each of the receive lines 26 is sequentially shifted into the window flip-flops 286.

In the operation of the present embodiment, since the information in the delay line is constantly circulating and is never static, it is necessary to update the information as it is passing through the window flip-flops. Therefore, in order to make a decision as to whether or not to alter a particular one or more of the information bits in the window flip-flops 286, it is necessary to monitor or interrogate certain conditions as the information bits appear in the window flip-flops 286. When such a decision is made, signals are applied to various ones of the S/R logic functions 284, each of which provides output signals to its associated window flip-flop to control the flip-flop in accordance with that decision.

It will be noted form the organization of the S/R logic 284 and the window flip-flops 285 that each bit of information in the window flip-flops may be changed as it is passing from one flip-flop into the next flip-flop via an associated one of the S/R functions 284. For example, assume a binary 1 signal $\overline{ACR}$ from the FW73 flip-flop enables an AND-gate 303 (FIG. 24) to provide a binary 1 output signal to the S/R FW74 logic which sets the ACR bit. Thus, the active receive bit is set as it is going into FW74 from FW73. The alteration of all bits in the window logic operates in a similar manner.

Assuming now that the RES signal has been removed and that the control counter 34 and the channel counter 46 are counting, the line count decode 42 will begin to provide sequential line select output signals L00-L15 to the receiver buffers 280 of FIG. 22. Further assume, at this time, that the receiver buffer #0 associated with line 0 is being selected by the L00 signal and that the scanner connected to receiver buffer #0 is transmitting an incoming message via line 26 into the receiver buffer. In addition, assume that the first bit of the incoming message has just been clocked into receiver buffer #0 by the TCL signal of line 26. At the instant that the L00 signal appears at the input of buffer #0 the buffer will apply the message bit via line 281 to the receive control logic 282, and will simultaneously provide a data flag signal on line 283 to the receive control logic 282.

Referring now to Fig. 24, the message bit arriving on that line designated "data from selected receiver buffer" (buffer #0) is placed into a character assembly shift logic 301 and to an SOM/EOM decode 302. An AND-gate 300 receives the TR1 signal and a data flag signal via a data flag line from the selected receiver buffer (buffer #0). It will be recalled that the data flag and the message bit are always present at the output of the receiver buffer 280 during the TR80 time. Therefore, the data flag input signal to AND-gate 300 and the message bit to the character assembly shift logic 301, and the SOM/EOM decode 302 will all be present at the time the TR1 signal occurs. When the TR1 signal occurs AND-gate 300 is enabled to generate a shift/reset signal. The shift/reset signal is fed from AND-gate 300 back to the receiver buffers to reset the selected buffer receiver #0, thus removing the data flag from the input line coming into the character assembly shift logic and into the SOM/EOM decode. The shift/reset signal is also applied to the character assembly shift logic 301 and to an AND-gate 303.

With reference again to the character assembly shift logic 301, it will be noted that a plurality of inputs from the window flip-flops FW78-FW74 provide CA1-CA5 signals thereto which are representative of a previously assembled character or partial character. Since, at this time, it was assumed that the entire delay line is binary 0's, these Ca1-CA5 input signals must be representative of binary 0's. However, in that the first message bit is now applied to the character assembly shift logic 301, in conjunction with the shift/reset signal, at the occurrence of the shift/reset signal at TR1 time the first message bit is shifted into the character assembly shift logic which updates the character assembly CA0-CA5. The output of the character assembly shift logic will now provide a plurality of updated character assembly signals to the S/R FW75-FW80 logic as shown in FIGS. 22 and 25. Thus, as the window flip-flops are being shifted one bit by the OSC signal through the S/R logic 284, the character assembly bits CA0-CA5 will be updated by the message bit just received via S/R FW75-FW80. The operation just described will be performed each time the receiver line buffer #0 is selected by the L00 signal. That is, upon the transfer of the first message bit into the character assembly (CA0-CA5), the message bits previously assembled in the window flip-flops will now be shifted out of the window flip-flops back into the delay line. The OSC signal continues to shift the next receive line into the window flip-flops.

When the line count decode generates the next enable signal (for example, L01) to receive buffer #1 (not shown), that buffer will be selected. The data flag of buffer #1 will be sampled, and if present, a message bit therefrom will be transferred into the receive control logic and the message bit will be placed into the character assembly (CA0-CA5) of flip-flops FW75-FW80 as previously described for receiver buffer #0. This process will continue for each receive line until the line count decode counts to L15 and returns to L00 at which time the receiver buffer #0 is again selected by the L00 signal.

Assume now that all but the last bit of a start-of-message character (SOM) from the scanner connected to receiver buffer #0 of FIG. 22 has been shifted into the character assembly register CA0-CA5. When line 0 is again selected, the last bit of the start-of-message character will be shifted into the character assembly shift logic 301 in the same manner as previously described and the last bit of the SOM character is assembled with the previously assembled five bits CA-CA5 from the character assembly register in the window flip-flops FW75-FW80 to complete the SOM character.

The data line from the receiver buffers is applied to an SOM/EOM decode 302 (FIG. 24). Decode 302 also receives the character assembly bits CA1-CA5 from the window flip-flops FW78-FW74. When the last bit of the SOM character is shifted into the receive control, the SOM/EOM decode will generate a binary 1 SOM signal due to the combining of the first five bits of the SOM character from the character assembly CA1-CA5 with the sixth or last SOM bit to complete the SOM decode.

The binary 1 SOM output signal from decode 302 is applied to an AND-gate 303 which also receives the shift/reset input signal, designated shift, from AND-gate 300. Since at this time the ACR bit from window flip-flop FW73 is a binary 0, a binary 1 $\overline{ACR}$ signal is applied to AND-gate 303. Thus, AND-gate 303 is enabled to provide a binary 1 start message signal SM to a S/R FW74 logic and to an S/R FW64 logic of Fig. 22. This binary 1 SM signal will cause the ACR bit and the RAM bit in window flip-flops 72 and FW63 to be set to a binary 1 as they are transferred into FW74 and FW64 through the S/R FW74 logic and the S/R FW64 logic respectively.

The setting of the ACR bit to a binary 1 indicates to the logic that the receive line is now in condition to receive a new message. That is, the line is now active and will no longer look for a start-of-message character. The setting of the RAM flag or bit is an indication to the logic that the receive line is in the process of assembling the first four characters (data processor word) of an incoming message.

It is well to mention at this time that all discussions pertaining to the logic of Figs. 24, 25 and 26 will occur independently for the information of each receive line as it appears in the window flip-flops 286. Since the present discussion pertains to line #0 it will be assumed that after a particular function or functions are performed the line will shift out of the window flip-flops 286, be recirculated through the delay line and reappear in the window flip-flops at which time another function(s) will be performed.

When the information from line 0 reappears in the window flip-flops 286, the data flag will again be sampled by the L00 signal and AND-gate 300 will again generate a binary shift/reset output signal. At this time the next data bit from receiver buffer #0 will be shifted into the character assembly shift logic 301 for assembly into the character assembly CA0-CA of the window flip-flops 286. Also, the shift/reset signal designated shift is applied to an AND-gate 304. At this time the reset bit count signal applied to an inhibit terminal I of AND-gate 304 is a binary 0. Since line 0 is in the active state, the ACR signal from FW73 applied to AND-gate 304 will be a binary 1. With these three input conditions, AND-gate 304 is enabled to provide a binary 1 update bit count signal to an add terminal A of a bit count adder 306, the output of which will update the bit count by one. This update by one is added to the previous contents of a receive binary bit count RBC0-RBC4 provided to the bit count adder from window flip-flops FW68-FW72. This updated bit count is provided from the bit count adder 306 to the S/R FW73-FW69 logic for transfer into window flip-flops FW73-FW69.

The updated bit count is retained in the receive line 0 section of the delay line loop to be utilized for control purposes the next time that this information appears in the window flip-flops 286. Each time the receive line 0 appears in the window flip-flops 286, AND-gate 300 will continue to shift the message bits from the receiver buffer and the bit count adder 306 will continue to be updated via AND-gate 304 as described. This process of shifting in message bits and counting up the bit count will continue until the receive bit count RBC0-RBC4 in the window flip-flops FW68-FW72 achieves a binary count of five at which time a bit count decode 307 will generate a binary 1 CP0 signal, which indicates that the first character of a message word has been received.

The CP0 signal is applied to a data character control 308 (Fig. 25). It should be assumed at this time that the character received is not an EOM character. Since the format flag FMF 9(FW67 of window flip-flops 286) is not set, and the ACR bit is set, upon the application of the shift pulse to the data character control 308, a place character in position 0 signal, PCP0, will be generated. The PCP0 signal is applied to a data character matrix 310 which will respond by transferring the contents of the character assembly register CA1–CA5 from the window flip-flops FW78–FW74, along with the last message kit received from the receive buffer #0, through the data character matrix into the register A (bits RA05–RA00) via the S/R FW42–FW37 logic of Fig. 22.

At this point in the receive operation, a complete character has been assembled and placed into the word assembly register, register A. EAch time the receive line 0 information appears in the window flip-flops 286, message bits will be shifted into the character assembly CA0–CA5 in the window flip-flops FW75–FW80 and the bit count adder 306 will continue to update the receive bit count RBC0–RBC4 in window flip-flops FW73–FW69.

When the receive bit count RBC0–RBC4 achieves a binary count of 11, bit count decode 307 (Fig. 24) will generate a CAP1 signal which is applied to the data character control 308. The input conditions to the data character control 308 are, at this time, the same as previously described when the first message character was being placed into the assembly register, register A, with one exception. This exception is that the CP1 signal applied to the data character control 308 will cause the control to apply a binary 1 PCP1 signal to the character matrix 310. The PCP1 signal will, in turn, cause the character being received to be placed into register A, by applying the character signals from the data character matrix 310 to the S/R FW48–FW43 logic, thus transferring the second message character into register A bits RA11–RA06. In a similar fashion, the third incoming message character will be placed into register A bit positions RA17–RA12 via the S/R FW54–FW49 logic from the data character matrix 310 when the bit count decode 307 applies a CP2 signal to the character control 308. This will occur when the receive bit count RBC0–RBC4 applied to the bit count decode achieves a binary count of seventeen. The CP2 signal applied to the character control 308 will cause it to generate a PCP2 signal which is applied to the character matrix 310 to transfer the third message character to register A.

When the receive bit count RBC0–RBC4 in the window flip-flops achieves a binary count of 23 it indicates to the bit count decode 307 that the 4th character of the incoming message has been received. The bit count decode 307 now generates a CP3 signal which is applied to character control 308. The application of the CP3 signal to the character control will result in the generation of a PCP3 signal which is applied to the data character matrix 310 to transfer the 4th character of the first message word of the incoming message from the character assembly CA1–CA5 via the data character matrix 310, in combination with the last bit received from the receiver buffer, into register A bits RA23–RA18. This last message character is applied to the S/R FW60–FW55 logic of Fig. 22.

The PCP3 signal from character control 308 is also applied to an a terminal of a word count control 311 along with the word count RWC0 and RWC1 from the window flip-flops FW66 and FW65. Since, at the present time, the RWC0 and RWC1 signals are both binary 0's, the application of the PCP3 signal will add 1 to the word count and the output of the word count control 311 will provide an updated word count RWC0 and RWC1 to the S/R FW67 and FW66 logic to update the word count as it is passing into window flip-flops FW67 and FW66.

The PCP3 signal from character control 308 is also applied to a reset input terminal R1 of the bit count adder 306 to force the output signals of the bit count adder to binary 0's, thus causing the receive bit count RBC0–RBC4 to be reset to binary 0's. The PCP3 signal is further applied as a reset bit count signal to an inhibit input terminal I of AND-gate 304 so that the update bit count signal of AND-gate 304 is removed simultaneously while the bit count adder outputs are forced to binary 0's.

In addition, the PCP3 signal is applied to an OR-gate 312 (Fig. 25) which generates a load word count into register A, signal LWCA. The LWCA signal is applied to a plurality of AND-gates 314 (Fig. 24) which effect the transfer of the previous contents of the word count RWC0–RWC1 from the window flip-flops FW66 and FW65 into the register A word count AW0 and AW1 via the S/R FW62 and FW61 logic. The LWCA signal from OR-gate 312 is also applied to the S/R FW65 logic to set the ARQ bit in window flip-flop FW65.

The setting of the ARQ bit is an indication to the logic that a complete message word has been assembled into register A (RA00–RAc). When the receive line 0 information reappears in the window flip-flops 286, an AND-gate 315 will sample the BRQ flip-flop FW62 and the ARQ flip-flop FW64. Since at this time there is no message word contained in register B (RB00–RB23), the input signal $\overline{BRQ}$ to AND-gate 315 is a binary 1. With the ARQ flip-flop FW64 being set, upon the application of the TR1 signal to AND-gate 315, AND-gate 315 will generate a transfer A to B signal, XAB. The XAB signal is applied to the S/R FW65 and the S/R FW63 logic to reset the ARQ bit and set the BRQ bit. Simultaneously, the XAB signal is applied to two pluralities of AND-gates, 316 and 317. AND-gates 316 receive register A outputs RA00–RA23 from the window flip-flops FW59–FW36. Thus, upon the application of the XAB signal to AND-gates 316 the contents of register A will be transferred into the register B, into positions RB23–RB00. AND-gates 317 receive the register A word count outputs AW0 and AW1 from flip-flops FW60 and FW61 respectively. The XAB signal will, therefore, enable AND-gates 317 to transfer the register A word count AW0 and AW1 into register B word count bits BW0–BW1 by the application of the signals to the S/R FW12 and FW11 logic.

The setting of the BRQ bit by AND-gate 315 is an indication to the logic that a message word has now been assembled in register B (RB00–RB23). The resetting of the ARQ bit by AND-gate 314 indicates to the logic that a message word has been transferred out of register A into register B and that register A is now available to receive another message word from the receive line.

Reference is now made to AND-gate 318 of Fig. 26 which receives a RAM input signal from window flip-flop FW63. The RAM signal indicates that a new message location number is required when the message word in register A is transferred into register B. It will be recalled that the RAM bit was set to a binary 1 state upon the detection of the SOM character by AND-gate 303. Thus, upon the application of the XAB and RAM signals to AND-gate 318, the gate is enabled to provide a binary 1 reset signal to the S/R FW64 logic which will reset the RAM bit as it is transferred into window flip-flop FW64. Simultaneously, the binary 1 signal from AND-gate 318 is applied to a set input terminal of a request message number flip-flop (FRM0) 320. The FRM0 flip-flop is thus placed into a set state to generate a binary 1 FRM0 signal at its 1 output terminal. The FRM0 signal is applied to a set input terminal of a message service request flip-flop (FMSR) 321 and to the central receive control 276 (FIG. 27). The central receive control 276, upon receiving the FRM0 signal from flip-flop 320, responds immediately to a message location register 322 with a binary 1 message service select signal MS0 as will be further explained hereinafter.

Upon receipt of an MS0 signal from the central receive control, the FME0–FME8 message number signals, also from the central receive control, are transferred into the message location register 322. Simultaneously with this transfer, the FRM0 flip-flop 320 is reset by the MS0 signal.

The message location number of the input receive queue is now present in register 322 which provides the message location number to a plurality of AND-gates 323 via lines MLN0-MLN8. AND-gates 323 will be enabled at TR70 time since a binary 1 signal MSR (message service request) from the 1 output of the FMSR flip-flop is also applied to gates 323. The message location number is thus transferred to the S/R FW71-FW9 logic to load the new message location number into the ML8-ML0 positions of the window flip-flops FW71-FW79, where the message location number will be going at TR70 time. The TR70 signal will also reset the FSMR flip-flop 321.

AND-gates 328 receive the new message location input queue memory address ML8-ML0 from window flip-flops FW9-FW. In a similar fashion AND-gates 329 receive the register B word count BW0 and BW1 from flip-flops FW11 and FW10 while AND-gates 327 receive the message word in register B on the RB23-BR00 signal lines from window flip-flops FW35-FWB ALL AS SHOWN IN FIG. 26.

It will be recalled that the BRQ bit was placed into a set state upon the generation of the XAB signal by AND-gate 315. When the receive line 0 information reappears into the window flip-flops 286, the BRQ signal from FW62 is applied to an AND-gate 324 in conjunction with the TR1 signal and a binary 1 $\overline{RR0}$ signal from a 0 output terminal of an FRR0 flip-flop 326, which is in a reset state at this time. These three input signals to AND-gate 324 will enable the gate to apply a binary 1 set signal to an S terminal of receive request flip-flop (FRR0) 326, placing it into a set state. The binary 1 signal from AND-gate 324 also enables AND-gates 327, 328 and 329, transferring the message word in register B (RB23-RB00) into a receive interface register 330, the new message location number (ML8-ML0) into a receive address register 331, and the register B (BW0 and BW1) word count into the receive address register 331. The receive address register 331 now contains the message location input queue memory address, which is comprised of the ML8-ML0, BW0 and BW1 bits from the window flip-flops 286. The receive interface register 330 now contains the first message word of the incoming message on line 0.

The FRR0 flip-flop 326 supplies a receive request signal, FRR0, to the central receive control 276 (FIG. 27). The central control responds to the FRR0 signal with a receive enable signal, RE0. Further, the FRR0 flip-flop, in its set state, disables AND-gate 324 by the application thereto of a binary 0 input signal, $\overline{RR0}$. The disabling of AND-gate 324 prevents it from acknowledging the presence of any input BRQ signal until the current receive request (FRR0) has been serviced by the central receive control, at which time the RE0 signal will reset the FRR0 flip-flop 326 by the application of the RE0 signal to its R terminal.

When the central receive control transmits the RE0 signal, it is applied to two pluralities of AND-gates 332 and 333. The RE0 signal enables AND-gates 332 and 333, thus transferring the contents of the message word contained in the receive interface register 330 and the contents of the memory input queue address contained in the receive address register 331 to the central receive control 276 over lines DR00-DR23 and RA00-RA10 respectively.

Up to this point in time, the discussion has described the assembling of a complete message word into register A, the transfer of the word from register A into register B and the transfer of the word from register B through the receive interface to the central receive control 276 of FIG. 27.

During the time that the register A was receiving the last message bit of the first message word, the character assembly register CA0-CA5 in the window flip-flops continued to assemble a new character from the incoming message. The sequence of operation will continue in the same manner with the exception that the next character assembled into the character assembly register (CA0-CA5) will be the first character of the second message word of the incoming message. Upon the detection of the fourth character of the second word, the PCP3 signal from character control 308 will again update the word count RWC0 and RWC1 to a count of 2. The second message word will then be transferred into the register B, for subsequent transmission via the receive interface to the receive central control 276 as previously described.

The third message word is assembled in the same manner as the second word, with the exception that the fourth character of the third word is assembled into register A. A PCP3 signal from the data character control 308 will again update the word count RWC0-RWC1 through the word count control 311 to a count of four. The fourth message word (format word) will now be assembled and transferred from the register A into the register B from which, in turn, it is transferred to the central receive control via the receive interface in the same manner as described for message words one through three.

The next character to be received after the fourth character of the third message word will be an end-of-message character, EOM. This EOM character will be assembled into the character assembly register CA0-CA5 of the window flip-flops 286 in the same manner as other message characters. When the EOM character is partially assembled into the character assembly register CA1-CA5, the SOM/EOM decode 302, in conjunction with the last received message bit from the receiver buffer #0 will generate an EOM end-of-message output signal, which is applied to the data character control 308. Also at this time, the bit count RBC0-RBC4 is at a count of 5 and generates the CP0 output signal from the bit count decode 307 for application to the character control 308. The combination of the CP0 and EOM signals will direct the character control 308 to inhibit the transfer of the EOM character through the data character matrix 310 by disabling the output signals PCP0-PCP3. Thus, the EOM character is thrown away by preventing its transfer into register A.

The EOM output signal of the SOM/EOM decode 302 is also applied to an AND-gate 334 (FIG. 25) which also receives the shift signal from AND-gate 300. AND-gate 334 is, therefore, enabled to provide a binary 1 set signal to the S/R FW68 flip-flop.

The character assembly register CA0-CA5 will continue to assemble message bits into a character and the receive bit counter RBC0-RBC4 will continue to be updated as before. When the receive bit counter, RBC0-RBC4, achieves a binary count of 11, the bit count decode 307 generates a CP1 output signal which is again applied to the character control 308. The CP1 signal in combination with the FMF signal from the FW67 flip-flop will cause the data character control to generate the PCP0 signal which transfers the contents of the character assembly register CA1-CA5 and the last message bit being received from the receiver buffer through the data character matrix into the assembly register A, bits RA00-RA05. As previously described, the first message character following the EOM character in all received messages is the terminal address character AT. As shown leaving the right side of FIG. 25 from the character matrix 310, the AT character is placed into register A via the S/R FW42-FW37 logic. In this manner the terminal address AT is placed into the first character position of register A, thus assembling the first character of the format word.

The character assembly register CA0-CA5 will continue to assemble the next message character and after the assembly of the character the bit count decode 307 will generate a CP2 signal, thus indicating that the receive bit counter RBC0-RBC 4 is at a count of 17. The CP2 signal from bit count decode 307 will be applied to the character control 308. This CP2 signal in combination with the FMF signal will enable the data character control 308 to provide a PCP2 input signal to the data character matrix 310. The PCP2 signal will transfer the contents of the character assembly register CA1-CA5, in combination with the last message bit received from the receiver buffer through the data character matrix 310, into register A, bits RA17-RA12, through the S/R FW54-FW49 logic. This character is the AN character as shown in FIG. 18.

As was previously mentioned, if two scanners in the system of FIG. 1 are connected in series, it is necessary to add two addresses to the incoming message; the first of these addresses being the terminal auxiliary multiplexer or scanner address AN. The line sections always assume that this auxiliary address character AN will immediately follow the terminal address character AT in all incoming messages. This AN character is always placed into the third character position in register A (RA17–RA12) of the format word now being assembled.

The CP2 signal generated by bit count decode 307 (FIG. 24) is also applied to an AND-gate 335 (FIG. 25). Since the FMF bit in FW67 is a binary 1, when the shift pulse is applied to AND-gate 335 it will be enabled to generate a binary 1 terminate output signal.

Referring now to a plurality of AND-gates 337 in FIG. 25, the terminate signal is applied thereto in conjunction with a plurality of input signals CH1–CH4/AM from the channel counter 46 of FIG. 2. The CH1–CH4 signals are representative of the multiplexer or scanner address AM from which the incoming message is being received. The terminate signal applied to AND-gates 337 will thus transfer the AM address into register A into bit positions RA09–RA06 via the S/R FW46–FW3 logic. The terminate signal also serves as a reset signal to the S/R FW48 and the S/R FW47 logic to force binary 0's into register A bits RA11 and RA10, thus resetting the two most significant bits of the scanner address AM. In this manner the receive line section provides a means to generate the scanner address AM from which the incoming message originated. The two most significant bits of the AM character are set to binary 0's for subsequent alteration by the central receive control which will add the receive line section number to the two most significant bits of the AM character, thus completing the full scanner address AM which is placed into the input queue in memory. The complete format word is now contained in register A (RA00–RA23).

The terminate output signal is also applied to the S/R FW80–FW5 logic to set the character assembly register bits CA0–CA to all binary 1's. The purpose of this setting is to insure that at least one complete EOM character will be inserted between the message just assembled and the next message to be received. In addition, AND-gate 335 provides a reset signal to the S/R FW68 logic and to the S/R FW74 logic to reset the FMF and ACR flag bits respectively in preparation for the receipt of the next incoming message. Also at this time, the terminate signal is applied to the S/R FW58 logic to set the currency bit, RA21, of the receive assembly register A. As previously explained, the currency bit is a flag bit or message identifier used by the operating software to indicate that this is a newly received message in the input queue.

The terminate signal is also applied to the reset input terminal R2 of the bit count adder 306 and to the R input terminal of the word count control 311. This will force the outputs of these two elements to binary 0's, thus forcing the receive bit count RBC0–RBC4 and the receive word count RWC0–RWC1 into a reset state in preparation to receive the next incoming message.

OR-gate 312 also receives the terminate signal which serves at the output of OR-gate 312 as the LWCA signal, load word count in register A. The LWCA signal is applied to the S/R FW65 logic to set the ARQ flag bit, thus indicating that a new message word, now the format word, is in register A. The LWCA output from OR-gate 312 also serves to enable AND-gate 314 (FIG. 24) since the TR1 signal is present at this time. AND-gate 314 will transfer the contents of the word count RWC0 and RWC1 from window flip-flops FW66 and FW65 into the S/R FW61 and the S/R FW62 logic. This will load the word count of the word in register A, which is now the fourth word of the message, into bits AW0 and AW1.

It will be recalled that the ARQ bit in the window logic is now in a set state. Therefore, when the receive line 0 information reappears in the window flip-flops 286, AND-gate 315 will again generate the XAB signal transferring the contents of register A, the format word, into register B. Then, in the manner previously described, the format word in register B will be transferred via the receive interface to the central receive control 286 of FIG. 27 for storage in the memory input queue.

FIG. 27 illustrates in detail the central receive control 276. With reference to that figure, there is shown a message service select 295 and an address service select 296. Both of these service selects function in the same basic manner as the transmit service select 104 described with respect to FIG. 8. It will, therefore, be assumed in the following discussion that the reader is familiar with the operation of the service selects 295 and 296. The FRR0–FRR3 signals applied to the message service select 295 come from individual ones of the receive line sections 278 (FIG. 21). The FRM0–FRM3 signals applied to the address service select 296 are also supplied from individual ones of the receive line sections 278. The RE0–RE3 signals generated by the message service select 295 and the MS0–MS signals generated by the address service select 296 are, similarly, provided to individual ones of the receive line sections 278.

As has been the practice in this description, only those signals pertaining to line section 0 will be discussed in this description of FIG. 27. To describe the operation of the central receive control, it is well to consider the control 276 of FIG. 27 as being in a reset state or initialized condition. As previously described, this is applied to all address registers, shift registers, counters and control logic within the complete communication controller at system initialization time.

It will be recalled that, during the receive operation of the receive line section, when the register A completely assembled an incoming message word, the word was transferred from register A into register B of the window flip-flops 286 (FIG. 22). At the time of this transfer of the contents of the register A to register B, the FRM0 flip-flop 320 (FIG. 26) applies a binary 1 FRM0 signal to the address service select 296 in FIG. 27. The address service select, upon receipt of the FRM0 signal and the OSC signal, generates a count enable signal which is applied to a message location counter 340. The count enable signal enables the message location counter to be counted up by the OSC signal. Thus, the message location counter is updated to provide a new message location number address via signal lines FME0–FME8 to the message location register 322 in FIG. 26. Simultaneously, the address service select 296 generates an MS0 signal which is transferred to the message location register 322 (FIG. 26) to gate the updated message location number into that register.

The message service select 295 receives the input signal FRR0 from the FRR0 flip-flop 326 in FIG. 26. It will be recalled in the discussion of the line section that the FRR0 flip-flop 326 is placed into a set state one delay line revolution after the updated message location number is loaded into the line in the window logic. Thus, as the line information reappears in the window flip-flops, the FRR0 flip-flop provides a binary 1 output signal FRR0 to the message service select 295 and to a receive control 341.

It should be assumed at this time that the central transmit control (see FIG. 3) is not in a transmit sequence and, therefore, an input signal IRS supplied to an inhibit terminal 1 of receive control 341 is a binary 0. The absence of the IRS signal and the presence of the FRR0 signal, in combination with the OSC signal all applied to the control 341, will place the receive control into a receive sequence. When the receive control 341 goes into the receive sequence, it will generate a binary 1 select enable signal which is applied to the message service select 295 which, upon the occurrence of the OSC signal, will generate a binary 1 RE0 signal which is transmitted to the reset input terminal of FRR0 flip-flop 326 in FIG. 26. The RE0 signal is also applied to AND-gates 332 and to AND-gates 333. Thus, the RE0 signal will transfer the message word contained in the receive interface register 330 and the message location number address in the receive address register 331 to the central receive control (FIG. 27) via signal lines DR00–DR23 and receive address lines RA00–RA10 respectively. The message word is transferred via lines DR00-DR23 into a plurality of AND-gates 342 of FIG. 27. The receive control 341 is applying an enable data signal EDA to AND-gates 342 at this time, thus gating the message word through AND-gates 342.

Two of the output signals from AND-gates 342 on data lines D10 and D11 of the data lines D00-D23 are transferred through a plurality of OR-gates 343. OR-gates 343 provide two output signals LD10 and LD11 in response to their inputs which are combined with the signal on lines D00-D09 and D12-D23 to make up the receive data signal lines RD00-RD23 which are connected to the data processor.

Still with reference to FIG. 27, AND-gates 344 receive the address signals RA00-RA09 from AND-gates 333 in FIG. 26. The receive address bit RA10 is applied to an AND-gate 345. Assuming at this time that a $\overline{EMA}$ signal also applied to AND-gate 345 is a binary 1, the gate is enabled to propagate the RA10 bit through an OR-gate 346 to the input of an AND-gate 347. A plurality of AND-gates 348 receives the address signals RA11-RA14 from a receive base address register 350. As previously described for the address format for addressing the incoming message queue of the data processor memory, a receive base address R is inserted into the memory address as a constant by the communication controller. The receive base address register 350 serves the function of providing the constant base address which is used to establish the starting location in memory for the incoming message queue (location R, FIG. 20).

An enable address signal EAD is applied simultaneously to AND-gate 347, AND-gates 344 and AND-gates 348 to permit the transfer of the receive address bit RA10 through AND-gate 347, address bits RA00-RA09 through AND-gates 344 and address bits RA11-RA14 through AND-gates 348. The output signals RAD10 from AND-gate 347, RAD00-RAD09 from AND-gates 344 and RAD11-RAD14 from AND-gates 344 are combined to make up the entire receive address RAD00-RAD14. The address signals on these lines are provided to the data processor memory to address the input queue to place the incoming message word in memory.

Referring again to the receive control 341 of FIG. 27, a receive memory sequence request signal RMSR is provided to the data processor by the receive control 341. The RMSR signal is generated when the receive control goes into a receive sequence and is provided to the data processor simultaneously with the receive address signals RAD00-RAD14 and the receive data signals RD00-RD23. The RMSR signal indicates to the data processor that the communication controller has an incoming message word to be stored in memory. The data processor will act on the RMSR signal to place the incoming message word RD00-RD23 into memory into the location specified by the receive address RAD00-RAD14. As soon as the data processor places the message word into memory, the data processor will respond to the receive control 341 with a memory data available signal MDA. The MDA signal will remove the receive control from the receive sequence and the EAD, EDA and select enable signals will return to a binary 0 state.

The receive control 341 also generates an inhibit transmit sequence signal IXS which is transferred to the central transmit control 54 of FIG. 3. This IXS signal will be provided to the central transmit control at any time when one of the FRR0-FRR3 signals is provided to the receive control, when the receive control is in a receive sequence, or when the receive control is in a receive queue check sequence to be later described. The IXS signal is utilized in the central transmit control to prevent the communication controller from entering into a transmit operation or sequence while the communication controller is placing an incoming message word into the memory.

The operation of the central receive control, thus far described for FIG. 27 will be repeated each time the receive line 0 information appears in the window flip-flops. That is, each time the receive line information appears in the window flip-flops 286 of FIG. 22, the FRR0 and the RE0 signals will be generated and the next word will be placed into memory. The communication controller will place message words into the 1st word, 2nd word and 3rd word locations in memory as shown in FIG. 18.

Assuming now the following conditions: (1) the receive line section has completely assembled the format word, (2) that the format word has been transferred into register B of the window flip-flops 286 of FIG. 22, and (3) the receive line 0 information appears in the window flip-flops. Under these conditions the FRR0 signal (FIG. 26) again will be applied to the message service select 340 and the central receive control will go into a receive sequence as previously described. Thus, the format word will be transferred via AND-gates 322 of FIG. 26 into the central receive control to AND-gates 342 via signal lines DR00-DR23. Also, at this time, the incoming queue message address for the 4th message word will be transferred into AND-gates 344 and AND-gates 345 of FIG. 27.

It will be recalled from the earlier description of FIG. 26 that, during the assembling of each message word by the receive line section, when a message word is transferred from register A into register B, the register B word count BW0 and BW1 is updated to reflect the word count or the number of the word going into register B. Since the format word is now in register B, the BW0 and BW1 input signals applied to the receive address register 331 are representative of binary 1's, thus indicating a binary count of 4.

Referencing FIG. 19, the word number segment is the line word count (BW0 and BW1). Thus the two least significant bits of the receive address designates the fourth word or word location R+3 shown in FIG. 18. The BW0 and BW1 word count is loaded in two bits 0 and 1 via AND-gate 329 (FIG. 26) into receive address register 331.

Referring now to FIG. 27, the receive address lines RA00-RA01 are applied to the receive control 341. These two signals RA00 and RA01 correspond to the two least significant address bits 0 and 1 in the receive address register 331. The two input signals RA00 and RA01 being binary 1's, indicate to the receive control 341 that this is the fourth word of the incoming message which is the format word. The receive control 341 being in a receive sequence and the select enable signal being applied to the message service select 295 in combination with the RA00 and RA01 binary 1 signals will cause the receive control 341 to generate an enable line address signal ELA which is applied to a plurality of AND-gates 351. AND-gates 351 also receive the receive line section address signals RLSA4 and RLSA5 from the message service select 295. These latter two signals represent the address of the particular receive line section being selected by the message service select 295. In the present example, the RLSA4 and RLSA5 signals will be binary 0's since the receive line section 0 is being enabled by the RE0 signal from the message service select. The ELA signal will transfer the contents of the message service select through AND-gates 351 into a plurality of OR-gates 343, which in turn provide two output signals LD10 and LD11 to the data processor via the lines RD00-RD23. The LD10 and LD11 signals correspond to the two most significant bit positions of the AM character which is placed into memory as shown in FIG. 18. In this manner the central receive control provides a means, via the message service select 295, AND-gates 351 and the OR-gates 343, for adding the remainder of the multiplexer or scanner address to the incoming message in the AM character of FIG. 18. The receive data from AND-gates 342 and from OR-gates 343 is combined into the receive data lines RD00-RD23 to place the entire format word into memory in the fourth word location (FIG. 18).

As shown in FIG. 18, a currency bit is contained in the status character location. This currency bit is bit 21 of the RD00-RD23 signal lines. The currency bit was inserted into the format word when the register A in the receive line section assembled the last word of the message, the format word. The receive control 341 will now generate the RMSR signal and the format word will be stored into the input queue in memory.

When the processor stores the word in memory, it will provide the MDA signal to the receive control 341. The receive control being in a receive sequence and in receipt of the RA00 and RA01 binary 1 signals will, upon receiving the MDA signal, enter into a receive queue check sequence. When the receive control 341 enters into the receive queue check sequence it again generates the select enable signal to the message service select 295, thus causing the RE0 signal to again present the receive address to AND-gates 344 and 345. The receive control 341 going into a receive queue check sequence forces the data processor to go into a memory read sequence by the generation of an XMSR signal which is supplied to the processor. This XMSR signal is, in essence, the same signal previously described which was generated by the central transmit control during the transmit operation of the communication controller. The XMSR signal causes the data processor to read the addressed word out of memory.

During the receive queue check sequence, the word read from memory will be the fourth word of the message located halfway around the queue. The addressing of this fourth word is accomplished as follows. The presence of the RA00 and RA01 binary 1 signals at the receive control 341, the generation of the select enable signal and the fact that the receive control 341 is now in a receive queue check sequence will cause the receive control to generate a binary 1 enable modified address signal EMA which is applied to an AND-gate 352 and to an inverter 353 (FIG. 27). The binary 1 EMA signal applied to inverter 353 will thus be inverted to a binary 0 signal to disable AND-gate 345. However, the binary 1 EMA signal will enable AND-gate 352 to permit the transfer of a modified address signal MA10 received from an inverter 354. The MA10 signal from inverter 354 results from an inversion of receive address bit RA10, the most significant bit (bit 10) of the message location segment, (FIG. 19). The MA10 signal passes through AND-gate 352 and an OR-gate 346 to the input of AND-gate 347. The enable address signal EAD, which is always generated at the same time a select enable signal is generated, is also present at AND-gate 347 and, therefore, the modified address bit MA10 is transferred through gate 347 to provide an output signal RAD10. The RAD10 signal is combined with the remainder of the receive address, bits RAD00–RAD09 from AND-gates 344 and RAD11–RAD14 from AND-gates 10) to provide a memory address via signal lines RAD00–RAD14 to the memory processor. It will be recalled that the combination of the word number and the message location segments provides the capability of addressing 2,048 message word locations in the input queue. Thus, by complementing the most significant bit position (bit 10) of the message location segment, the address now going to memory will specify that word 1,024 message word locations away from the word just stored in memory.

When the data processor retrieves the receive queue check word from memory, the 21st bit of the word (currency bit) is transferred via a signal line PD21 to the input of an AND-gate 355 in the central receive control of FIG. 27. The data processor will also provide the MDA signal to the receive control 341 at the same time bit 21 (PD21) is transferred across the interface to AND-gate 355. Since the receive control is in a receive queue check sequence, upon the receipt of the MDA signal it will generate a stop-message command signal GSC, which is also provided to AND-gate 355. If the operating software has previously processed this receive queue check message word, the PD21 signal will be a binary 0, thus AND-gate 355 will be disabled to thus provide a binary 0 output signal on the SMC line to the transmit line sections shown in FIGS. 3, 9 and 10. As further shown in FIG. 9, the SMC signal line is connected to each of the transmit line units 66. In that the SMC signal will affect the operation of each of the transmit line units in an identical fashion, only the operation of a one of the transmit line units 66 will be described.

Referencing now FIG. 10, OR gate SMC signal line being a binary 0 will have no affect on the operation of the transmit line unit. However, when the receive queue check message word is read from memory, if the PD21 signal applied to AND-gate 355 (FIG. 27) is a binary 1, AND-gate 355 will be enabled to generate a binary 1 stop-message command signal SMC which is applied to a set input terminal S of a stop-message command flip-flop (FSMC) 95 in FIG. 10. Thus, upon the application of the OSC signal to its T terminal, the FMSC flip-flop will set. Simultaneously, the binary 1 SMC signal is applied to an OR-gate 86 which in turn provides a binary 1 RQ signal to the input of AND-gate 88. It should be noted that OR-gate 86 also receives the input signal GXC general transmit command signal from the data processor. Thus, the SMC signal will affect the operation of the transmit line unit in the same manner as a general transmit command signal GXC from the data processor, which is utilized to get each of the nonactive transmit line units in a transmit mode of operation. Thus, upon application of the SMC signal to the transmit line sections, each transmit line unit will, in essence, enter into a transmit mode of operation. However, this operation is conditional.

Referring back to AND-gate 88, it will be noted that a FACT signal forms the second gate input. As previously explained for the transmit operation of the transmit line unit, the FACT signal will be a binary 1 when the transmit line unit is not transferring a word from its output register 120 to the scanner. Thus, if the transmit line unit is in a nonactive condition the FACT signal will be a binary 1 to enable AND-gate 88 which in turn will apply a binary 1 signal via OR-gate 92 to the set input terminal of the FRQX flip-flop 94. The FRQX flip-flop will, therefore, achieve a set state upon the occurrence of the OSC signal. When the FRQX flip-flop sets, the FRQX binary 1 signal from its one output terminal will enable an AND-gate 96. Since the transmit line unit, line 0, of FIG. 10 is being selected by the SEL0 signal from line selector decode 70 of FIG. 9, AND-gate 96 being enabled generates a GAR0 binary 1 signal which is propagated through OR-gate 98. OR-gate 98, in turn, generates an RQX0 signal which is applied to the transmit control 106 of FIG. 8.

Reference is again made to FIG. 10 and the output SMR (stop-message request) of an AND-gate 97. Since at this time the FACT signal is a binary 1, and since the FSMC flip-flop 95 is in a set state, the FSMC signal applied to AND-gate 97 is also a binary 1. In addition, since the SEL0 signal line is a binary 1, AND-gate 97 generates a binary 1 SMR signal which is applied to AND-gate 113 and to an inverter 114 of FIG. 8. This binary 1 SMR signal is inverted through inverter 114 to a binary 0, thus disabling AND-gate 112 to prevent the transfer of data through data transfer gates 108. However, the binary 1 SMR signal is applied to AND-gate 113 and to an inhibit terminal I of the transmit control 106. The combination of the SMR signal and the RQX0 signal causes the control to generate the GDE signal, which is also applied to AND-gate 113. Thus, AND-gate 113 is enabled to generate a binary 1 gate stop message signal GSM, which is applied to a plurality of OR-gates 82.

OR-gates 82 are wired with the input GSM signal in such a fashion that they will generate a fixed combination of output signals on lines DL23–DL00 representative of the previously mentioned stop-message command is transferred via lines DL23–DL00 to AND-gate 116 of FIG. 10. Upon the application to AND-gate 116 of the binary 1 LDA and SEL0 signals, AND-gate 116 will parallel transfer the stop-message command word into register A. The message will then be transferred to the output register 120 for transmission to the scanner associated with line 0 of FIG. 10 in the manner described with respect to the transmit operation.

In the scanners, the special stop-message command will be decoded to stop the interrogation process in the manner as previously described in the receive operation. When the central transmit control of FIG. 8 generates the gate data enable signal GDE, it is provided to an AND-gate 160 in FIG. 10 which also receives the binary 1 SEL0 input signal. Thus, a binary 1 signal from AND-gate 160 is applied to the reset input terminal R of each of the flip-flops FRQX 94 and FSMC 95. These two flip-flops will thus be placed in a reset state at the time that the stop-scan message command is transferred into the A register 118 via AND-gate 116 of FIG. 10. Thus, the special stop-message command signal is inserted between messages which are being transferred from the transmit line to the scanner.

The operating software will periodically place a start-message command into each of the outgoing queues in memory such that when each transmit line unit requests access to the memory and addresses the output queue, the special start-message command signal will be transferred from the data processor via the PD00–PD23 processor data lines into the data transfer gates 108 of FIG. 8. The transfer gates 108 will transfer the special start-message command to tell them to resume the interrogation process in the event that they had previously received a stop-message command.

While the principles of the invention have now been made clear in an illustrative embodiment, there will be immediately obvious to those skilled in the art many modifications of structure, arrangement, proportions, the elements, materials, and components used in the practice of the invention, and otherwise, which are particularly adapted for the specific environments and operating requirements without departing from those principles. The appended claims are therefore intended to cover and embrace any such modifications within the limits only of the true spirit and scope of the invention.

What is claimed is:

1. A data communications system comprising:
   A. a data processor including a memory having a plurality of individually addressable storage locations, each of said storage locations capable of holding an information item;
   B. address generating means connected to said data processor for forming an address of a storage location to receive information items;
   C. a source external to said processor for furnishing information items to said memory for retention therein;
   D. control means connected to said address generating means for modifying the formed address of the storage location, remote from that location addressed;
   E. inhibiting means connected to said source and connected to said data processor to receive an information item from the location at the modified address for inhibiting the furnishing of additional information items from said source in response to a prescribed configuration of said contents of said location at the modified address.

2. A data communication system comprising:
   A. a plurality of terminals adapted to transmit units of message information in response to interrogation signals;
   B. a data processor, said processor including a memory having a plurality of selectively addressable storage locations, each of said locations capable of retaining a unit of message information, portions of selected ones of said units including a message identifier, said memory acting to store incoming units of message information in response to storage location addresses provided thereto;
   C. a communications controller connected intermediate said processor and said terminals, said controller including,
      1. means for generating said storage location addresses,
      2. means for acting upon units of message information to be stored in said memory by the addition thereto of a message identifier, and
      3. means for testing for the presence of a message identifier in units of message information retrieved from said memory and for the generation of a command signal in response to the presence of said message identifier;
   D. and scanning means intermediate said communication controller and said terminals for polling said terminals, said scanning means including
      1. means for generating said interrogation signal and further including 2. means responsive to said command signal to prevent the continued generation of interrogation signals whereby said terminals cease to transmit said units of message information.

3. An information transfer controller and director, for providing data communications capability for a data processor for messages comprised of a string of characters, comprising:
   A. register means including control logic for transferring data characters to and from a data terminal;
   B. a decoder connected to said register means for detecting prescribed data characters appearing at a prescribed location in a message transmission;
   C. inhibiting means connected to said decoder and said register means for inhibiting transfer of characters from a data terminal to said register means in response to said decoder decoding a first prescribed data character and for removing transfer inhibition upon decoding a second prescribed data character;
   D. communications controller means, connected to said register means for interfacing said register means and a data processor.

4. An information transfer controller and director as set forth in claim 3, further including:
   E. central transmit control means including
      1. address generating means for supplying a working store memory location address for data to be transferred to a data terminal,
      2. transmit selector means connected to said address generating means for providing data to select memory locations for servicing respective data terminals,
      3. a transmit controller for producing signals for a data processor to initiate transfer of data from said memory to said communications controller,
      4. data transfer means connected to said scanners for transferring data from said memory to said scanners;
   F. central receive control means including
      1. address generating means for supplying a working store memory location address for data to be transferred from a data terminal to memory,
      2. receive selector connected to said address generating means for providing data to select memory locations, for servicing a current data terminal and a second data terminal,
      3. a receive controller for producing first and second signals for respectively initiating transfer of data to said memory from said current data terminal and subsequently to transfer previously received data to said second data terminal from said memory.

5. An information transfer controller and director comprising:
   A. a plurality of scanners, each scanner including
      1. register means including control logic for transferring data characters to and from a plurality of data terminals,
      2. receive scan control means connected to said register means for selectively receiving characters from a data terminal,
      3. transmit scan control means including a first decoder connected to said register means for selecting a data terminal for transmission in accordance with a character in a prescribed location in a message transmission,
      4. inhibiting means including a second decoder connected to said register means for starting and stopping said receive scan control means in accordance with prescribed characters in said prescribed location in a message transmission;
   B. a communications controller including
      1. word register means including control logic connected to said scanners for holding and transferring data characters to and from said scanners;
      2. means to periodically load said register means with a character identifying which said scanner received the current message and a prescribed character representing status for subsequent use by said second decoder, 3. address generating means for producing addresses for a working store memory in accordance with the selection of scanners for transmission and reception,
4. control means for generating signals for a data processor for transferring words from said word register means to a data processor memory for incoming messages and for transferring words to said word register means for outgoing messages and incoming messages in such a manner that said scanners test said prescribed character representing status.

6. An information transfer controller and director comprising:
   A. a plurality of scanners, each scanner including
      1. a plurality of pairs of transmitters and receivers, each pair being capable of transferring data to and from data terminals for full duplex communications,
      2. an outgoing register and an incoming register, connected to said transmitters and receivers, respectively, for buffering character data for said data terminals,
      3. a counting controller connected to said receivers for sequentially scanning said terminals for incoming messages,
      4. an address register connected to said outgoing register for receiving data representing data terminal selection, said address register also being connected to said transmitters for selectively directing message characters from said outgoing register through said transmitters,
      5. a start/stop decoder connected to said counting controller for inhibiting scanning of said receivers when activated, thereby stopping message reception, said start/stop decoder being connected to said address register for sensing predetermined addresses indicative of start and stop message reception conditions,
      6. a start of message decoder connected to said outgoing register for selectively gating data to said address register upon decoding a start of message character;
   B. word register means connected to said scanners for holding data characters for transmission and reception, said word registers being adapted to receive and transmit message words to and from a data processor;
   C. base address generating means for providing message queue addresses for the working store memory;
   D. word address generating means connected to said base address generating means for producing absolute memory addresses of message words for the working store memory;
   E. receive control means connected to said word address generating means including logic for automatically initiating a read memory cycle for checking the receive message queue for processor overload by modifying the address in said word address generating means for the current received message to a look-ahead address in the receive queue and initiating a message transmission from a data processor whereby said start/stop decoder tests for message reception termination.

* * * * *